United States Patent [19]
Hagenbuch

[11] Patent Number: 4,839,835
[45] Date of Patent: Jun. 13, 1989

[54] APPARATUS AND METHOD RESPONSIVE TO THE ON-BOARD MEASURING OF THE LOAD CARRIED BY A TRUCK BODY

[76] Inventor: LeRoy G. Hagenbuch, 4602 N. Rosemead, Peoria, Ill. 61604

[21] Appl. No.: 717,042

[22] Filed: Apr. 1, 1985

Related U.S. Application Data

[63] Continuation-in-part of Ser. No. 604,739, Apr. 27, 1984, Pat. No. 4,630,227.

[51] Int. Cl.[4] .................. G01G 19/08; G06F 15/20
[52] U.S. Cl. .................... 364/567; 364/424.01; 364/424.03; 364/424.07; 177/136; 177/141
[58] Field of Search ............... 364/424, 567, 568, 555, 364/558, 550; 340/52 R; 73/37; 177/136, 139, 141, 165, 209

[56] References Cited

U.S. PATENT DOCUMENTS

| | | | |
|---|---|---|---|
| 2,756,983 | 7/1956 | Furcini | 177/141 |
| 3,306,384 | 2/1967 | Ross | 177/141 |
| 3,321,035 | 5/1967 | Tarpley | 177/136 |
| 3,420,325 | 1/1969 | McAlister et al. | 177/141 |
| 3,644,883 | 2/1972 | Borman et al. | 340/23 |
| 3,857,452 | 12/1974 | Hartman | 177/139 |
| 3,876,980 | 4/1975 | Haemming et al. | 340/146.1 |
| 3,878,908 | 4/1975 | Andersson et al. | 177/136 |
| 3,895,681 | 7/1975 | Griffin et al. | 177/141 |
| 3,940,630 | 2/1976 | Bergonz | 250/568 |
| 3,980,871 | 9/1976 | Lindstrom et al. | 364/567 |
| 4,009,375 | 2/1977 | White et al. | 235/150.24 |
| 4,009,378 | 7/1978 | Carr | 180/98 |
| 4,107,689 | 8/1978 | Jellinek | 343/112 |
| 4,212,074 | 7/1980 | Kuno et al. | 364/466 |
| 4,217,588 | 8/1980 | Freeny, Jr. | 343/112 D |
| 4,350,970 | 9/1982 | von Tomkewitsch | 340/23 |
| 4,393,951 | 7/1983 | Horst-Rudolf | 177/136 |
| 4,511,974 | 4/1985 | Nakane et al. | 364/463 |
| 4,520,443 | 5/1985 | Yuki et al. | 364/424 |
| 4,542,461 | 9/1985 | Eldridge et al. | 364/424 |
| 4,606,419 | 8/1986 | Perini | 177/209 |

FOREIGN PATENT DOCUMENTS

| | | |
|---|---|---|
| 493628 | 9/1977 | Australia . |
| 0060074 | 9/1982 | European Pat. Off. . |
| 2400447 | 11/1971 | France . |
| 2249787 | 5/1975 | France . |
| 84 05278 | 10/1985 | France . |
| 2562659 | 10/1985 | France . |
| 59-176133 | 10/1984 | Japan .......... 177/136 |
| WO83/04451 | 12/1983 | PCT Int'l Appl. . |
| 1049751 | 10/1983 | U.S.S.R. ......... 177/136 |
| 1215275 | 12/1970 | United Kingdom . |
| 2025185 | 1/1980 | United Kingdom . |

OTHER PUBLICATIONS

Specification Sheet from Norand Data Systems RT1200 Radio Data Network, 1985.
(List continued on next page.)

Primary Examiner—Felix D. Gruber
Assistant Examiner—Brian M. Mattson
Attorney, Agent, or Firm—Leydig, Voit & Mayer

[57] ABSTRACT

The invention relates to an apparatus for accurately measuring the weight of a load carried by a truck body which is mounted on a truck frame. The apparatus is located along an interface between the truck frame with the load carried by the truck body and uniformly distributes the weight of the body onto the frame along the interface. In order to measure the weight of the load, the apparatus includes pressure sensors which communicate the entire weight of the load to the truck frame. The pressure sensors provide an electrical signal proportional to the pressure exerted by the load on the apparatus. This electrical signal is processed to calculate the weight of the load carried in the truck body. By providing a pressure sensing apparatus at an interface between the load and truck frame, the weight on the load carried by the truck body can be continually monitored without interrupting the loading, hauling and dumping routine. A sensor processing unit responds to the continually monitored weight data and the like to provide hauling parameters to track the performance of the truck and to provide a data base to a central computer from which data can be gathered for efficiently controlling the movement of a plurality of trucks.

94 Claims, 28 Drawing Sheets

OTHER PUBLICATIONS

Advertisement from Automatic I.D. News on LXE's Radio Linked Data Communications, LXE, a division of Electromagnetic Sciences, Inc., Nov., 1986.

Advertisement on Texlon's Portable Tele-Transaction Computers, (PCTs).

Article from MIS Week entitled "JIT and the Receiving Room" by Bill Maraschiello, Associate Editor, May 19, 1986.

Article entitled "Material Handling Makes Just-In-Time Work for AutoCon", by Clyde E. Witt, Associate Editor, Material Handling Engineering, Nov., 1986.

Rockwell International Corporation's Fleet Management System entitled "TripMaster"; Jul., 1986.

Glotzl BaumeBtechnik's Publications on "Pressure Cell for Concrete Stress and Joint Pressure"; Jul., 1979.

"Truck Management Systems Review", by V. Srajer, CANMET (Canada Centre for Mineral & Energy Technology) Calgary Coal Research Laboratory, Dec., 1985.

"Vehicle Monitoring System for Large Off-Highway Trucks", article of GLI Corp. in Mining Journal, Jan. 10, 1986.

"An Integrated Truck Management Information System (Truck MIS) Concept", article by LeRoy G. Hagenbuch presented at CIM 2nd Dist. 5 Mtg. on Sep. 11, 1985.

"Analysis of Open-Pit Truck Haulage System by Use of a Computer Model", by J. H. Tu & V. J. Hucka of Univ. of Utah, in the CIM Bulletin, Jul., 1985, pp. 53–60.

"Fully Integrated Truck Information & Control Systems (TIACS)", by T. O. Jones & W. K. Tsuha. SAE Technical Paper Series, Truck & Bus Expo, Cleveland, Ohio., Nov. 7–10, 1983.

Article on AGV (Automated Guided Vehicle) marketed by Caterpillar Co. along with General Electric Co. of Great Britain, Publication unidentified, 1986.

"Car 54, Where Are You? Just Check the Computer Map", article in Business Week, Science & Technology section, Aug. 12, 1985.

"Eye in Sky Will Keep Us from Getting Lost", article by John Hillkirk in USA Today, Mar. 5, 1986.

"Satellites Add More Accuracy to Locating Objects on Earth", article by D. Wessel, Staff Reporter of The Wall Street Journal, Date unknown.

Advertisement by the Hawker Siddeley Dynamics Engineering Ltd. in The Mining Engineer for mining controls capabilities, p. 332, date unknown.

Advertisement by Hawker Siddeley Dynamics Engineering Ltd. on the "Elements of an MVMM System". "Dynalink Mine Vehicle & Material Management System", Publication No. BSL 924, Issue No. 01, by Hawker Siddeley Dynamics Engineering Ltd., HSDE 1986.

Advertisement by Identification Devices, Inc., Boulder, Colo., on the System I.D. ® Automated Vehicle Identification, 1980.

Article on the AVM (Automatic Vehicle Monitoring) and AVL (Automatic Vehicle Location) Systems, pub. in Mobile Radio Technology; Sep. 1985, pp. 64–65.

Article in Design News entitled "Automatic Vehicle Locator 'On-The-Air'", Sep. 23, 1985, p. 29.

Brochure entitled "Automatic Vehicle Locator System" © by Motorola, Inc., 1984.

"Construction Vehicle ID Transmitter for Carriage Data Collection & Management System" by Sumitomo Electric Ind. Int'l Cong. & Expo, Detroit, Mich., Feb.–Mar. 1985.

Cost Savings Bulletin I describing "VMS TM as a Preventive Maintenance Tool", dated Jan. 13, 1985.

Cost Savings Bulletin II describing "VMS TM as a Preventive Maintenance Tool", dated Sep. 6–8, 1985.

Cost Savings Bulletin III describing "VMS TM as a Preventive Maintenance Tool", dated Dec. 28–29, 1985.

"The VMS TM –Setting New Standards for Vehicle Monitoring", publication by GLI Corp. of Woodinville, Wash., published Dec., 1985.

Article on "Modems Take to the Airwaves" by M. David Stone, published in PC Magazine, Jan. 14, 1986, pp. 184–193.

A. H. Emery, "Hytronic Totalizer" catalog sheet, Bulletin 2911, Dec. 5, 1985.

The "OEM-Bus Single Board Computer SYS-2Z" catalog sheets by The ROBASIC Corporation.

"Optodata ® 5200, The Cable Eliminator" sales literature by Scientific Technology, Inc., including master price list, 1986.

Catalog listing Telxon Portable Bar Code Scanners, Telxon Corporation, 1984.

Article "Bar Codes Hold 'Patent' on Document Tracking" in Automatic I.D. News, Sep., 1986.

(List continued on next page.)

OTHER PUBLICATIONS

The Argo FMS 1330 "Report Card" marketing brochure describing the Argo Fleet Management Systems.

"5th Wheel" catalog sheet by Structural Instrumentation, Inc.

Advertisement in Chillon's IAN Instrumentation & Control News, vol. 33, No. 12, Burr-Brown's "Multibus"-compatible Analog Input Board, Dec., 1985.

E-Z Trac TM Truck Tracking System © 1984—Computer program written in COBOL which is a unique tracking system designed specifically for the ready mixed concrete industry.

Article by Speedcall Corporation entitled "Fleet Dispatch and Control Systems", copyright 1984.

A brochure entitled "Automatic Truck Dispatching and Identification System", Gould, Inc., Information Identification Division, Sep., 1980.

A brochure for Motorola's "Automatic Vehicle Location System"; copyright 1984.

Marcelo, Ben; "Selecting the Right Automatic Vehicle Location System"; Magnavox (no date).

Brochure entitled "The Answer to Increased Dispatch Efficiency," by The Alkon Corp., Columbus, Ohio; ©1985.

Harrington, L. H.; "Money-Saving Software," Traffic Management, Cahners Publishing Company, Apr. 1986.

Himebaugh, A. E.; "Computer-Based Truck Dispatching in the Tyrone Mine," Mining Congress Journal, Nov. 1980; pp. 16–21.

Riley et al., "Vehicle Tracking System for Salem, Ore. Police Dept." The Institute of Navigation, proceedings of the National Technical Meeting, 1/21–23/86; pp. 89–94.

Kaneno et al., "Construction Vehicle ID Transmitter for Carriage Data Collection and Management System," SAE Technical Paper Series, Int'l. Congress and Expo., Detroit, Mich.; Feb. 25–Mar. 1, 1985; pp. 29–41.

Cotton et al., "Toronto Transit Commission Communications and Information System Evaluation of Operation Tests," 30th Annual Conference of the IEEE Vehicular Technology Society; Bohn Printing Co., Utica, Mich.; Sep. 15–17, 1980.

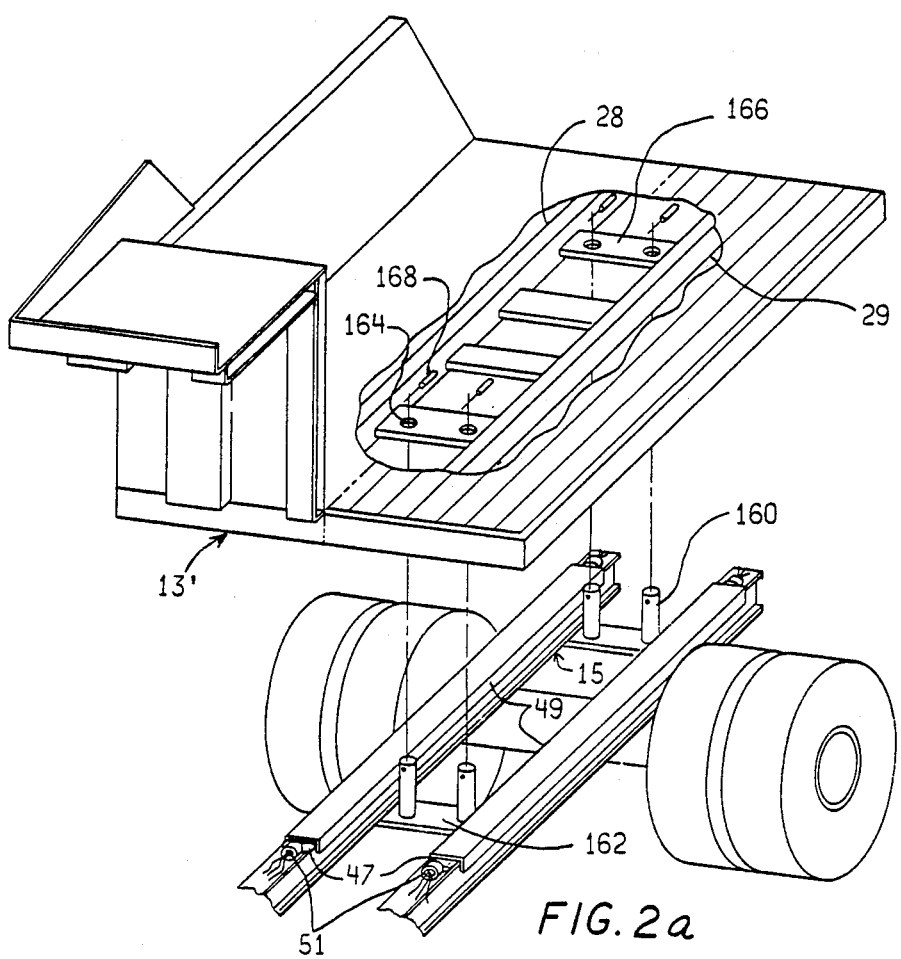
FIG. 2a
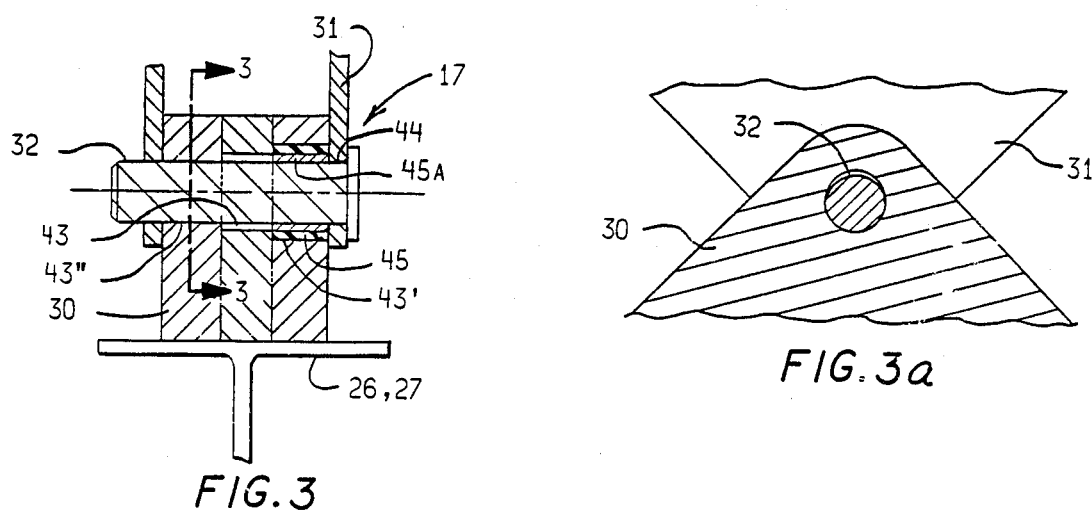
FIG. 3
FIG. 3a

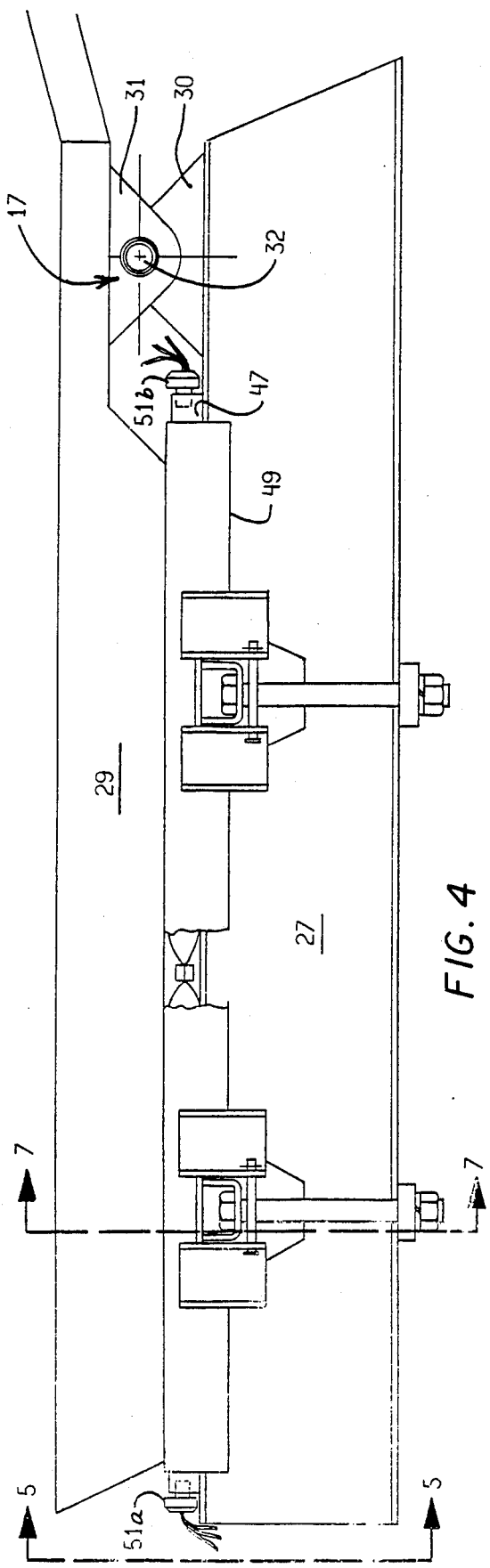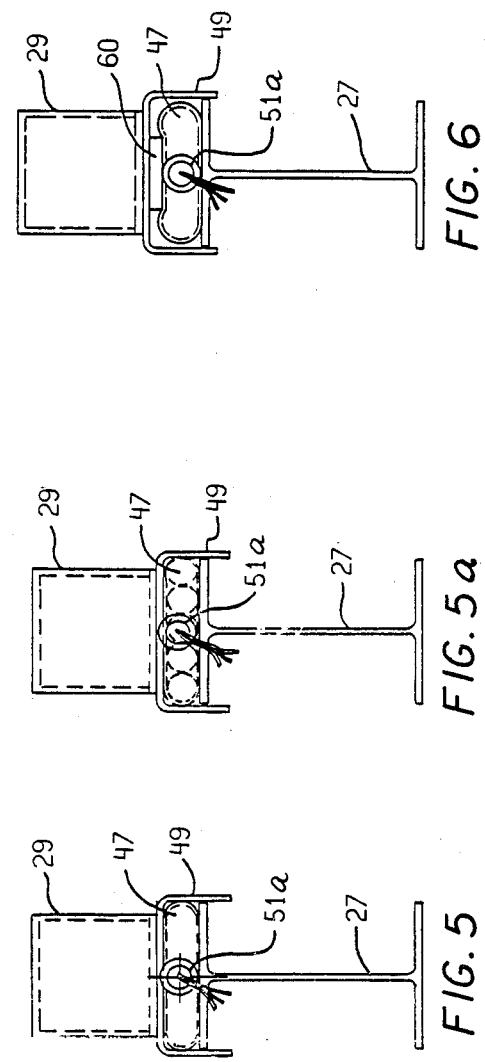

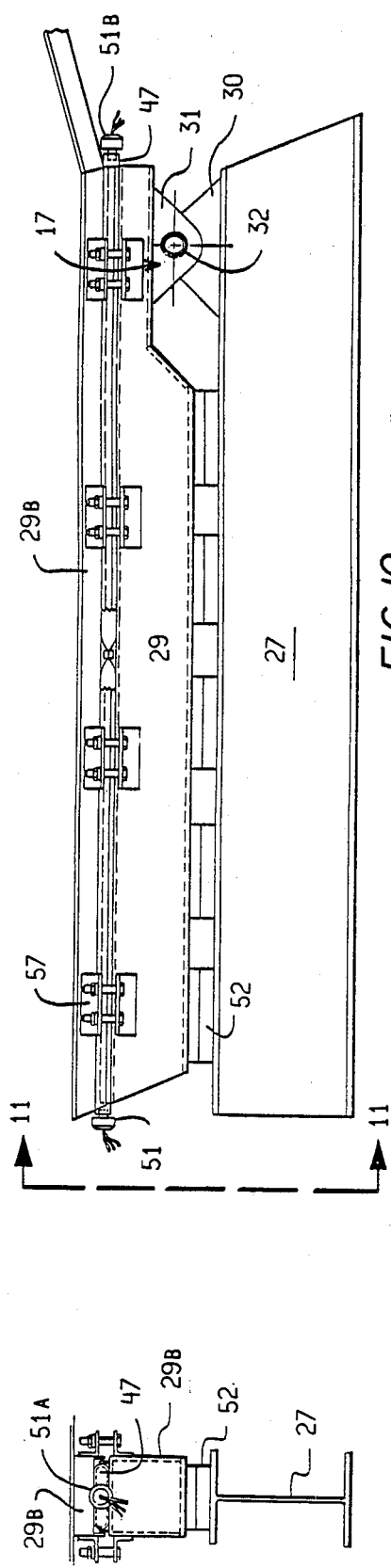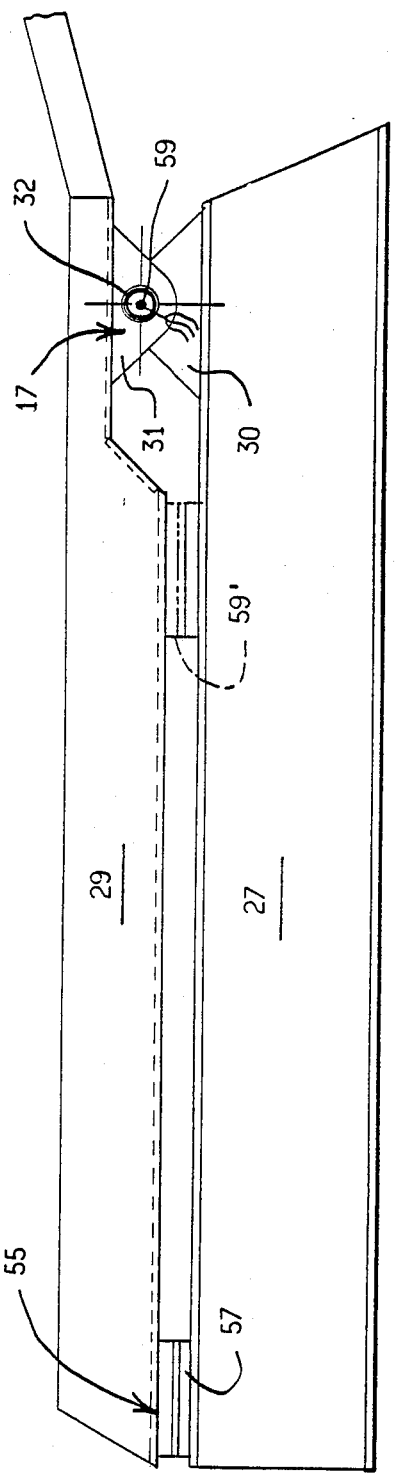

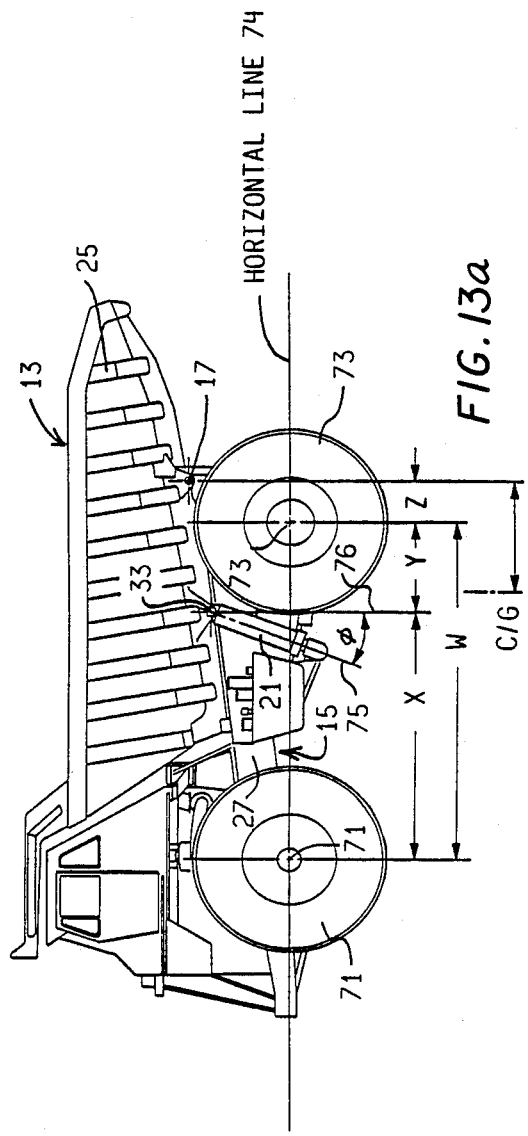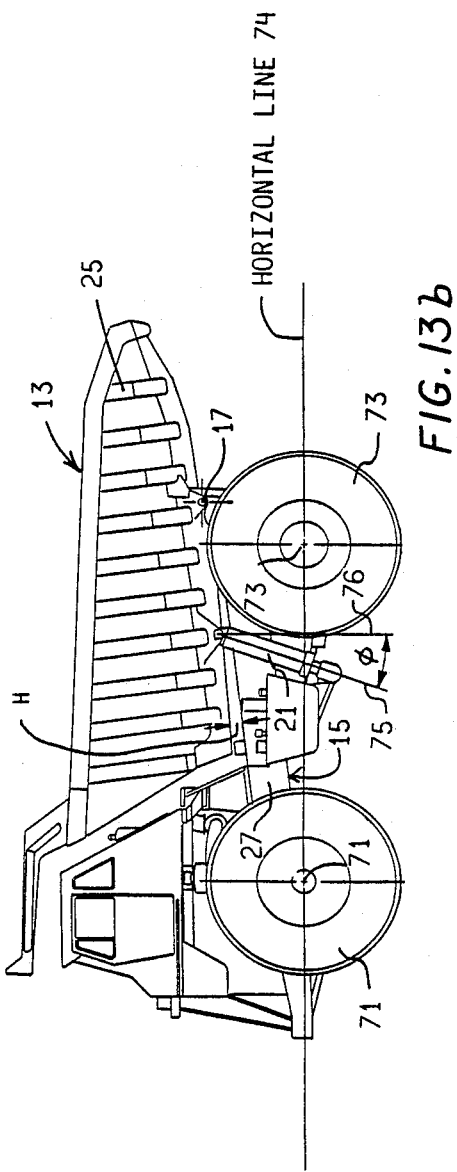

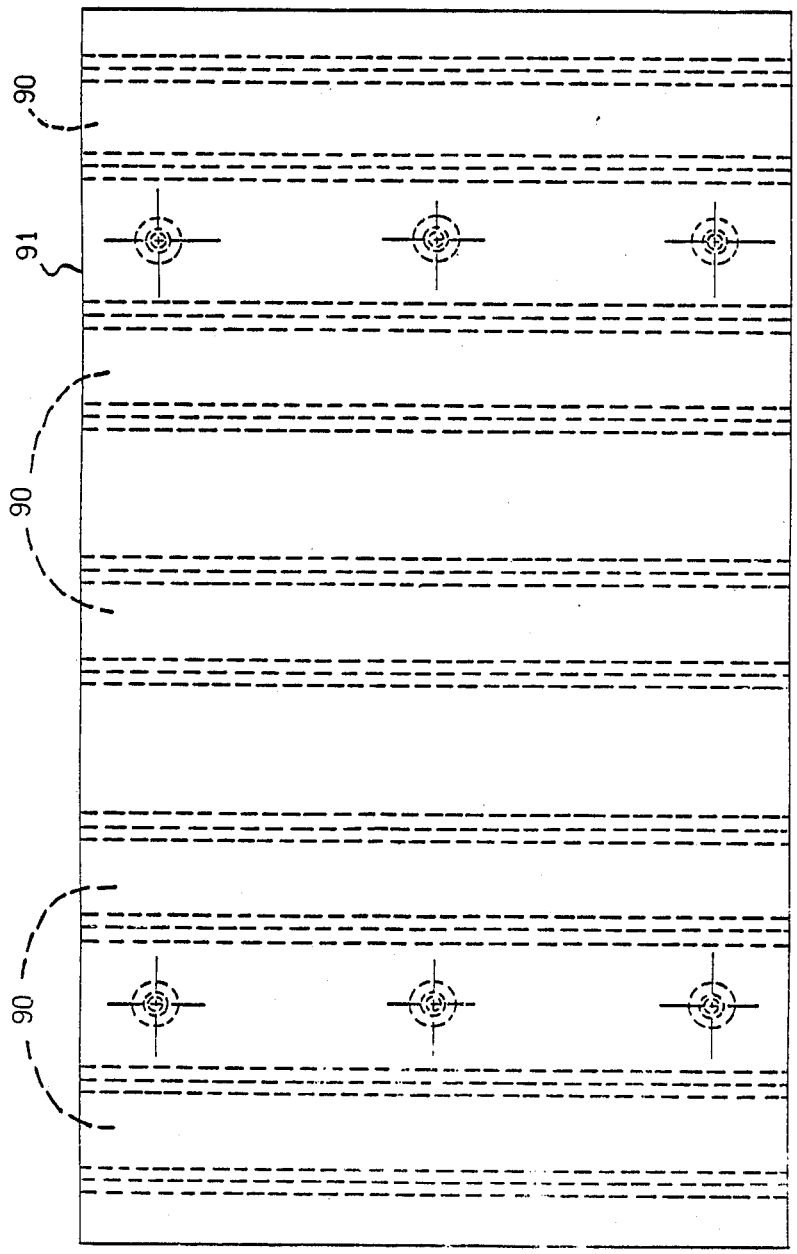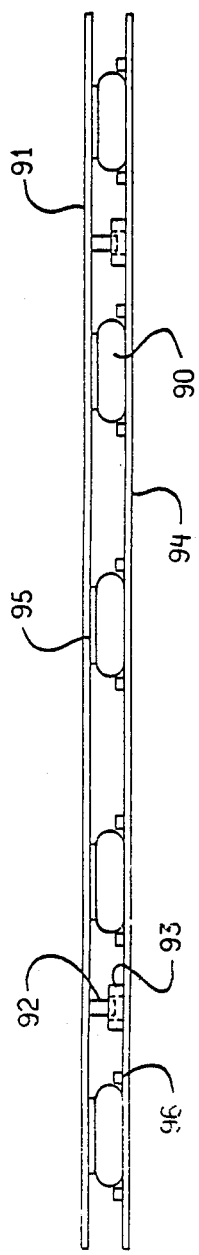

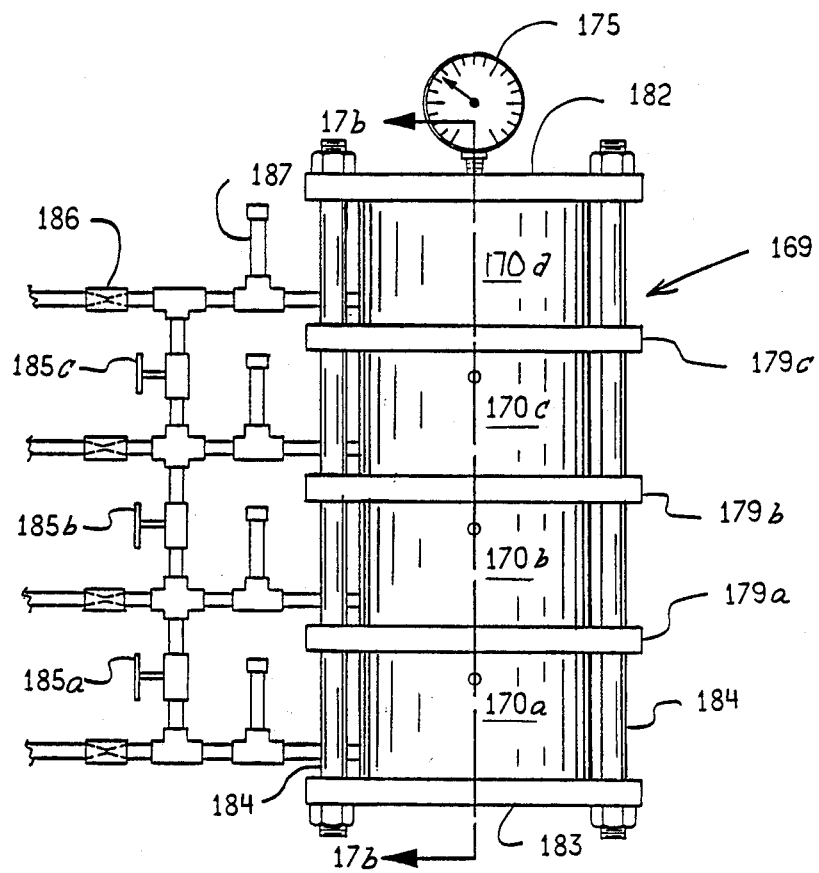
FIG. 17a
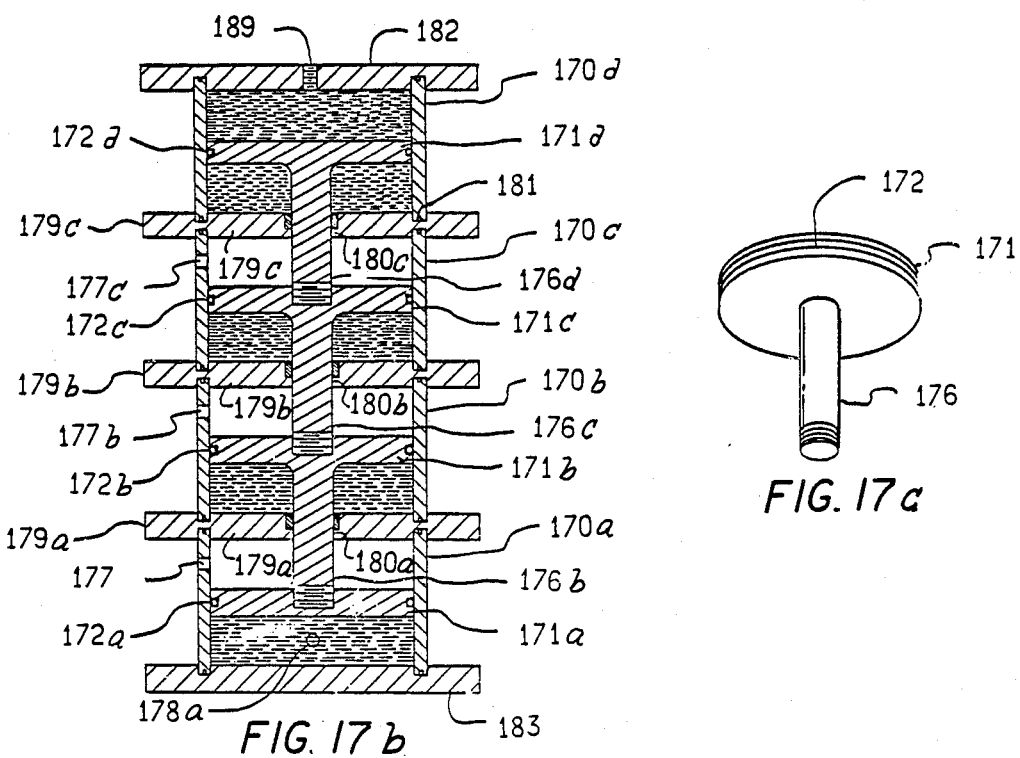
FIG. 17b
FIG. 17c

OPERATOR NO.
CHANGE SUBROUTINE (ENTER FROM 277)

669 — READ TIME

670 — TIME OF NEW OPERATOR TAKING CONTROL = READ TIME

671 — TIME UNDER OPERATOR CONTROL = TIME OF NEW OPERATOR TAKING CONTROL − TIME OF OLD OPERATOR TAKING CONTROL

672 — TIME OF OLD OPERATOR TAKING CONTROL = TIME OF NEW OPERATOR TAKING CONTROL

673 — AVG. WEIGHT OF BUCKET = $\dfrac{\text{TOTAL TONNAGE HAULED (STEP 1000)}}{\text{TOTAL NO. OF BUCKETS (STEP 790)}}$

674 — AVG. WEIGHT OF LOAD = $\dfrac{\text{TOTAL TONNAGE HAULED (STEP 1000)}}{\text{TOTAL NO. OF LOADS (STEP 1030)}}$

675 — AVG. NO. OF SPIKES PER LOAD = $\dfrac{\text{TOTAL NO. OF SPIKES (STEP 1040)}}{\text{TOTAL NO. OF LOADS (STEP 1030)}}$

676 — T·MPH = $\dfrac{\text{RUNNING TOTAL (TON · MILE) (STEP 435)}}{\text{TIME UNDER OPERATOR CONTROL (STEP 671)}}$

677 — AVG. HAUL CYCLE TIME = $\dfrac{\text{TIME UNDER OPERATOR CONTROL (STEP 671)}}{\text{TOTAL NO. OF LOADS (STEP 1030)}}$

678 — BODY-UP DISTANCE PER BODY-UP LOAD = $\dfrac{\text{TOTAL BODY-UP DISTANCE (STEP 522)}}{\text{TOTAL NO. OF BODY-UP LOADS (STEP 525)}}$

680 — AVG. NO. OF BUCKETS PER LOAD = $\dfrac{\text{TOTAL NO. OF BUCKETS (STEP 790)}}{\text{TOTAL NO. OF LOADS (STEP 1030)}}$

690 — AVG. TIME BETWEEN BUCKETS = $\dfrac{\text{TOTAL ELAPSED LOADING TIME (STEP 850)}}{\text{TOTAL NO. OF BUCKETS−1 (STEP 790)}}$

700 — AVG. MAX. ELAPSED TIME BETWEEN BUCKETS = $\dfrac{\text{TOTAL MAX. ELAPSED TIME BETWEEN BUCKETS (STEP 1020)}}{\text{TOTAL NO. OF LOADS (STEP 1030)}}$

710 — PRINT
1. AVG. WEIGHT OF BUCKET
2. AVG. NO. OF BUCKETS PER LOAD
3. AVG. TIME BETWEEN BUCKETS
4. AVG. MAX ELAPSED TIME BETWEEN BUCKETS
5. AVG. NO. OF SPIKES PER LOAD
6. TOTAL TONNAGE HAULED
7. TOTAL NO. OF LOADS
8. AVG. WEIGHT OF LOAD
9. AVG. HAUL CYCLE TIME
10. TIME UNDER OPERATOR CONTROL
11. REAL TIME OF OPERATOR NO. CHANGE
    A) OLD OPERATOR NO.
    B) NEW OPERATOR NO.
12. BODY-UP DISTANCE PER BODY-UP LOAD
13. TOTAL DISTANCE DRIVEN (RETURN TO 280)

FIG. 18i

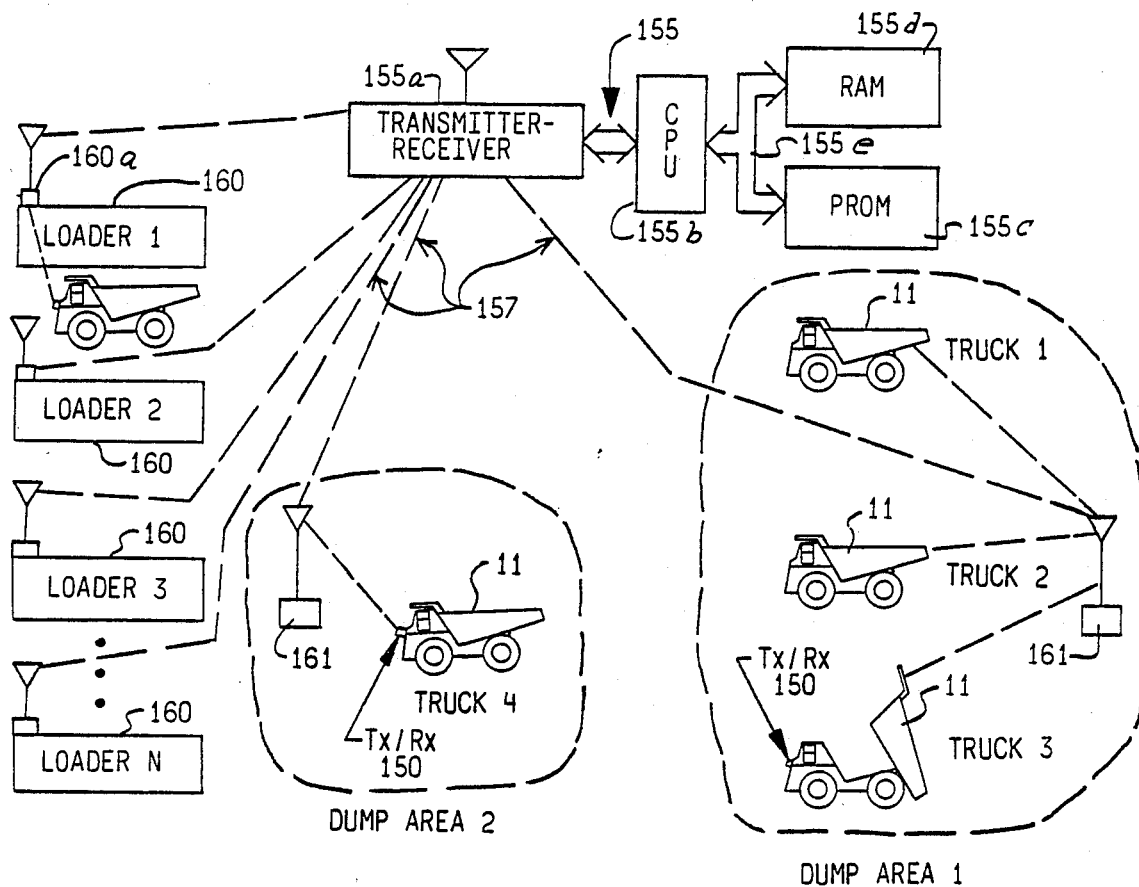
FIG. 19a
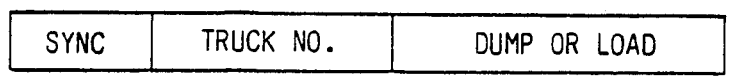
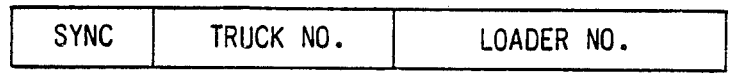
FIG. 19b
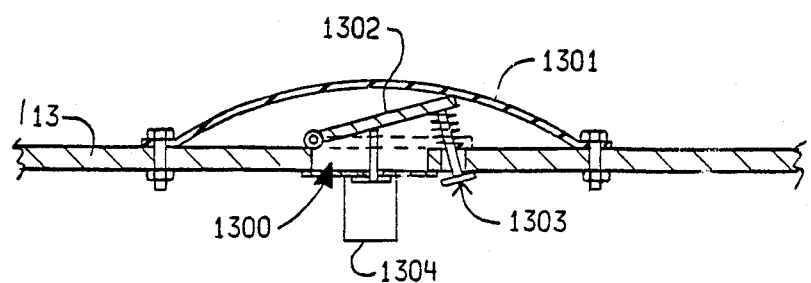
FIG. 19c

APPARATUS AND METHOD RESPONSIVE TO THE ON-BOARD MEASURING OF THE LOAD CARRIED BY A TRUCK BODY

This application is a continuation-in-part application of U.S. Ser. No. 604,739 filed 4-27-84, now U.S. Pat. No. 4,630,227.

TECHNICAL FIELD

The invention generally relates to the measuring of the load of a vehicle and, more particularly, to the measuring and acquisition of data indicative of loading conditions for a hauling vehicle.

BACKGROUND

Often off-road trucks are subjected during their routine use to weight loads which differ greatly because of different material density and/or the ability of some material to more tightly pack when loaded into the truck body. As a result, truck bodies which are always filled to their full volume capacity may carry weight loads which exceed the weight capacity of the truck. Repeated occurrences of overloading result in the premature deterioration of the structural integrity of the truck, thus requiring repair or replacement of parts before anticipated. In order to avoid the damage caused by overloading, the truck body can be filled to a volume which assures the truck is not overloaded even for the most dense material. Although underloading may prevent the premature deterioration of the structural integrity of the truck, it sacrifices the truck's load-hauling efficiency. Therefore, an off-road truck which is expensive to operate becomes even more expensive to operate when it is underloaded. Accordingly, there is a need to precisely measure the load carried by an off-road truck. This need has stimulated the development of on-board weighing devices that monitor and measure the truck's load.

Of course, in order to measure the on-board weight of a load carried by a truck, the truck must necessarily incorporate load sensors into its frame and/or body. In a dump-body truck, the body is movable on the truck's frame between lowered and raised positions. To provide for this movement, the body is usually attached to the frame only by a pair of hinge assemblies and a pair of hydraulic cylinders. In one common construction of a dump-body truck, when the truck body is in its lowered position, its entire weight is communicated to the truck frame along a cushioned interface between the truck's frame and body. In this lowered position of the truck body, the hinge assemblies and hydraulic cylinders do not support the weight of the truck body and, therefore, they do not transfer any of the body's weight to the truck frame. By freeing the hinge assemblies and the hydraulic cylinders from the weight of the lowered truck body, the amount of stress on these areas is reduced and, accordingly, their useful life is extended.

Traditionally, in order to provide an on-board weighing device for this type of a dump-body truck, load sensors are incorporated into the hinge assemblies and the hydraulic cylinders. Accordingly, in order to measure the load, the truck body must be lifted from its lowered position by the hydraulic cylinders so that the weight of the load is transferred to the frame through the cylinders and the hinge assemblies. Although the accuracy of the load measurements obtained from load sensors associated with the hydraulic cylinders and the hinge assemblies is satisfactory, the structural integrity of the truck may be degraded by modifications of the hinge assemblies and hydraulic cylinders required to incorporate the load sensors which cause concentration of the load on the frame. Moreover, the impact of falling material onto the bed of the truck is especially severe for the frame of the truck when the body is lifted slightly from its lowered position.

More important than the structural disadvantage of on-board weighing devices which incorporate load sensors in the truck's hinge assemblies and hydraulic cylinders is the disadvantage of requiring the truck's body to be lifted off the frame in order to obtain a weight reading. Because this requirement consumes valuable time otherwise available for loading, hauling, and unloading and because of the concentration of the load on the frame, the truck operator is discouraged from weighing the truck load; it is faster to approximate the load. Since the on-board weighing device interferes with an efficient and smooth hauling operation, there is a tendency to not use the weighing device. Therefore, the advantages of an on-board weighing devices in dump-body trucks have not been fully realized. Also, the requirement of lifting the truck body off the frame in order to obtain a weight measurement prevents continuous or periodic monitoring of the body's weight.

In order to continuously monitor and measure the load carried by a dump-body truck, it is known to use pressure gauges or similar type load sensors in the truck's suspension. Usually, in these types of weighing devices, the fluid pressure within a hydraulic suspension cylinder is sensed. Because of the relatively short stroke of the cylinder and the relatively large amount of frictional resistance to the cylinder's movement (the front cylinders normally also serve as the front axle spindles), the pressure reading is not a satisfactorily accurate indication of the truck's weight. In addition, the modification of the truck's suspension to include load sensors opens the possibility of dangerously degrading the suspension system.

SUMMARY OF THE INVENTION

It is the general object of the invention to provide an apparatus and method for accurately measuring loading and hauling parameters based on the weight of material carried by a truck body. In this connection, it is a object of the invention to reliably measure and record loading and hauling parameters of the truck body in order to increase the efficiency of loading and hauling and also to provide a permanent record of truck use and the conditions under which it operated.

It is an important object of the invention to provide an apparatus and method for measuring and indicating locating and hauling parameters of the truck body in order to provide an archive indicative of the type and degrees of use the truck has experienced.

It is another object of the invention to extend the usable life of a dump-body truck by using loading and hauling parameters to prevent the unnecessary deterioration of the structural integrity of the truck resulting from weight overloading.

It is a further object of the invention to eliminate the inefficient hauling of loads by a dump-body truck which results from the under-utilization of the full weight capacity of the truck.

Other objects and advantages of the invention will be apparent from the following detailed description and the accompanying drawings.

Briefly, in accordance with the invention, an on-board weighing device is provided for a dump-body vehicle which continuously monitors the weight of the body while it is in its lowered position on the frame of the vehicle. In its lowered position, the body rests on the on-board weighing device such that the device forms an interface between the body and frame of the vehicle. A sensor processing unit mounted on the vehicle is responsive to signals from the on-board weighing device which are indicative of the weight of the body. From the load signals of the on-board weighing device, the sensor processing unit forms a data base from which the vehicle's hauling performance is measured. In addition, load signals from the on-board weighing device are processed by the sensor processing unit and the resulting data is transmitted from each vehicle to a central processor wherein a second data base is formed. From this second data base, the central processor transmits control signals to selected vehicles in order to control the movement of the vehicles between load and dump sites.

BRIEF DESCRIPTION OF THE DRAWINGS

FIG. 2a is an exploded perspective view of a truck having a stationary body and supported on a frame incorporating the on-board weighing device according to the invention;

FIG. 3 is a cross-sectional view of one of the truck body hinge assemblies joining the truck body and frame, taken along the line 3—3 in FIG. 2 and showing three alternative pivot pin assemblies offered by various truck manufacturers;

FIG. 3a is a sectional view of the truck hinge assembly taken along the line 3a—3a in FIG. 3 and showing a suggested modification to one of the pivot pin assemblies of FIG. 3 in order to make the hinge assembly "free-floating";

FIG. 4 is a side view of the preferred embodiment of the on-board weighing device according to the invention, taken substantially along the line 4—4 in FIG. 2;

FIG. 5 is a front view of the on-board weighing device according to a first alternative embodiment of the invention, taken along the line 5—5 in FIG. 4;

FIG. 5a is a front view of a second alternative embodiment for the on-board weighing device according to the invention, taken along the line 5—5 in FIG. 4;

FIG. 6 is a front view of the preferred embodiment for the on-board weighing device according to the invention, taken along the line 5—5 in FIG. 4;

FIG. 10 is a side view taken along the line 4—4 in FIG. 2 showing a first alternative embodiment of the on-board weighing device according to the invention;

FIG. 11 is an end view of the first alternative embodiment of the on-board weighing device, taken along the line 11—11 in FIG. 10;

FIG. 12 is a side view taken along the line 4—4 in FIG. 2 showing a second alternative embodiment of the on-board weighing device according to the invention;

FIG. 13a is a side view of a heavy duty, off-road truck illustrating the relative dimensions of the truck used by the on-board weighing device of the invention to measure front and rear axial loads;

FIG. 13b is a side view of the heavy duty, off-road truck of FIG. 13a with the truck body slightly raised by the hoist cylinders in order for the on-board weighing device to complete a determination of front and rear axial loads;

FIGS. 15a and 15b are plan and side views, respectively, for a platform scale incorporating the on-board weighing device of the invention;

FIG. 17a is a plan view of a mechanical processing system for receiving signals from the on-board weighing device in lieu of the electronic system of FIG. 16;

FIG. 17b is a cross-sectional view of the mechanical processing system taken along the lines 17b—17b in FIG. 17a;

FIG. 17c is a perspective view of the piston subassembly of the mechanical processing system;

FIGS. 19a and 19b are schematic diagrams illustrating a truck distribution system utilizing the weight data received from the on-board weighing device of the invention;

FIG. 19c is a enlarged, partial sectional view of the truck body showing an alternative embodiment for sensing the presence of a load for use in connection with the truck distribution system of FIGS. 19a and 19b.

While the invention will be described in connection with a preferred embodiment and certain alternative embodiments, it will be understood that it is not intended to limit the invention to those particular embodiments. On the contrary, it is intended to cover all alternatives and equivalents as may be included within the spirit and scope of the invention as defined by the appended claims.

DESCRIPTION OF THE PREFERRED EMBODIMENT

Figure 1:
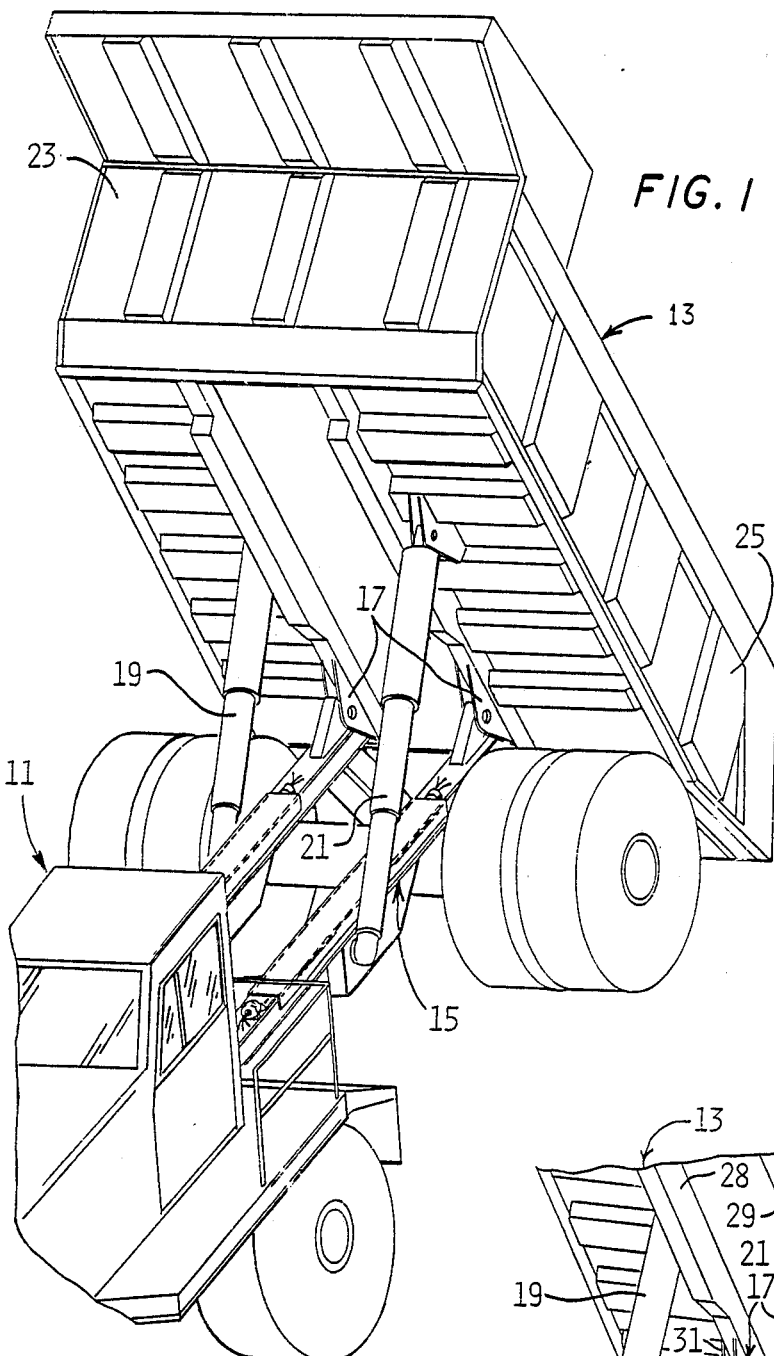
FIG. 1 is an elevated perspective view of a dump-body truck with the truck body in a raised or dump position so as to expose the on-board weighing device according to the preferred embodiment of the invention.

Turning to the drawings, and referring first to FIG. 1, an exemplary off-road truck 11 includes a truck body 13 which is hinged to the truck frame 15 at hinge assemblies 17. By controlling the extension of telescoping hydraulic cylinders 19 and 21, the truck body 13 is pivoted between a fully inclined or dump position and a lowered or rest position. One end of each hydraulic cylinder 19 and 21 is fastened to a hinge assembly located on the bottom of the truck body 13. The opposing end of each cylinder 19 and 21 is fastened to an articulation on the truck frame 15. Structurally, the truck body 13 consists of steel panels 23, which form the shape of the body, and beams 25 which provide the body's structural framework. Since other dump-body trucks may also use the on-board weighing device of this invention, the truck in FIG. 1 is intended as an exemplary truck frame and truck body utilized in connection with the invention.

Often, off-road trucks, such as the one shown in FIG. 1, are very large. For instance, it is not uncommon for the truck's tire diameter to be as great as the height of an average man. Accordingly, the tremendous size of these trucks makes them expensive to operate and repair. Since these trucks represent both a large capital investment and a large operating expense, preventing both overloading of the truck body and under-utilization of the truck's load capacity (i.e., underloading) are important considerations in insuring the truck is operated in the most profitable manner. In particular, if the truck is overloaded it will tend to have a shorter usable life because of the excessive wear caused by the overloading. On the other hand, if the truck is underloaded, the truck must be operated over a longer period of time, thereby consuming more fuel and wearing the truck's parts to a greater degree. Therefore, the ability to accurately measure the truck's load is important to the efficient operation of large off-road trucks. Also, since these off-road, heavy duty trucks are extremely expensive to operate, loading and hauling parameters indicative of truck performance can be of great economic value by using the parameters to discover areas of the performance which may be improved.

Typically, a shovel or front-end loader is used to fill the truck body. With a front-end loader, material is loaded into the truck body 13 by a bucket located at the end of an arm of the loader wherein the arm controls the movement of the bucket. Typically, the truck body has a weight and volume capacity such that a plurality of loaded buckets must dump material into the truck body 13. Even though the operator of the front-end loader is at an elevated level when operating the loader, he or she may not be in a position to see over the edge of the truck body to determine the level of loading. Consequently, it is difficult to exactly control the amount of material loaded into the truck body. Moreover, the density of the material loaded into the truck body often varies over a significant range; therefore, even if it is possible to accurately determine a certain level of loading, a particular level is only a reliable indication of a weight limit when the material is homogeneous and its density is known.

Figure 2:
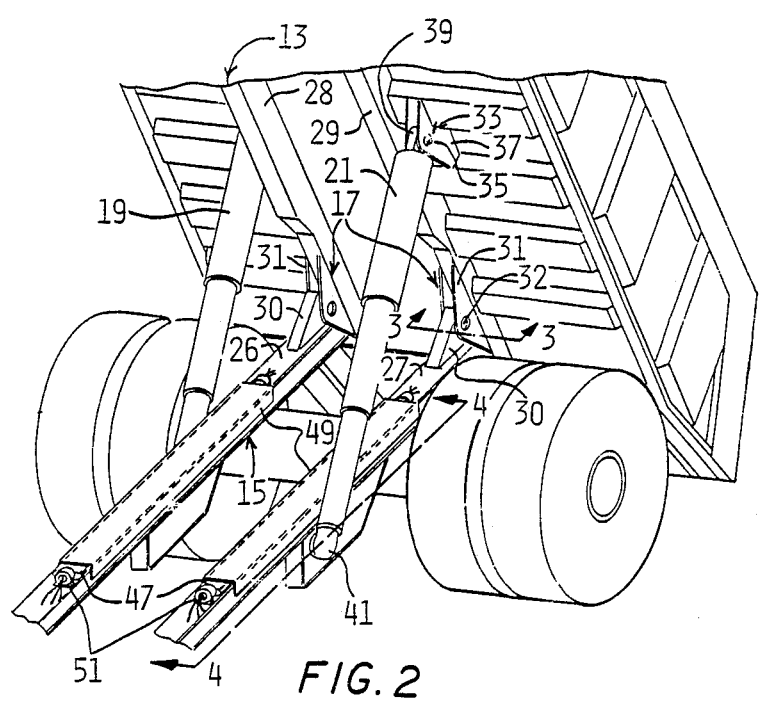
FIG. 2 is an enlarged elevated perspective view of the dump-body truck in FIG. 1 that more clearly shows the on-board weighing device according to the preferred embodiment of the invention.

As most clearly shown in FIG. 2 the truck frame 15 is composed of two parallel beams 26 and 27 connected by transverse beams (not shown) to form a support surface for the truck body 13 over the rear axle of the truck. In order to provide a pivot axis for the truck body 13, each of the hinge assemblies 17 integrally connects one end of each of the parallel beams 26 and 27 to one of beams 28 and 29 on the underside of the truck body. In its lowered position, the beams 28 and 29 of the truck body 13 mate with the beams 26 and 27 of the truck frame 15. As will be more fully explained hereinafter, when the truck body 13 is in its lowered position, the entire weight of the truck body and its load is transferred to the truck frame 15 by way of the interface between the beams 26 and 27 of the frame and the beams 28 and 29 of the body. As mentioned above, trucks are different design than that shown as an exemplary embodiment may use the invention. Some truck designs have beams 26 and 27 which are angled with respect to the ground. These types of trucks may also be equipped with the invention if suitable precautions are taken against slippage of the apparatus on the beams and to ensure proper calibration.

Each of the hinge assemblies 17 includes first and second complementary hinge members 30 and 31 which are secured to the frame 15 and body 13, respectively, and interconnected by a pivot pin 32. The hydraulic cylinders 19 and 21 and the truck body 13 are interconnected by hinge assemblies 33. (Only one of the hinge assemblies 33 can be seen in the view of FIGS. 1 and 2). Hoist pins 35 interconnect the complimentary hinge members 37 and 39 of the hinge assemblies 33. Although, as the cylinders extend, the hinge assemblies 33 accommodate the relative repositioning between the hydraulic cylinders 19 and 21 and the truck body 13, articulating assemblies 41 (only one is shown in FIGS. 1 and 2), which connect the cylinders to the truck frame 15, allow a similar relative repositioning between the hydraulic cylinders and the truck frame 15.

Ordinarily, cushioning suport materials such as rubber pads (not shown) are added along the length of the two parallel beams 26 and 27 of the truck frame 15 so when the truck body 13 is in its lowered position the material provides a cushioned interface between the beams 28 and 29 of the truck body and the beams 26 and 27 of the truck frame. In order to evenly distribute the weight of the truck body 13 along the length of the frame 15 and thereby provide the best possible weight distribution for the frame, the cushioning support material is characterized by a thickness dimension which, as explained hereinafter, cooperates with the hinge assemblies 17 when the truck body is moved to its lowered position. The cooperation of the cushioning support material and the hinge assemblies 17 frees the assemblies from supporting any of the truck body's weight when the body is in its lowered position.

Referring to FIG. 4, in accordance with the invention, the cushioning support materials mounted by the manufacturer on the parallel beams 26 and 27 of the truck frame 15 are replaced by lengths of fluid-filled tubings 47 that are laid along the lengths of the parallel beams to provide, when combined with pressure sensors, an on-board weighing device which accurately measures the weight of the truck body 13 while it is in its lowered position. Each of the tubings 47 is capped by an inverted U-shaped metallic shield 49 to protect the tubing at its interface with the truck body 13. The inverted U-shaped shields which protect the tubing are free to move vertically on the parallel beams 26 and 27. As illustrated in FIG. 4, each of the fluid-filled tubings 47 is divided into fore and aft sections which may either be created by clamping the center of one long tubing or providing two separate sections of tubing. At the ends of each of the fluid-filled tubings 47 are pressure sensors 51a–d which measure the liquid pressure within the tubing (which may be remote mounted).

Because the on-board weighing device offers a reliable indication of the weight of a dump body while the body is in its lowered or resting position, weight data may be accurately and continuously monitored and processed. Applicant believes such an ability was previously unavailable for dump-body trucks. Based on this ability, the on-board weighing device provides vehicle information features which, to the best of applicant's knowledge, were previously unavailable. Limited only by the sensitivity of the sensors used as the pressure sensors 51, the on-board weighing device may provide a highly accurate indication (e.g., 0.25% or 0.5% error) of the load carried by an off-road, heavy-duty truck. An example of a particular pressure transducer which may be used for the pressure sensors 51 is the Heise Series 620 Pressure Transducer, manufactured by the Instruments Division of Dresser Industries, Newton, Conn. Another example of a pressure sensor suitable for use in connection with the invention is the AMETEK LVDT pressure transducer, manufactured by Ametek of Sellersville, Pa. The following paragraphs characterize the general and particular aspects of the invention which are described in detail in later sections of this description.

Referring to FIG. 2a, a fixed body 13' fitted to the frame 15 of the truck 11 may also utilize the on-board weighing system of the invention. The particular means for coupling the frame 15 to the body 13' in FIG. 2a allows the full weight of the body to rest upon the tubings 47. The coupling means, pins 160 supported by cross members 162 of the frame 15 and cooperating bores 164 in cross members 166, prevent fore-and-aft or side-to-side movement of the body relative to the frame while, at the same time, allowing free vertical movement of the body 13'. In order to prevent the body 13' from accidentally freeing itself from the body by bouncing high off the frame, a cotter pin or similar retainer means 168 is secured at the top of the pins 160 in order to limit the vertical movement of the body. As indicated by FIG. 2a, the stationary truck body 13' may in style be a dump-body, (the leftmost portion of the body 13'), a flatbed body (the rightmost portion of the body 13'), or it may be other known body types which suitably function as stationary bodies.

Figure 2B:
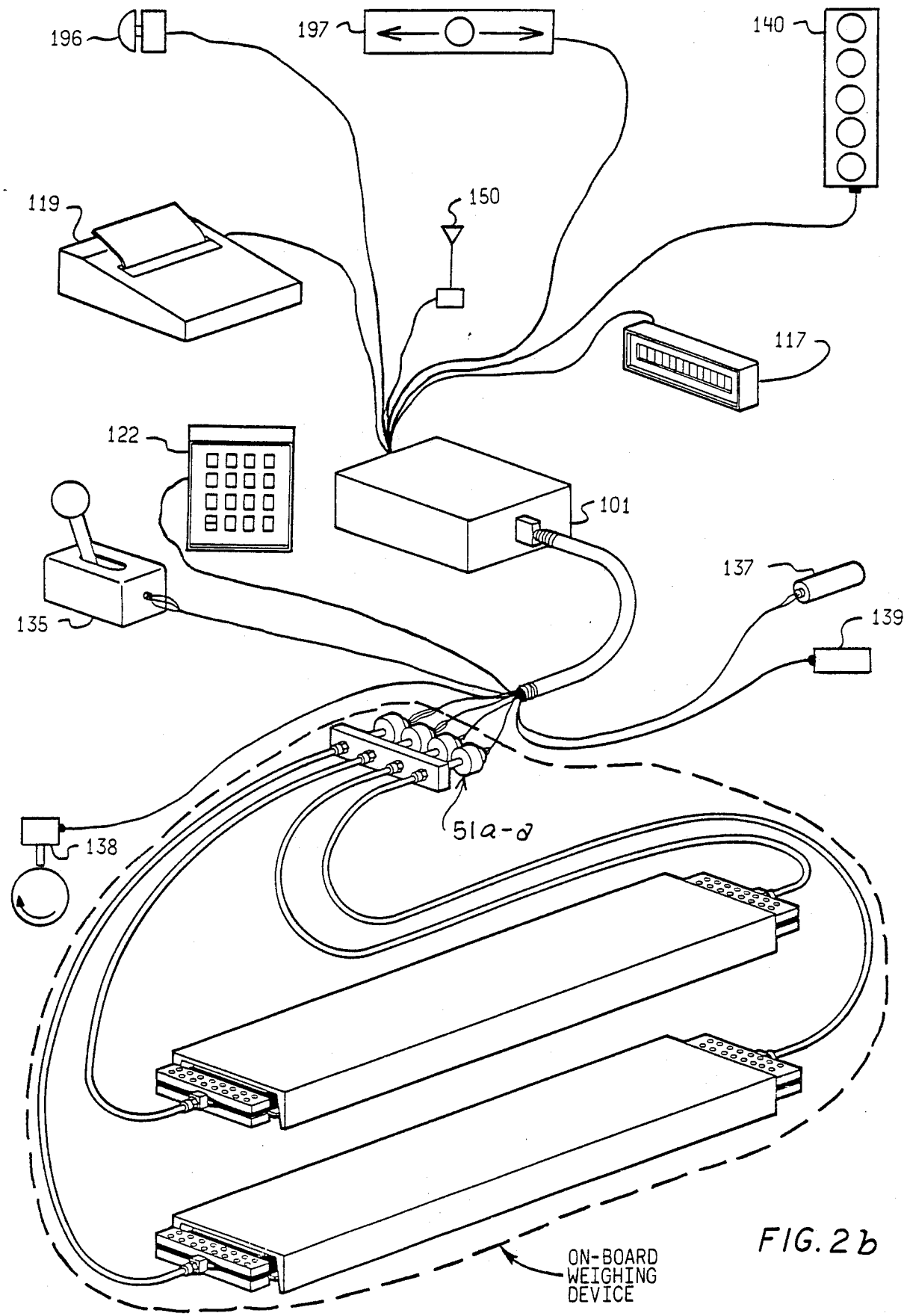
FIG. 2b is a systems diagram of an on-board system according to the invention for monitoring, storing and analyzing truck parameters which includes the on-board weighing device as well as other sensor inputs.

Referring to FIG. 2b, in addition, the on-board weighing device includes a processor means 101 responsive to signals from the sensor 51a–d. By providing an on-board processing means, the raw pressure data from the on-board weighing device can be monitored and converted to useful weight information for the real-time control of the truck by the operator. As a complement to the pressure data, the on-board system illustrated in FIG. 2b includes other input data source with provide raw data to the processor means 101. As will be explained more fully hereinafter, useful operator information is supplied via outputs from the processor means 101 in response to the pressure data from the on-board weighing device and its complementary sensors.

The complementary systems in ths system include, but are not limited to, a hoist cylinder pressure gauge 139, a distance sensor 138, a forward-neutral-reverse (F-N-R) switch 135 and a dump switch 137. A keypad 122 is used by the operator to request data and to enter an operator number which identifies himself to the system. Examples of other possible complementary input devices are fuel consumption flow meters and slope transducers for detecting the pitch or grade of the road.

Various on-board outputs controlled by the processor means 101 provide the truck operator with indications of truck operating conditions in response to the raw data from the on-board weighing device and complementary sensors. Specifically, a printer 119 provides a hard copy output for analysis by the truck operator or management personnel. An audio output 196 alerts the operator to situations requiring immediate attention. Similarly, display 197 tells the operator of a load imbalance which requires correction. In order to provide the operator with non-permanent data information, such as current weight, a digital dispaly 117 is provided. Stacked lights 140 are preferably mounted on the side of the truck in order to give the operator of the loader equipment an idea of the remaining capacity in the truck. Finally, a transceiver 150 is provided in order to download accumulated data to a remote site for construction of historical files. The cooperation and interaction of the foregoing inputs and outputs in FIG. 2b will be set forth in detail hereinafter. Before proceeding to the specific description of this cooperation and interaction, a summarized overview will be presented. Following this, descriptions of subassemblies for the on-board weighing device will be described in detail and alternative embodiments of the device will be briefly mentioned before proceeding to a detailed discussion of data manipulation.

In accordance with the invention, an apparatus for processing data derived from the weight of the load carried by the body of a truck includes a processor means 101 for receiving data from the pressure sensors 51 and, in response thereto, detecting a change in the weight of the truck body and formulating data indicative of truck condition in response to changes in pressure data from the pressure sensors. Pressure data and indications of changes in the data are used by the processing means 101 to establish a data base from which various truck parameters may be monitored either by the processor means or by a remote stationary processor (not shown) radio linked to the on-board processor by way of transceiver 150.

In accordance with one particular aspect of the invention, the processor means 101 cooperates with the on-board weighing device for determining the average weight of the material carried by a bucket of a front-end loader and displaying information to the truck or loader operator on the stacked display 140 indicative of whether another full bucket can be loaded into the truck body 13 without overloading the truck. If another full bucket cannot be loaded into the truck, a display indicates to the truck or loader operator the fraction of a loaded bucket which can be safely added to the truck body. By providing the foregoing means and functions, the truck 11 can be safely and regularly loaded to its maximum hauling weight without risking damage to the truck by exceeding its weight limit.

In connection with the foregoing, the processor means includes means for detecting an overload condition by comparing the actual weight of the truck body with a predetermined maximum weight. If the weight of the truck body exceeds the predetermined maximum weight, an overload condition is recorded and indicated to the truck operator on digital display 117.

In accordance with another particular aspect of the invention, the on-board weighing device cooperates with a pressure sensor 139 in the hydraulic line of the hydraulic cylinders 19 and/or 21 to provide data to the processor means 101 for establishing the relative weight distribution of the truck body over the front and rear axles. The processor means 101 processes the pressure readings from the on-board weighing device and pressure readings from the sensor 139 of the hydraulic cylinders 19 and/or 21 in order to provide the truck operator with accurate values for front and rear axle loads.

In accordance with yet another particular aspect of the invention, the on-board weighing device includes means for providing a plurality of pressure readings fore and aft of the truck body 13, and, in addition, side to side of the truck body. The processor means 101 compares the fore and aft or side-to-side distributions of load in order to warn the truck operator at display 197 or audio output 196 of imbalanced conditions which may harm the truck.

In accordance with still another particular aspect of the invention, the on-board weighing device cooperates with distance sensor 138 to provide data to the processor means 101 in order to give an indication of tire wear in units of tons.miles/hour which is commonly used in the heavy duty truck industry as an indication of the loading capability of the tire. This unit of measurement has been established as a maximum tire loading and is indicative of tire wear for tires of heavy duty, off-road trucks. Tire wear is important since, for many truck users, the highest hourly operating cost after the operator himself is the cost of tire replacement. For each haul cycle segment (i.e., load to dump site or vice versa), the processor means (1) reads the pressure reading from the on-board weighing device which corresponds to the weight of the body 13 and adds to that weight the known weight of the truck, (2) reads the hauling distance of the truck 11 from the distance sensor 138 and (3) reads the hauling time of the truck. This collected data is downloaded to a remote central station for calculation of ton.mile per hour for display to management personnel. In a related aspect of the invention, the processor means is responsive to the pressure data from the on-board weighing device and the data from the distance sensor to provide an indication of truck movement when the body is not fully lowered on the truck frame and also to provide an indication of a "haul-back condition", i.e., a partial load remaining in the body after a dump has been completed.

In accordance with another particular aspect of the invention, the processor means 101 includes means for processing and storing hauling data derived from the on-board weighing device in order to catalog and record important parameters of truck and operator performance. By identifying each operator and/or down-time status, (e.g., operator on break, truck in shop for maintenance) by unique identification numbers, data generated while a particular operator is controlling the truck or while the truck is in a particular down-time status may be recorded and cataloged by the processor means. Operator data is stored in a memory means until they are called for by the operator through keypad 122. When called, the processor means organizes the data into a displayed/printed summary.

In accordance with another particular aspect of the invention, the processor means 101 includes means for determining the degree of roughness of the road traveled by the truck 11 by identifying pressure spikes measured by the on-board weighing device. Because excessively rough roads can affect the efficiency of hauling and, more importantly, substantially damage the trucks, the degree of roughness of the roads traveled by the truck 11 is an important parameter.

In accordance with another particular aspect of the invention, a central computer is provided having a signal link with each of the processors means 101 on-board the off-road, heavy duty trucks. Data transmitted from each of the processor means by way of transceiver 150 to the central computer is processed by it and instruction data is returned to each processor means. Specifically, a data base is developed by the central computer from data downloaded from the processor means 101 of all the trucks whereby the central computer monitors and controls truck movement. For example, conclusions reached from the downloaded data, are used by the central computer to route the trucks to load and dump sites most efficiently and/or to control the type of load delivered to a particular dump site.

Finally, in accordance with another particular aspect of the invention, the foregoing features provided by the processor means in response to data from the on-board weighing device and accessory devices mounted on the truck are also realized for an off-road scraper vehicle or for a stationary platform scale. For a scraper vehicle, pressure data indicative of material load is provided to an on-board processor means for generating a data base from which total load and load distribution can be estimated. For a platform scale, the on-board weighing device is modified to provide the essential pressure data required by the processor means to establish a data base from which total load can be determined.

Turning now to specific subassemblies of the on-board weighing device and also several alternative embodiments of the device, FIG. 3 illustrates three alternative embodiments in one cross-sectional view in order to show common hinge assembly configurations offered by various truck manufacturers. Referring specifically to the center embodiment in FIG. 3, in order to free the hinge assemblies 17 from the weight of the truck's load when the truck body is moved to its lowered position, oversized bores 43 of the hinge members 30 (the bores receive the body pivot pins 32) allow the hinge members 31 to lift the pivot pins 32 into a position which disengages the hinge member 30 from the hinge members 31. By providing the cushioning support material with a thickness dimension greater than the distance from the lowermost portion of the beams 28, 29 to the beams 26 and 27 when the beams are parallel, the engagement of the truck body with the cushioning support material causes the pivot pins 32 securely held by the bores 44 in the hinge members 31, to be lifted off the lower surfaces of the bores. Also, as is well known in the art, when the truck body 13 is moved to its lowered position and the telescoping cylinders 19 and 21 are fully collapsed, the hydraulic cylinders are released to a float position.

Accordingly, when the truck body 13 is moved to its lowered position, the entire weight of the truck body is transferred from the hinge assemblies 17 and hydraulic cylinders 19 and 21 to the body-frame interface provided by the cushioning support material between the beams 26, 27 and the beams 28, 29, wherein the latter are in parallel with the former. It will be appreciated that this cushioning support material is provided by the truck manufacturer in order to (1) cushion the mating surfaces between the beams 28, 29 of the truck body 13 and the beams 26, 27 of the truck frame 15, (2) provide a surface which lifts the truck's weight off the hinge assemblies 17 when the body is moved to its lowered position, thereby evenly distributing the truck's load along the length of the frame 15 and (3) allow for variations in parallelness between beams 26, 27 and beams 28, 29. As illustrated by the righthand embodiment of the hinge assembly in FIG. 3, the oversized bores 43' of the hinge members 30 may be lined with a rubber-like material 45 and a sheathing 45a in order to dampen any excessive movement of the pivot pins 32 in the oversized bore and protect the wall of the bore from damage.

Because the thickness of the assembly comprising the fluid-filled tubings 47 and the metallic shields 49 is equal to the thickness of the cushioning material that they replace, the pivot pins 32 are lifted off the lowermost portion of the bores 43 when the truck body is moved to its lowered position. Accordingly, when the truck body 13 is lowered onto the parallel beams 26 and 27 of the truck frame, the entire weight of the truck body 13 and its load is transferred to the truck frame 15 by way of the interface provided by the fluid-filled tubings 47. As a result of the fluid-filled tubings 47 supporting the entire weight of the truck body 13 in its lowered position, an increase in liquid pressure sensed by the pressure sensors 51 which accurately represents the total weight of the truck body. Not only do the fluid-filled tubings 47 provide a mechanism for measuring the total weight of the load carried by the truck body, they also provide the cushioned support between the truck body 13 and the truck frame 15 previously provided by the truck manufacturer's cushioning support material.

Generally, the tubings 47 should be composed of material that is resistant to penetration by oil (oil is the most preferred liquid for filling the tubings). More importantly, the tubings 47 must not be susceptible to permanent deformation from the weight of the truck body 13. In particular, the tubings 47 should not include any type of braided wire that might permanently deform under external pressure. An example of a tubing suitable for use in connection with the invention is the JAFIB fire hose manufactured by the Jaffrey Fire Protection Company, Inc. of New Hampshire. For any particular choice of hose, it must be wear and abrasion resistant. A modified fire hose may be used; an example of a preferred modified fire hose is a three-ply urethane fire hose (i.e., concentric layers of urethane, fiber and urethane) with an added inner lining of hose fiber with the fiber's inner diameter covered with a sealing material such as rubber.

It will be appreciated by those familar with off-road trucks that some manufacturers provide a cushioning support material between the truck body 13 and truck frame 15, but they do not provide a means to free the hinge assemblies 17 from supporting a portion of the weight of the truck body when in a lowered position. Such a hinge assembly is shown by the leftmost embodiment in FIG. 3 wherein the pivot pin 32 fits snugly within the bore 43". In accordance with the invention, these types of trucks may be modified to allow all the weight of the body to be supported along the body-frame interface by machining small crescent profiles off the tops of the pivot pins 32 such that the profile of the pins is egg shaped. As illustrated by the modified pin 32 in FIG. 3a, this modification allows the hinge members 30 and 31 to disengage when the truck body is lowered onto the tubings 47, thereby enabling the pressure sensors 51 to measure the pressure from the full weight of the truck body.

In order to calibrate the fluid-filled tubings 47 which support the truck body 13 in its lowered position over the truck frame 15, a liquid (e.g., oil) of relatively low viscosity is pumped into the tubings while the empty truck body is resting on the tubings, i.e., in its lowered position. Relatively low viscosity is chosen in order to ensure proper flow during winter temperatures. The pumping of the liquid is stopped when the beams 28 and 29 of the truck body 13 are parallel to the beams 26 and 27 of the frame 15. At this point there is still a slight amount of contact between the pvot pins 32 and the lower portions of the bores 43 in the hinge members 30. Therefore, there is still a slight amount of body weight supported on the frame 15 through the hinge assemblies 17. In order to lift the pivot pins 32 off the hinge members 30, additional liquid is pumped into the tubings 47 until the pivot pins 32 are visually lifted off the lowermost portions of the bores 43. Although there is some downward vertical movement of the inverted U-shaped metallic shields 49 as the truck body 13 is loaded, the movement is not sufficient to cause the pivot pins 32 to re-engage the bores 43 of the hinge members 30.

At each pressure sensor 51a–d associated with the fluid-filled tubings 47, the liquid pressure is converted to an electrical potential which is delivered to electrical circuitry, discussed hereinafter, to calculate a weight measurement. Referring to FIG. 4, each of the fluid-filled tubings 47 is preferably cut at its central area in order to provide two separate fluid-filled chambers. By cutting the tubings 47, each pressure sensor 51a–d at an end of a tubing 47 supplies the electronic circuitry with an independent pressure reading. By dividing each tubing 47 into two chambers, the corresponding four pressure readings can be manipulated to provide an indication of the weight distribution of the load, e.g., too much weight fore, aft or side to side as will be discussed in greater detail hereinafter.

In alternative configurations of the tubings, each tube can be a unitary piece such as schematically shown in FIG. 5 or it may consist of a plurality of tubings of smaller cross-section as shown in FIG. 5a (these smaller tubes may be within a larger tube). Referring to FIG. 6, in order to provide an easily ascertainable amount of contact area between the fluid-filled tubings 47 and the shields 49, a contact plate 60 is secured to the bottom of the channel formed by the shields in the preferred embodiment of the invention. The tubings 47 are filled with fluid so as to provide a contact surface along the entire cross-sectional length of the plate 60. Also, the tubings 47 are free from contacting the side walls of the shields 49. By the tubings 47 only contacting the bottom surface of plate 60, the weight can be accurately determined, i.e., pressure×area=weight.

Figure 7A:
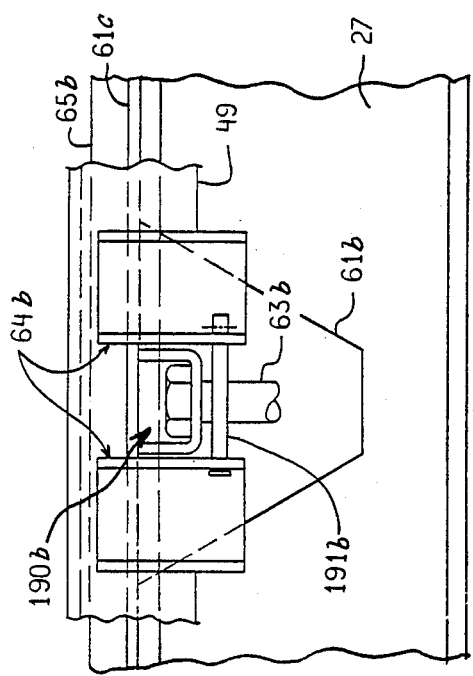
FIG. 7a is an enlarged partial side view of the on-board weighing device taken along the line 7a—7a in FIG. 7 showing details of the means for securing the device to the truck frame.
Figure 7:
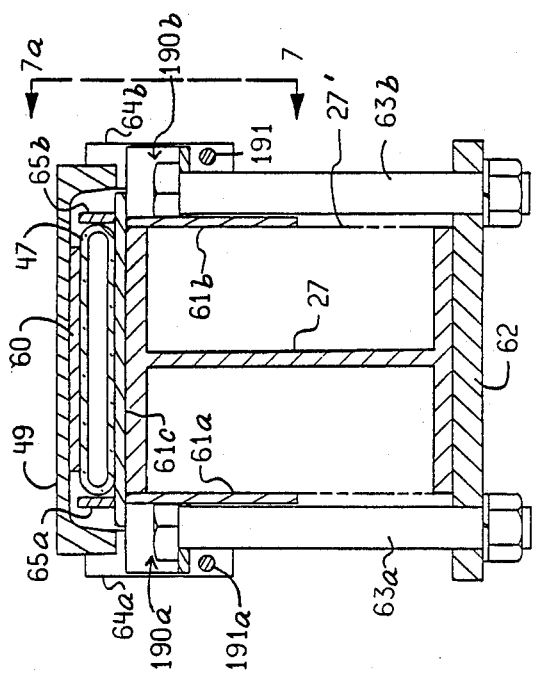
FIG. 7 is a cross-sectional view of the preferred embodiment for the on-board weighing device according to the invention, taken along the line 7—7 in FIG. 4.

Turning to FIG. 7, a more detailed cross-section of the apparatus comprising the on-board weighing device is shown. A subassembly, comprised of welded portions 61a, 61b and 61c illustrated in FIG. 7, is provided for securing the on-board weighing device to each of the beams 26 and 27. The subassembly fits over each of the beams (beam 27 is shown in FIG. 7). In order to secure the subassembly on the beam 27, a flat plate 62 is butted against the lower surface of the beam 27 and fastened to the portions 61a and 61b of the subassembly by way of nuts and bolts 63a and 63b, respectively. Referring to FIG. 7a in conjunction with FIG. 7, outrigger pairs 64a and 64b are secured to the shield 49. Fitted between the pairs of outriggers 64a and 64b are bolt assemblies 190a and 190b, respectively, which are secured to side portions 61a and 61b, respectively. Because of rods 191a and 191b extending between the outrigger pairs 64a and 64b, respectively, the shield 49 is restrained from accidently coming free from its position over the tubings 47. Upward movement of the shield 49 and the integrally attached outrigger pairs 64a and 64b will cause the rods 191a and 191b to engage the bolt assemblies 190a and 190b, respectively. At the same time, the shield is able to move downwardly in response to the weight of the truck body.

The subassembly 61a-c is fitted over the top of the beam 27 such that the planar horizontal surface portion 61c provides the supporting surface for the tubing 47. The horizontal surface is welded to the two wing portions 61a and 61b in order to allow the first portion 61c to fit over the top of beam 27 in much the same manner as a saddle on a horse's back. The shield 49 and plate 60 are fitted over the tubing 47 in the same manner as discussed in connection with FIG. 6. In order to provide horizontal stability for the tubing 47 and the shield 49, vertical guides 65a and 65b are integrally attached to opposing ends of the planar horizontal surface of portion 61c. The guides 65a and 65b cooperate with the side walls of the shield 49 to inhibit any side-to-side movement of the tubing 47. The dashed line indicated as 27' is included to indicate the beam 27 may be a square beam instead of the I-beam illustrated.

Figure 9:
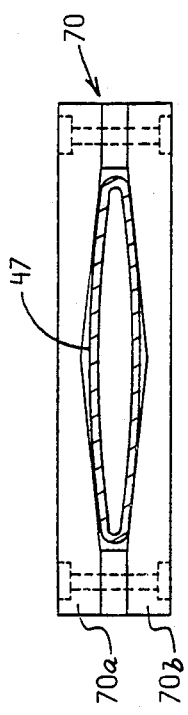
FIG. 9 is a cross-sectional view of the clamping subassembly in FIG. 8, taken along the line 9—9 and showing a side view of a collar portion of the subassembly.
Figure 8A:
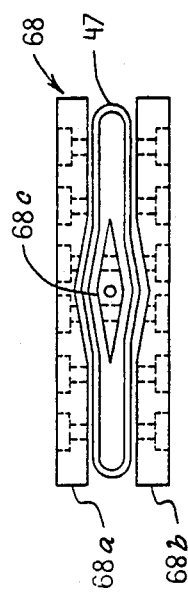
FIG. 8a is an exploded end view of a clamp portion of the clamping subassembly, taken along the line 8a—8a in FIG. 8.
Figure 8:
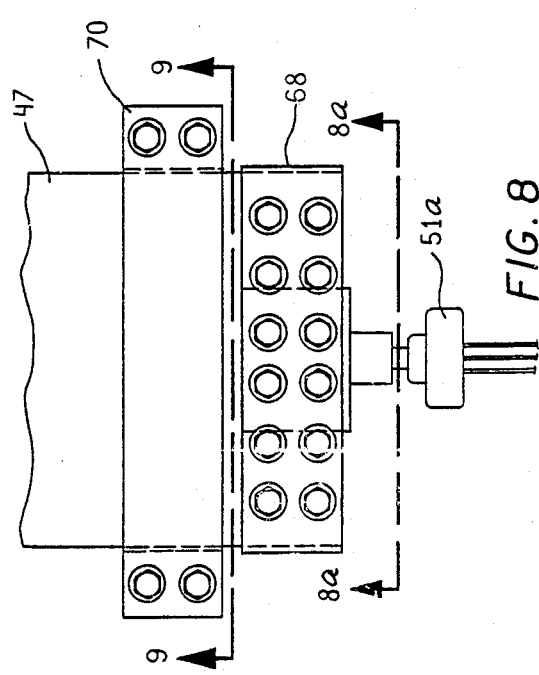
FIG. 8 is a plan view of a clamping subassembly of the on-board weighing device.

Referring to FIGS. 8, 8a and 9, an end clamp 68 at the end of each tubing 47 assures that the interface of the tubing 47 and one of the sensors 51a-d remains intact throughout the life of the on-board weighing device. As illustrated in FIG. 9, a collar 70 retains the tubinng 47 in a cavity formed by joining top and bottom portions 70a and 70b, respectively, of the collar 70. End clamp 68 has similar top and bottom portions 68a and b, respectively, and also a center portion 68c as shown in the exploded view in FIG. 8a. The end clamp portion 68c includes a centrally-tapped hole for receiving a threaded extension of one of the sensors 51a-d which join to secure and seal the end of the tubing 47. Because of the pressure exerted on the tubings 47 when they support the weight of the truck body 13, there is a substantial force acting at the ends of the tubings. Each end of the tubings 47 must be terminated in a manner which assures the tubing will not rupture. The metallic collar 70 restrains the end of the tubing 47 where it joins with the clamp 68 and one of the sensors 51a-d in order to prevent a rupture at the tubing-sensor interface provided by the end clamp 68. To further assure the tubing 47 remains sealed at the end clamps 68, very strong, high quality adhesives of commercial grade are added between the tubing 47 and the end clamp portions 68a,b and c in order to form a strong bond at the clamp-tubing interface. The adhesive is also added between the inner walls of the tubing at its end in order to aid in its sealing. As indicated by FIG. 8, bolts secure the respective upper and lower sections of both the end clamp 68 and the collar 70.

Referring to FIG. 10, in an alternative embodiment of the on-board weighing device according to the invention, the cushioning support material 52 remains on the parallel beams 26 and 27 to provide a cushioned interface between the truck frame 15 and the truck body 13, but each of the beams 28 and 29 of the truck body 13 is modified so that they include the on-board weighing device as described in connection with FIGS. 1-4. The two pieces illustrated in FIG. 10, sections 29a and 29b of the beam 29, are joined by a plurality of bolts 57 extending along the length of the two-piece beam. The two pieces of beam 28 (not shown) are constructed and joined in the same manner. By providing a two-piece beam construction with tubing 47 or load cells (not shown) sandwiched between the two pieces, the total weight of the truck's load can be accurately measured in accordance with the invention, ie., without lifting the truck body 13 off the truck frame 15.

Although this alternative embodiment requires the modification of the truck body 13, there is no required modification of the truck frame 15 or the cushioning material, and therefore, there is no possibility of a structural weakening of the load's support surface (i.e., the truck frame). Moreover, since the modification of the truck body merely makes two pieces from what formerly was one piece, there is also little danger of reducing the structural integrity of the truck body. Specifically, the weight of the load is continuously distributed through the tubings 47 along the length of the interface between the two pieces of the truck body, thereby assuring that there are no high stress areas which might be susceptible to fracturing under heavy loads.

In some vehicle manufacturer's truck designs, when the truck body 13 is in its lowered position the weight of the truck body is supported at the back end of the body by way of the hinge assemblies and at the front of the body by way of a relatively small body-frame interface area. When the body is in its lowered position, the body area intermediate these two support areas is suspended over the frame as shown in FIG. 12. For these types of truck bodies there is no cushioning support material along the length of the parallel beams of the frame. When the truck body is in its lowered position, the interface area 55 supports the beam 29 of the truck body 13 on the beam 27 of the frame 15 at the end of the body opposite the hinge assemblies 17, thereby preventing the body from being cantilevered. For these types of truck constructions, an on-board weighing device according to the invention is provided by positioning load sensors 57 and 59 at the interface area 55 and at the hinge assemblies 17, respectively, since these are the two points that support the truck body over the truck frame 15 when the body is in its lowered position. A particular example of a load cell suitable for use in connection with the embodiment of FIG. 10 is the fatigue-resistant load cell (models 3116 or 3152) manufactured by Lebow Assoc., Inc. of Troy, Mich.

As an alternative to positioning the load cell 59 in FIG. 12 at the hinge assembly 17, the load cell may be located between the interface between beams 27 and 29 (indicated as 59' in FIG. 12) if the hinge assemblies 17 are modified, as needed, to provide a "floating" hinge pin as shown in FIG. 3a. With a floating hinge pin, the weight of the truck body will be fully supported along the interface between the beams 27 and 29 and, thereby, the load cells 57 and 59' will provide an accurate indication of body weight. As a further alternative, a shortened version of the on-board weighing device of FIGS. 1-9 may replace the load sensor 57 while maintaining the load sensor 59.

Referring to FIG. 13a, the off-road, heavy duty truck includes a pressure sensor added to the hydraulic line connected to the hydraulic cylinders 19 and 21; by providing a pressure measurement from the hydraulic line of the hydraulic cylinder 21, in addition to the pressure measurement provided by the on-board weighing device, a determination can be made of the weight distribution of the load over the front and rear axles 71a and 73a, respectively, by summing moments about the hinge assemblies 17. By summing the moments about the hinge assembly 17, the location of the center of gravity of the load carried by the truck body 13 can be determined. By determining the location of the center of gravity of the load carried by the truck body 13, the relative distribution of the total weight of the load over the front and rear axles can be determined.

In order to determine the axle loads, the truck 11 may be schematically represented as a horizontal line 74 in FIGS. 13a and 13b which passes through both front and rear axles. In practice, the vertical height of the load's center of gravity is not important; therefore, the moment equation about the hinge assemblies 17 (the vertical height of the hinge assemblies is also ignored) gives the one dimension of the location of the center of gravity of the load which is important in determining the axle loads, i.e., its location relative to the front and rear axles.

In order to determine the location of the center of gravity of the load along the length of the truck 11 as shown in FIGS. 13a and 13b, the truck body must be lifted slightly from its lowered position as shown by the distance h in FIG. 13b in order that the hydraulic cylinders 19 and 21 provide a pressure reading indicative of the force required to pivot the truck body 13 about the hinge assemblies 17. By providing the horizontal line 74 with a calibration in predetermined units such as inches or feet, the horizontal placement of the center of gravity relative to the front and rear axles can be determined.

Since the hydraulic cylinders 19 and 21 are positioned at an angle $\Phi$ with respect to a vertical axis perpendicular to the horizontal line 74 in FIGS. 13a and 13b, the pressure reading from the pressure transducer associated with hydraulic cylinders 19 and 21 must be multiplied by cylinder area (to provide a force measurement) and by the cosine of the angle $\Phi$ in order to determine the vertical force at the cylinder hinge assembly 33. Although the angle $\Phi$ changes with the extension of the hydraulic cylinders 19 and 21, a predetermined value for the angle $\Phi$ can be stored in the memory of the process associated with the on-board weighing device as discussed hereinafter since the truck body 13 need be raised only a slight amount (shown as the distance h in FIG. 13b) such that the angle $\Phi$ can be treated as a constant for purposes of determining the relative axle loads.

Once the vertical force at the cylinder hinge assembly 33 is determined, the equation for the moments about the body hinge assembly 17 and along the horizontal axis has only one unknown, i.e., the horizontal distance of the center of gravity from the body hinge assembly 17. The following equation expresses the relationship of the moments about the body hinge assembly 17:

(Total Weight)·(C/G)−(Cylinder Weight)·(cos $\Phi$)·(y+z)=0     (1)

wherein "Total Weight" is the most recent pressure reading from the on-board weighing device representing the load carried on the truck frame 15 multiplied by a predetermined constant to provide a force measurement, and C/G is the location of the center of gravity of the load projected onto the horizontal line 74; "Cylinder Weight" is the pressure from the pressure transducer in the hydraulic line to hydraulic cylinders 19 and 21 multiplied by the area of the cylinders; the angle $\Phi$ is the angle formed by the longitudinal axis 75 of the cylinder 21 and a vertical axis 76 in FIGS. 13a and 13b; and (y+z) is the distance on the horizontal line 74 between the body hinge assembly 17 and the cylinder hinge assembly 33. Solving for the location of the center of gravity, the equation is as follows:

$$C/G = \left[ \frac{\text{Cylinder Weight}}{\text{Total Weight}} \right] \cdot (\cos \Phi) \cdot (y + z) \quad (2)$$

With the horizontal position of the center of gravity located, the load on each axle can be determined by solving for the axle weights using the sum of the moment arms about the axle and along the horizontal line 74. For the front axle, the sum of the moment arms about the rear axle provides an equation for solving for the load on the front axle. The equation for the moment arms about the rear axle is as follows:

(Weight on Front Axle)·(w)−(Total Weight)·(C/G−z)=0     (3)

Solving for the weight on the front axle, the equation becomes, $$\text{Weight on Front Axle} = (\text{Total Weight}) \cdot \left( \frac{C/G - z}{w} \right) \quad (4)$$

To find the load on the rear axle, the moment arms are taken about the front axle as set forth in the following equation:

(Weight on Rear Axle) · (w) −     (5)

(Total Weight) · (w + z − C/G) = 0

$$\text{Weight on Rear Axle} = (\text{Total Weight}) \cdot \left( 1 + \frac{z - C/G}{w} \right) \quad (6)$$

The weight of the frame of the truck 11 bearing on the front and rear axles (i.e., the tare weight) can be added to the calculated weights in order to provide total weights bearing on the front and rear axles. To find the tare weights for the front and rear axles, the truck 11 may simply be weighed one axle at a time on a platform scale as in FIGS. 15a−b. In measuring this tare weight, the truck body 13 may be removed from the truck 11 or the weight of the body attributable to the front and rear axles may be subtracted from the weight recorded by the platform scale (FIGS. 15a−b). The resulting weight measurement may be stored in the memory of the electrical circuitry associated with the on-board weighing device as discussed hereinafter.

Since the horizontal distances represented by the values for w, x, y and z are known and since the pressure in hydraulic cylinders 19 and 21 is known when the truck body 13 is lifted slightly off the frame 15, the center of gravity for the load (weighed by the on-board weighing device) can be determined from equation two.

Once the center of gravity for the load is determined, the distribution of the load between the front and rear axles, 71a and 73a respectively, can be easily determined from equations four and six.

Determination of axle loads can be made in off-road vehicles of other types using a similar approach as disclosed in connection with the off-road truck of FIGS. 13a–b. For example, a scraper vehicle 81, shown in its raised and lowered positions in FIGS. 14a and 14b, respectively, utilizes a pressure sensor in connection with its hoist cylinder 82 to estimate the front and rear axle loads of the scraper. A scraper vehicle loads ground material into its body by lowering an open end of the body into contact with the ground. As the scraper moves forward, the ground material is swept into the body of the scraper by way of the lowered opening. In other words, the bottom edge of the body scrapes the ground surface, hence the name "scraper".

Figure 14A:
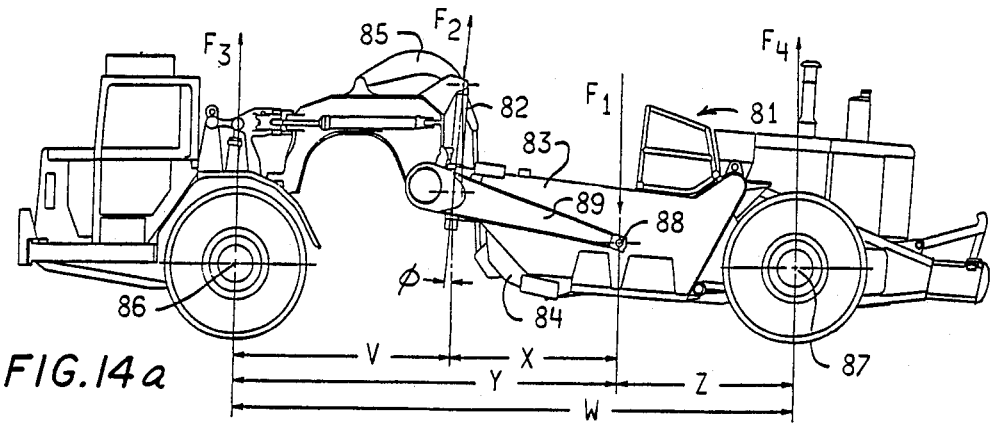
FIGS. 14a and 14b are side views of a scraper vehicle in its raised and lowered positions, respectively, illustrating the relative dimensions used to estimate front and rear axial loads.
Figure 14B:
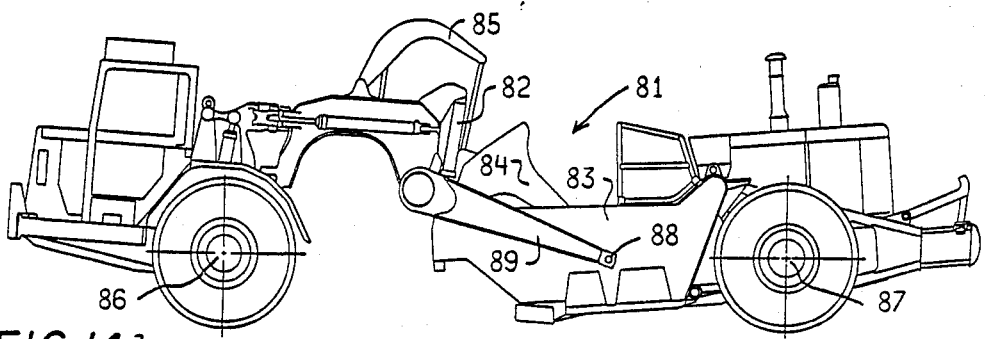
Figure 14C:
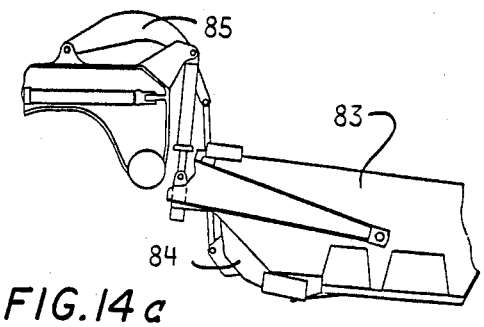
FIGS. 14c and 14d are partially side views of the scraper vehicle in FIGS. 14a and b, respectively, illustrating the relative positions of the vehicle's hoist cylinder and associated mechanisms.
Figure 14D:
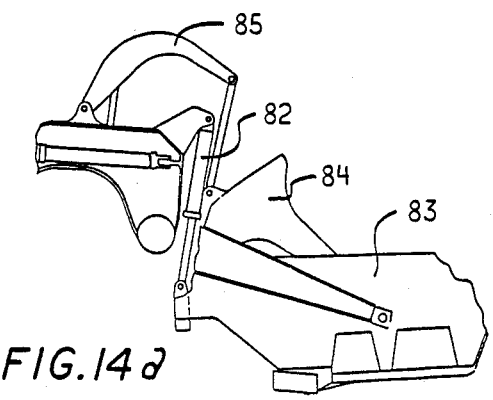

The mechanism which lifts and lowers the body 83 of the scraper 81 are most clearly shown in FIGS. 14c–d. In its lifted or raised position, the hoist cylinders 82 (only one is shown) holds the body 83 off the ground. In order to prevent material from falling out of the body 83, a gate assembly 84 is provided to close the opening in the body 83 when it is in its lifted or raised position. Control of the gate assembly is provided by a linkage 85 in a well-known manner.

Referring back to FIG. 14a, longitudinal dimensions v, w, x, y and z of the scraper 81 are used to calculate an approximate axle load for the front and rear axles 86 and 87, respectively. In the same manner as used in connection with the axle load determination for an off-road truck, the moment arms about the front and rear axles serve as the tools to determine the axle loads. Unlike the off-road truck, the center of gravity for the load in the body 83 of the scraper 81 cannot be as easily determined. In the off-road truck of FIGS. 13a–b, the on-board weighing device combined with a pressure sensor in the hoist cylinder system to find the center of gravity for the load. In the scraper 81, the center of gravity for the load of the scraper body 83 must be approximated. For illustration, the scraper 81 in FIG. 14a is assumed to have a center of gravity at the pivot point 88 of the pivot arm 89. With the location of the center of gravity assumed, the total weight of the load can be determined and, as a result, the forces on the axles can also be determined.

To calculate the axle loads, the weight of the load must first be determined. Converting the pressure in the hoist cylinder 82, while the body 83 is in a raised position, to a force allows the moment arm about the front axle to be solved for the weight of the body 83. Since the hoist cylinder 82 is at a slight angle $\Phi$ from vertical, the force $F_2$ must be multiplied by cos $\Phi$ to find the vertical force for calculating the moment arm about the front axle. The equation is as follows:

$$0 = (\cos \Phi \cdot F_2 v) - F_1 y \qquad (7)$$

$$F_1 y = F_2 v \cdot \cos \Phi$$

$$F_1 = F_2 v \cdot \frac{\cos \Phi}{y}$$

where $F_1$ is the weight of the body 83 and $F_2$ is the force at the hoist cylinder 82 lifting the body.

Once the weight of the load is determined, the axle loads are easily calculated as follows:

$$0 = F_1 y - F_4 w \qquad (8)$$

$$F_4 = F_1 \frac{y}{w}$$

where $F_4$ is the weight on the rear axle 87, and $$0 = F_1 z - F_3 w \qquad (9)$$

$$F_3 = F_1 \frac{z}{w}$$

where $F_3$ is the weight on the front axle 86. The foregoing calculation may be implemented by the circuitry and flowcharts discussed in connection with FIGS. 16, 17 and 18a–r. Although the flowchart discloses steps for calculating the axle loads for a dump body truck using data gathered by the on-board weighing device and data from hoist cyclinders, it will appreciated from the foregoing scraper discussion that similar software steps may be used in connection with the circuitry of FIGS. 16 and 17 to calculate scraper body weight and axle loads.

As briefly mentioned earlier, the platform scale of FIGS. 15a–b may be used to measure the tare weight for the front and rear axles of the off-road truck of FIG. 13a–b or the scraper of FIG. 14a–d. The tare weight is stored as a "hard number" in an electronic memory and added to the calculated axle weights from the load in order to arrive at the total axle loads. An exemplary platform scale may be implemented by appropriate changes to the on-board weighing device. Specifically, referring briefly to FIGS. 15a and 15b, an inexpensive platform scale is illustrated using tubing, sensors and support structure similar to that used for the on-board weighing device. A plurality of tubing lengths 90 are positioned under a surface plate 91. In order to hold the surface plate 91 in a stable position to prevent sliding, two rows of pins 92 integral with the plate are received in a corresponding two rows of sockets 93 integral with a bottom plate 94. Sensors (not shown) are attached to one end of each tubing 90 or, if the tubing is crimped at its center, the sensors may be attached to each end of the tubings.

A contact plate 95 interfaces the tubings 90 to the surface plate 91. The contact plate maintains a constant area of contact between the surface plate 91 and the tubings 90. In order to prevent the tubings from wandering on the bottom plate 94, each tubing 90 is bordered along its length with projections 96 from the bottom plate 94. In operation, the platform scale is recessed into the ground in order that the surface plate 91 is flush with the ground. In order to weigh, for example, the front or rear axles of the truck in FIGS. 13a and 13b, the truck operator merely drives the truck over the platform such that all front or rear tires bear on the surface plate. The pressure increases in the tubings 90 is sensed by the pressure sensors and circuitry similar to that illustrated in FIG. 16 adds the individual pressure readings and converts the sum to a weight measurement.

Figure 16:
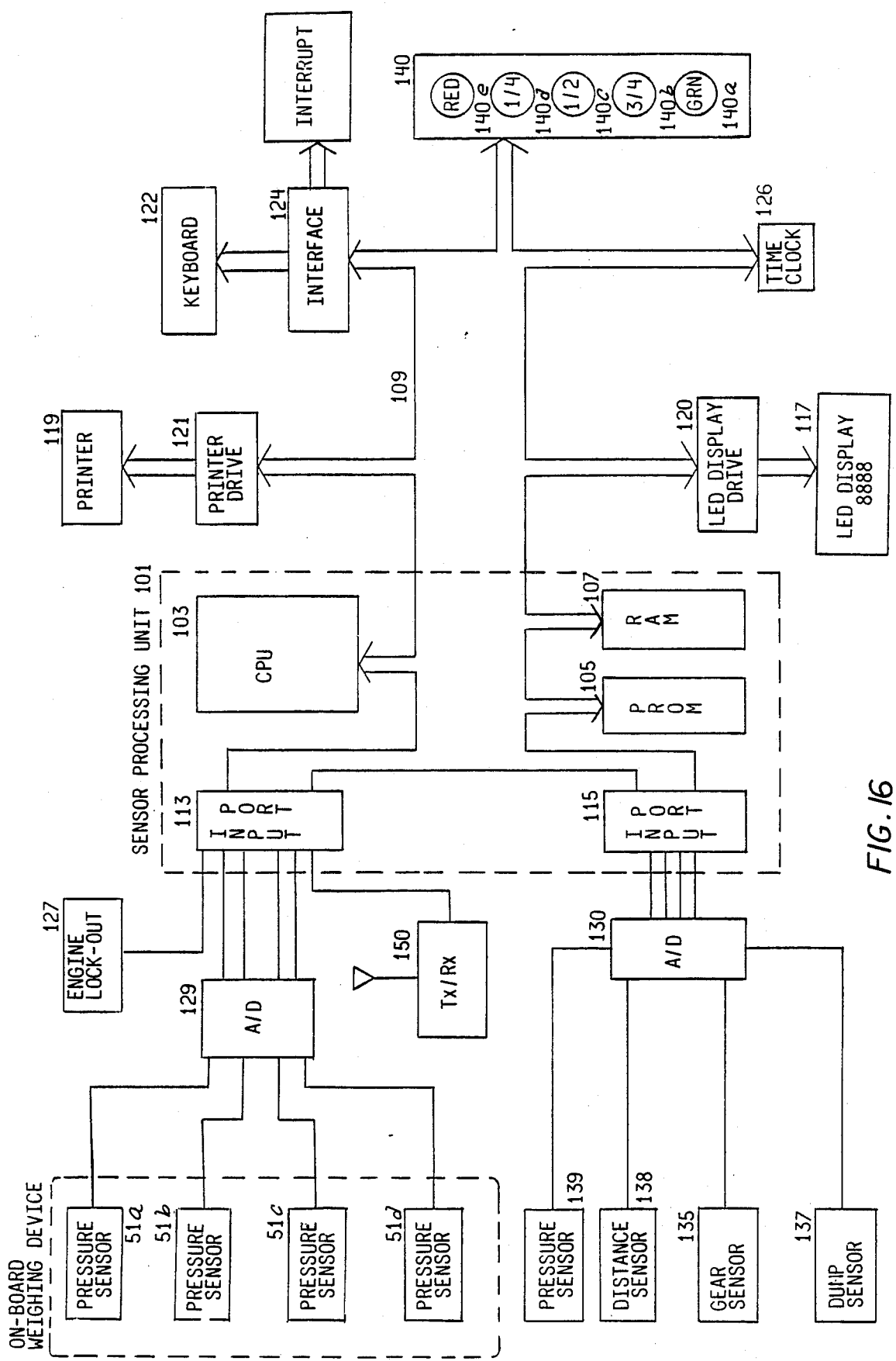
FIG. 16 is a block diagram of the electronic system which receives signals from the on-board weighing device according to the invention.

Referring now to FIG. 16, the electrical circuitry which completes the weighing system by manipulating the pressure data received from the on-board weighing device is provided by a sensor processing unit 101 (previously referred to as the "processor means"). Preferably, the unit is microprocessor based. As will be apparent to those skilled in the art, the sensor processing unit 101 includes a central processing unit 103 (hereinafter CPU 103), an associated program memory in the form of a PROM 105 and read/write memory RAM 107. A first memory portion of the RAM 107 functions as a first storage array for pressure readings from the on-board weighing device (hereinafter referred to as an ARRAY I). ARRAYS II and III are for summaries and archives, respectively. The storage arrays will be discussed in greater detail in connection with FIG. 16a. A particular example of a CPU suitable for the sensor processing unit 101 is the Z80 microprocessor manufactured by Intel Corporation of Santa Clara, Calif. Another possible microprocessor is the 8085 from Intel.

In conventional fashion, emanating from the CPU 103 is a microcomputer bus 109. The bus 109 is connected to the memories 105 and 107 as well as to input ports 113 and 115. The microcomputer bus 109 communicates to a visual display unit 117 and a printer 119 by way of a display drive 120 and a printer drive 121, respectively. In order to provide the sensor processing unit 101 with the operator and truck member, the microcomputer bus 109 is connected to a keyboard 122 by way of an interface 124. The keyboard 122 also provides the sensor processing unit 101 with a conversion factor for converting the stored pressure readings to weight values in tons, pounds or kilograms. Also, communicating to the sensor processing unit 101 by way of the microcomputer bus 109 is a time clock 126. In order to provide a communications path between the sensor processing unit 101 and the printer 119, the visual display 117, the time clock 126 and the keyboard 122, the microcomputer bus 109 includes data lines, memory lines and control lines.

In order to measure the axle loads of the truck 11, an interrupt instruction instructs to the sensor processing unit 101 to execute the software routine for calculating the axle loads from pressure readings of the on-board weighing device and the pressure sensor 139. As illustrated in FIG. 16, the interrupt signal is activated by the truck operator by way of a push button 142. As mentioned in connection with FIG. 13, the interrupt is activated only after the operator has slightly raised the truck body 13 by extending the hydraulic cylinders 19 and 21.

As previously mentioned, hauling parameters derived from the on-board weighing device and processed by the sensor processing unit 101 can be identified with particular I.D. numbers, thereby providing an indication of truck and operator performance. It will be appreciated by those skilled in the art that keyboard 122 can also serve as an I.D. input for mechanics, oilers and other maintenance personnel in order to record the maintenance work on the truck (in a fifth array of RAM 107) and the identity of the individual who performed the maintenance. In connection with recording a user's identification number, the sensor processing unit 101 controls an ignition lock-out device 127 which allows the truck 11 to be started only if a correct I.D. number has been received. In order for the sensor processing unit 101 to detect changes in operator numbers when the truck is not running (for instance, a change from a mechanic's I.D. to an oiler's I.D.), power is continuously applied to the sensor processing unit. In a well-known manner, the sensor processing unit 101 reverts to a stand-by mode when the truck is turned off in order to reduce its power consumption and thereby prevent a serious drain on battery power. In the stand-by mode, the sensor processing unit periodically powers up and looks to see if activity has occurred at its sensor inputs. If, for example, a new I.D. number has been entered into the keypad 122, the unit stores the new number and prints and/or displays a summary of data while the truck 11 was under control of the previous number. (The foregoing display of summary data will be explained in greater detail in connection with FIG. 18i). As an alternative to entering the I.D. number by way of the keyboard 122, an encoded card may be used by the operator in connection with a card reader.

As will be explained in greater detail in connection with the flowchart of FIGS. 18a-f, h-k, m, p and r, the sensor processing unit 101 and its associated electronics are energized in response to engine start-up. An engine start-up energizes the CPU 103 which in turn initializes the program memory, thereby beginning the program routine of the flowchart in FIGS. 18a-f, h-k, m, p and r.

Each of the various alternative embodiments of the on-board weighing device provide the circuitry of FIG. 16 with an analog electrical signal which is linearly proportional to the pressure exerted by the tubing fluid on the device's sensors 51a-d (tubing in the preferred embodiment of the invention or load cells, strain gauges or like pressure sensing transducers in alternative embodiments of the invention). Since the pressure of the tubing fluid is linearly proportional to the weight of the truck body 13 and since the sensors 51a-d reflect the tubing fluid pressure in a linear fashion, the analog signals from the sensors are proportional to the weight of the truck body.

Sensors 135, 137, 138 and 139 cooperate with the on-board weighing device in order to provide information necessary for the sensor processing unit 101 to provide output information to the truck operator such as the loads on the front and rear axles as discussed in connection with FIGS. 13a and 13b. The gear sensor 135 is used in connection with a record keeping function performed by the software of the sensor processing unit 101 such that, in response to a gearshift by the truck operator, certain information stored in RAM 107, and derived from the on-board weighing device, may be manipulated (as explained more fully in connection with the flowcharts of FIGS. 18a-f, h-k, m, p and r). In a similar manner, the dump sensor 137 is utilized by the sensor processing unit 101 to manipulate stored data from the on-board weighing device when the dump sensor 137 indicates that the truck body 13 has been pivoted to its dump position. Preferably, the dump sensor is a mercury switch mounted to the truck body 13 in order that it may respond to the change in the body's position as a load is dumped. Unlike mechanical switches, which are used in all prior apparatus, to the best of applicant's knowledge, a mercury switch when utilized as a dump switch offers the highly advantageous characteristic of being isolated from the ambient conditions. Therefore, the harsh conditions often encountered by off-road vehicles will not cause a rapid deterioration of switch performance.

The distance sensor 138 is used by the sensor processing unit 101 to provide the distance measurement in connection with the calculation of tons-miles per hour units used to indicate the degree of tire wear or use. Finally, the pressure sensor 139 is located in the hydraulic line of the hydraulic cylinders 19 and 21 and provides a pressure measurement for use in connection with calculating the axle distribution of the total load.

The interaction between the sensor processing unit 101, the on-board weighing device and each of these sensors is discussed in greater detail hereinafter in connection with the flowcharts of FIGS. 18a–f, h–k, m, p and r which disclose the program routine for the sensor processing unit. All of the foregoing sensors are analog devices which require analog-to-digital conversion as represented by A/D block 130. As with A/D converter 129, the circuitry comprising these converters is conventional and, therefore, will not be discussed in detail.

In order to provide a visual indication of the unused weight capacity of the truck body, the sensor processing unit 101 is connected to a load indicator 140 by way of the microcomputer bus 109. The load indicator 140 includes a plurality of lights 140a–e stacked one above the other. By activating a particular light on the indicator 140, the sensor processing unit 101 is able to signal the operator of the loader the proportion of a bucket load which may safely be added to the truck without exceeding the weight capacity of the truck. From a predetermined maximum weight capacity for the truck stored in the sensor processing unit 101, the sensor processing unit determines the remaining load capacity of the truck body 13 from the current load as measured by the on-board weighing device.

If the truck is loaded by a continuous flow of material, instead of the incremental increase provided by the bucket of a front end loader, the indicator 140 may provide a real time indication of the percentage of remaining load capacity. For example, if a conveyor belt or hopper (not shown) are used to load the truck 11, the sensor processing unit can compare current load data with a maximum load and activate an appropriate light 140a–e depending on the fraction of remaining capacity. In this example, it is contemplated the indicator light 140a corresponds to a remaining capacity of 20%, indicator light 140b corresponds to a remaining capacity of 15%, etc. The sequencing of the lights 140a–e as the truck approaches full load will aid in the anticipation of when the continuous flow should be cut off in order to avoid overflow, yet assure a maximum load. The particular programming steps for providing a real time indication of remaining capacity is not set forth in the steps of the flowcharts in FIGS. 18a–f, h–k, m, p and r, but the modifications required to the program for continuous flow loading will be evident to a programmer from the flowchart description of steps responsive to incremental loading.

In connection with the indication of the remaining weight capacity of the truck, the sensor processing unit 101 determines the average incremental increase in the weight of the truck body 13 with each bucket from a loader, thereby indicating the average weight of a bucket load used to load the truck body. If the average weight for a bucket is less than the remaining weight capacity of the truck body 13, then the green light 140a of the indicator 140 will be activated by the sensor processing unit 101. If the average weight of a bucket is greater than the remaining load capacity of the truck body 13, the sensor processing unit 101 determines what fraction of the average weight of a bucket the remaining weight capacity most closely approximates.

Specifically, a three-quarter light 140b is activated if the remaining weight capacity of the truck body 13 has a value between three-quarters of an average weight for a bucket and the total average weight for a bucket. In order to light the one-half light 140c, the remaining weight capacity of the truck body 13 must be between one-half and three-quarters of the average weight of a bucket. Similarly, in order to light the one-quarter light 140d the remaining weight capacity must be between one-quarter and one-half of the average weight of a bucket. Finally, for the red light 140e to be activated and thereby indicate the truck body 13 is full, the remaining weight capacity of the truck body 13 (as determined by the pressure reading from the on-board weighing device) must be less than one-quarter of the average weight of a bucket. The manipulation of the indicator 140 by the sensor processing unit 101 in response to pressure readings from the on-board weighing device will be explained in greater detail in connection with the program routine of the sensor processing unit illustrated by the flowcharts in FIGS. 18a–f, h–k, m, p and r.

A transceiver 150 is mounted to the truck 11 in an appropriate and convenient location in order to enable the sensor processing unit 101 to communicate with a central computer. As will be explained in greater detail hereinafter, the central computer serves as a traffic cop to control the flow of trucks between load and dump sites.

Turning now to the calibration and programmed operation of the on-board weighing device and the sensor processing unit 101, initialization of the system will be explained with reference to the preferred embodiment of the invention. In connection with the alternative embodiments of the on-board weighing device, the modifications required to calibrate the sensor processing unit 101 and the modifications required to the program memory will be obvious to those skilled in the art from the following detailed description of the calibration of the on-board weighing device and programmed operation of the sensor processing unit for the preferred embodiment of the invention.

The calibration of the on-board weighing device may be illustrated by considering the case of a truck body 13 having a ten-ton empty weight and a 50-ton load capacity. In the preferred embodiment of the on-board weighing device, if the tubings 47 have a total combined effective surface area of 500 sq. in., the pressure developed by the empty truck body 13 is 40 psi. A fully loaded truck body 13 (i.e., 50 tons) develops a pressure of 240 psi. By utilizing the pressure sensors 51a–d in connection with the tubings 47, an analog voltage output may be obtained which accurately measures pressures between 0 and 300 psi. The analog voltage output of the sensors 51a–d varies between two and six volts. For the truck body 13 having an empty weight of ten tons and a full load weight of 50 tons, the analog voltage from the sensors 51a–d is 2.53 volts for the weight of the empty truck body and 5.20 volts for the full load weight. Therefore, the voltage outputs of the sensors have a voltage range of 2.67 from no load to full load volts.

At the analog-to-digital converter 129 (hereinafter referred to as an A/D converter) the output voltage from each of the pressure sensors 51a–d is converted from an analog voltage to a digital signal. The output from the A/D converter 129 is a binary-coded decimal number which—since it is proportional to the analog voltage from the pressure sensors 51a through 51d—is also proportional to the pressure on the tubings 47. Since the voltage output range of the pressure sensors 51a–d is between two and six volts, the A/D converter 129 converts two volts to a binary-coded decimal number close to zero (when the truck body is lifted off the sensors thereby creating a zero load condition) and correspondingly converts six volts to a binary-coded decimal number of approximately 255.

For the exemplary truck 11 having a ten-ton empty weight for the truck body 13, the foregoing calibration procedure provides, at the binary-coded decimal output of the A/D converter 129, a decimal number of 34 when the truck body is in its lowered position. In comparison to the decimal number of 34 which represents an empty load, for a full load of 50 tons the output of the A/D converter 129 is a binary-coded decimal number of 204. Therefore, a decimal range of 170 represents all truck body loads from empty to full. Therefore, with a pressure range of 200 psi (corresponding to a weight range from no load to full load) a range of 170 in the binary-coded decimal number from the A/D converter 129 gives a resolution of approximately 1.18 psi per decimal number.

In order to calibrate the on-board weighing device for measurement in an appropriate unit of weight (i.e., tons, pounds of kilograms), a conversion factor, which corrects for the contact area between the plate 60 (FIG. 6) and the desired units of weight, is manually set into the keyboard 122 in FIG. 16 and converted to a binary-coded decimal number by conventional circuitry associated with the keyboard. This binary-coded decimal number is delivered to the CPU 103 by way of the interface 124. At the CPU 103, the conversion value is multiplied with a binary-coded decimal number representing the previously calculated net pressure for the truck body. The resulting binary-coded decimal product represents the numerical value of the net weight of the truck body in tons, pounds of kilograms, depending on the conversion factor chosen. For example, the net pressure calculated from the pressure sensors 51a–d for a full load condition corresponds to a binary-coded decimal number of 170. The CPU 103 multiplies the binary-coded value of 170 by the binary-coded decimal number from the keyboard 122.

In order to obtain an accurate measurement of the pressure on the four isolated lengths of the tubings 47, the sensor processing unit 101 reads the voltage 16 times in succession from each pressure sensor 51a–d. In order to obtain one pressure value for each sensor 51a–d, the 16 readings are averaged. Each pressure sensor 51a–d is read and averaged before the next sensor is read and averaged. When all of the pressure sensors 51a–d have been read and their 16 separate readings averaged, the four average readings are themselves averaged to obtain one pressure measurement for the truck body 13. Since the net weight of the truck body 13 is the weight of interest, the tare pressure (stored in memory as a predetermined pressure) is subtracted from the average pressure reading of the pressure sensors 51a–d to obtain a net pressure reading. The net pressure reading corresponds to the weight of the load carried by the truck 11 in its truck body 13. This reading is stored in ARRAY I and is manipulated in accordance with the program memory for the CPU 103 contained in the PROM 105.

In order to convert the foregoing pressure readings to a weight reading, the effective area of contact between the tubing 47 and the plate 60 (see FIG. 7) must be multiplied. The pressure data from the sensors 51a–d represents weight per unit area. Multiplying the effective contact area by the pressure data results in data indicative of weight. Two methods may be used to find the weight—(1) the average pressure may be multiplied by the total effective area for all the plates 60 of the on-board weighing device or (2) add the separate pressures from each of the sensors 51a–d and multiply the sum by the effective area of only one of the plates 60. From empirical study, applicant has discovered that the surface area of the plate 60 is not the precise area used to multiply with the pressures. A slightly modified, enlarged surface area is required in the calculation of weight. The degree of enlargment is determined empirically. Of course, the pressure x area product may also require conversion to provide the appropriate weight units, e.g., pounds, kilograms, etc.

For the foregoing calculation of weight, the effective area of contact between the tubing 47 and the plate 60 is considered to be the same for each sensor 51a–d. If the specific system design results in unequal areas, each pressure and area must be treated separately. Therefore, if the four lengths of tubings 47 in FIGS. 1–4 include two short foreward sections and two long aft sections, the two forward sections must be treated separately from the aft sections in order to provide a meaningful single weight calculation.

Figure 16A:
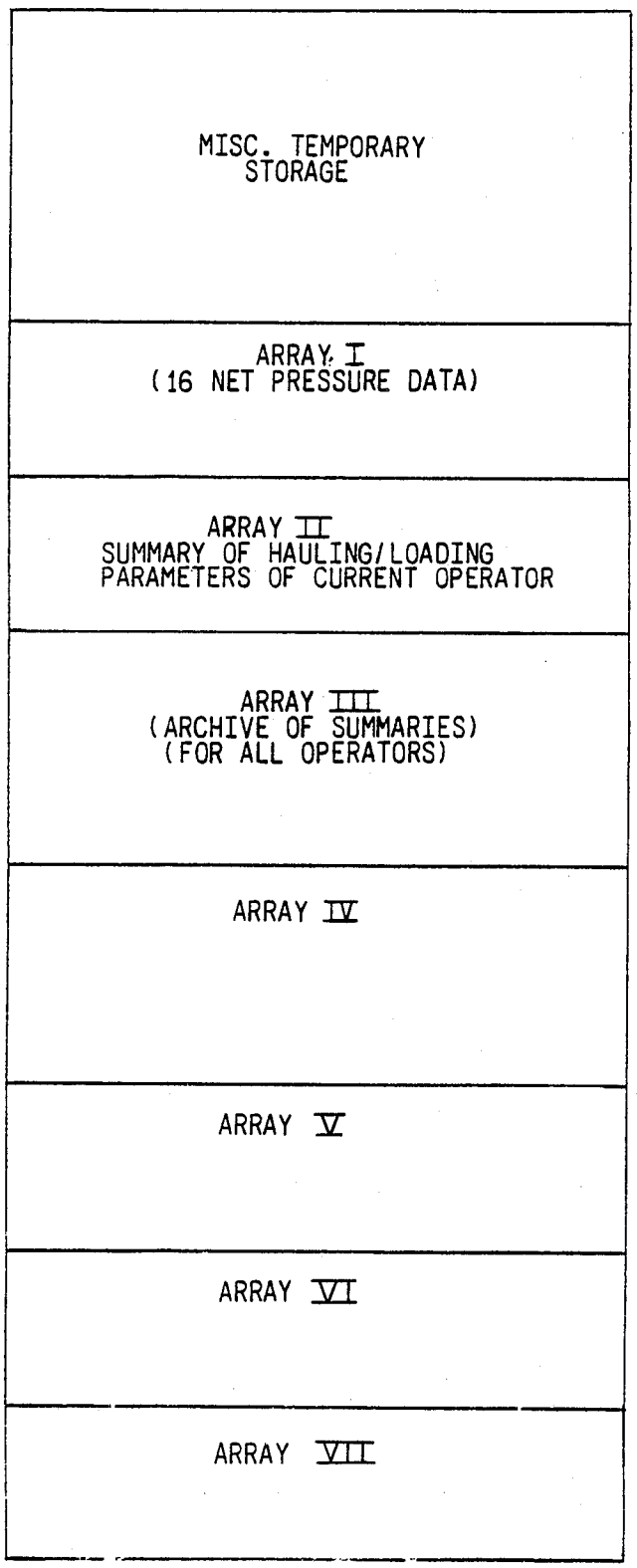
FIG. 16a is a schematic diagram of the temporary memory used in connection with the electronic system of FIG. 16.

In order to record the relevant data provided by the on-board weighing device and the electronic circuitry of FIG. 16, the RAM 107 is organized to not only include the miscellaneous temporary storage (e.g., status flags) required for normal software operation, but the RAM also includes arrays of data cells for storing time and pressure data to provide a chronologicl record of truck and operator performance and to provide a data base to extract further data indicative of performance. Referring to FIG. 16a, the RAM 107 is schematically illustrated as including at least a miscellaneous storage area and seven arrays.

ARRAY I provides storage locations for a plurality of consecutive net pressure values calculated from the pressure sensors 51a–d of the on-board weighing device. Also in RAM 107, storage locations are provided for cataloging summaries of hauling parameters wherein the summaries are indexed by operator number in order that the performance of each operator of the truck 11 can be quantified. For example, ARRAYS II and III are provided in RAM 107 wherein the ARRAY II collects summaries of hauling parameters for a time duration measured from the time a particular operator number is entered into the system until the number is changed. Entry of a particular operator number may identify a certain cell in the second array for receiving summaries of hauling parameters, thereby identifying the summaries with the operator. By providing a nonvolatile memory for the RAM 107, an ARRAY III serves as an archive for the summaries in ARRAY II, thereby providing a record of operator performance for a period of time including multiple uses by the operator, e.g., a month, quarter or year.

A fourth array, ARRAY IV, provides a storage area for recording maintenance work on the truck. Entry of a user I.D. number indicative of maintenance personnel rather than drivers are stored in ARRAY IV together with relevant data such as time under control of the maintenance number. Two additional arrays, ARRAYs V and VI store date useful in evaluating the performance of an off-road, heavy duty truck and its loader. As will be discussed in greater detail hereinafter, ARRAYs V and VI store data relating to the weight of each bucket added by the loader and the real time of each bucket addition. The purpose and manipulation of these stored values in ARRAYs I-VI will be discussed in connection with the flowchart of FIGS. 18a-f, h-k, m, p and r.

Finally, ARRAY VII is an area for storage data to be downloaded from the on-board system to a remote central location for creating a historical file. As will be apparent from the discussion in connection with the flowcharts of FIGS. 18a-f, h-k, m, p and r and 20a-b, relevant data can be either or both displayed on-board and downloaded to a central computer. If downloading is a selected option, the data is temporarily stored in ARRAY VII for transmission in response to receiving an appropriate control signal from the central computer.

In a simpler, less costly device, the circuitry of FIG. 16 may be replaced by a mechanical weight indicator 169 such as the one shown in FIGS. 17a-c. The sensors 51a-d are removed from the tubings 47 and the oil is continuous from each of the tubings to one of the piston chambers 170a-d. Within each chamber 170a-d is a piston 171a-d as exemplified by the piston in FIG. 17c, shown in perspective. Each piston 171a-d is disk shaped and seals the chambers 170a-d into top and bottom volumes with the aid of O-rings 172a-d.

Since the weight of the truck body 13 is proportional to the sum of the pressures from the plurality of tubings 47 of the on-board weighing device, the mechanical weight indicator 169 adds the separate pressures and displays the total pressure by way of a conventional pressure gauge 175. Once the system is calibrated, the pressure gauge 175 may be supplemented with a weight scale such that weight can be read directly from the gauge. It will be appreciated from the following description that addition pistons 171 and piston chambers 170 may be easily added to the indicator 169 if more pressure inputs are required.

Referring to FIG. 17b, a plurality of pistion chambers 170a-d are stacked one above the other and, they include pistons connected by longitudinal shafts 176b-d as shown. Each of the shafts 176b-d communicate the force from the piston below it to its piston. Correspondingly, this latter piston adds the force on it from the previous piston to the force from the oil pressure and passes the sum to the next piston above it by way of its shaft 176, etc. The last piston has the sum of all the forces from the pressures on the other pistons below it. Since the lowermost piston 171a does not have a piston below it, it does not require a shaft 176.

In order for the full force of one piston to be transferred to the next piston, the top volume of each piston (except for the last or uppermost piston) is vented to the atmosphere through vents 177a-c. Of course, the oil intake ports 178a-d are located in the bottom volume of each chamber 170a-d. In order to separate the bottom oil-filled volume from an adjacent top, air-vented volume, chambers 170a-c include disk sections 179a-c, respectively. These sections include central bores 180a-c, respectively, for receiving the shafts 176b, c and d. Each central bore is sealed by a gasket. An annular grove 181 in the ends of each of the chambers 170a-d receives O-rings in order to provide a sealed indicator 169. Each of the disk sections 179a-c include annular recesses on their top and bottom surfaces for receiving the cylindrical chambers 170a-d.

In its assembled state, the mechanical weight indicator 169 is capped by top and bottom plates 182 and 183, respectively. A plurality of rods 184 in FIG. 17a extend the length of the indicator 169 and join the top and bottom plates 182 and 183. Threaded ends of the rods 184 receive nuts for securing the entire assembly.

In order to equalize pressure between input lines during set up of the indicator 169, valves 185a-c interconnect the input lines from the on-board weighing device. During set-up, the valves 185a-c are opened and the fluid pressure is allowed to equalize. The valves 185a-c are then turned off and, they remain off during normal operation. In each of the lines from the tubings 47 is a flow restrictor 186 for protecting against sudden changes in pressure (i.e., spikes) from reaching the gauge 175. Also on each input line is a air column 187 for protecting the on-board weighing device from possibly drawing a vacuum in the event of a significantly uneven distribution of weight. The top chamber 170d is filled with fluid in both its top and bottom volumes in order that the added pressure can be passed to the pressure gauge 175 by way of the top volume and the output port 189.

In a simple system, the mechanical weight indicator may be located off the truck and at a stationary site. For example, where the loading equipment is stationary during loading, a coupling between the on-board weighing device and the stationary mechanical weight indicator may allow the operator of the loader to remotely monitor the weight of the vehicle load without the need for relatively expensive transceivers. Obviously, in such a system, the sensors 51a-d are absent and the coupling between the on-board weighing device and the mechanical weight indicator is simply a conduit for communicating the pressurized fluid from the truck to the statinary location.

In order to allow the loaded vehicle to move away from the loading site, the coupling between the on-board weighing device and the mechanical weight indicator 169 includes a quick disconnect device of conventional design. In operation, the vehicle is moved into position for loading and the male and female members of the quick disconnect device are joined so as to allow pressure from the on-board weighing device to be directly transferred to the stationary mechanical weight indicator 169. Since the loading equipment is stationary, the indicator 169 is preferably mounted directly to the loader so that the loader operator can monitor the increasing weight of the load. When a full load is indicated, the quick disconnect device decouples the mechanical weight indicator 169 and the on-board weighing device so that the truck may move away from the loading site and allow a new truck to be positioned for loading. The new truck is coupled to the mechanical weight indicator 169 as before and the foregoing steps are repeated. An obvious variation to the foregoing hydraulic system would be the upgrading of the system to an electrical system wherein the sensor 51a-d are present on the on-board weighing device and a transmitter porivides the means to communicate the pressure data to an electronic weight indicator located at the loader. Of course, a simplified version of the sensor processing unit 101 is necessary in order to prepare the pressure data for transmission. The stationary weight indicator may be merely a receiver of the data which converts the transmitted pressure data to a weight display for the operator of the loader.

Figure 18A:
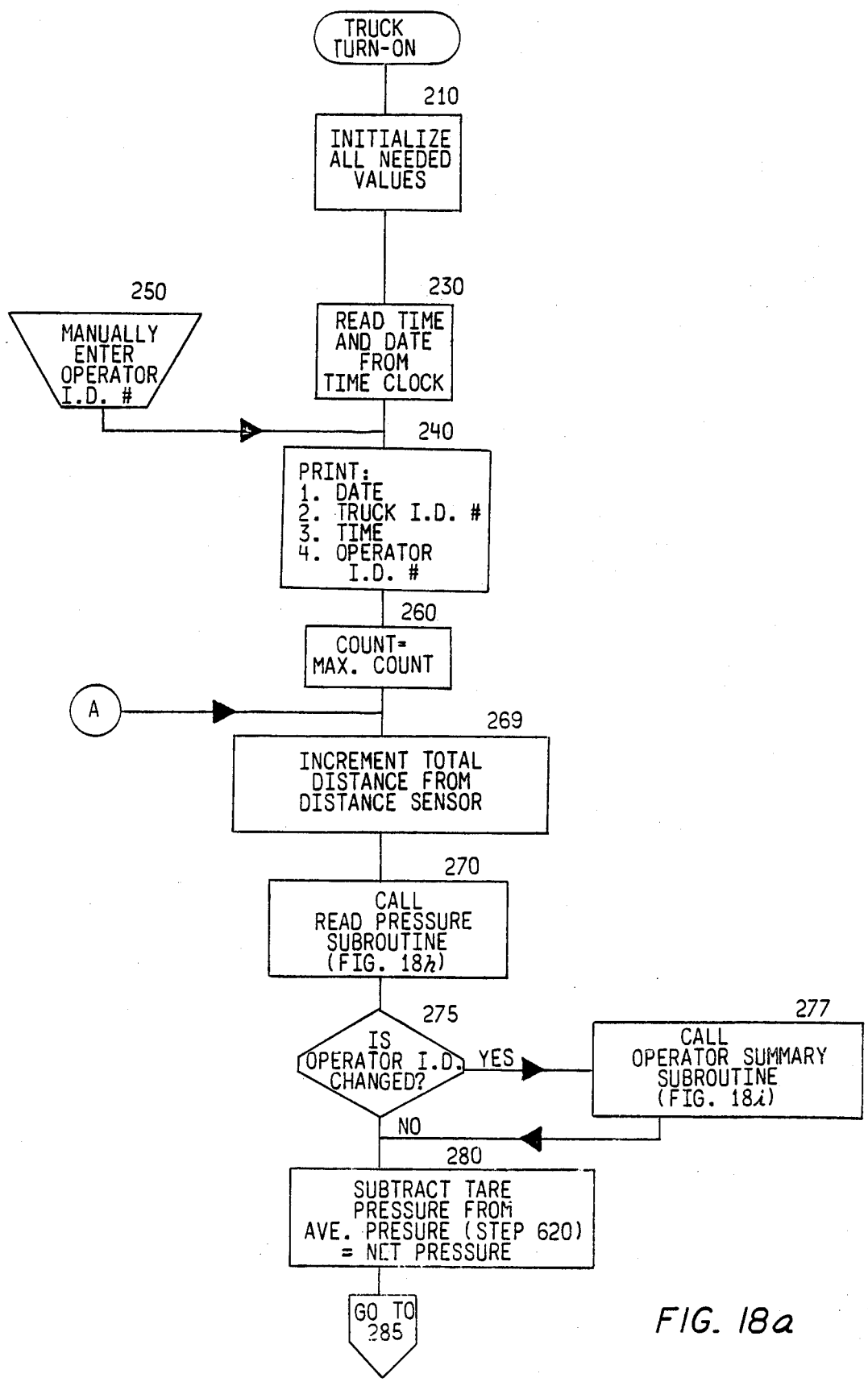
FIGS. 18a-f, h-k, m, p and r are flowchart diagrams for the software utilized in connection with the electronic system of FIG. 14.
Figure 18B:
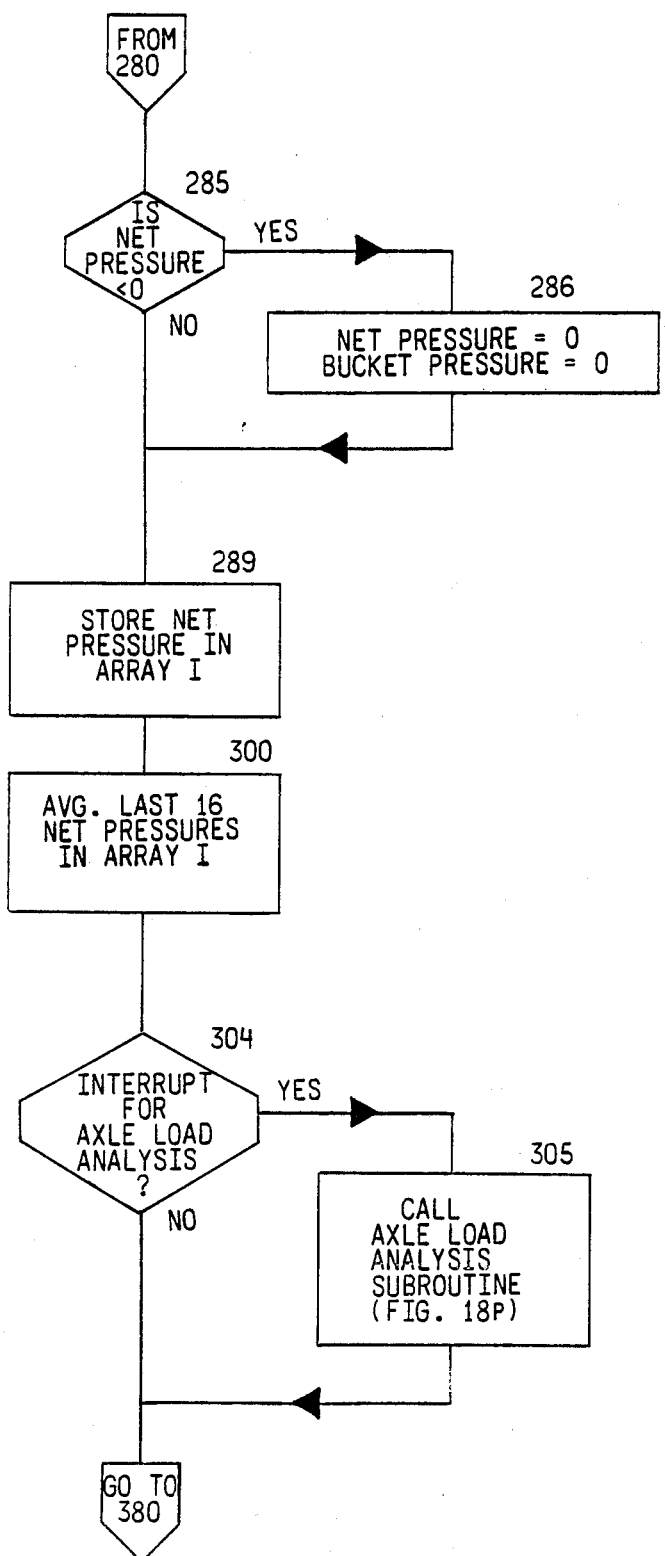
Figure 18C:
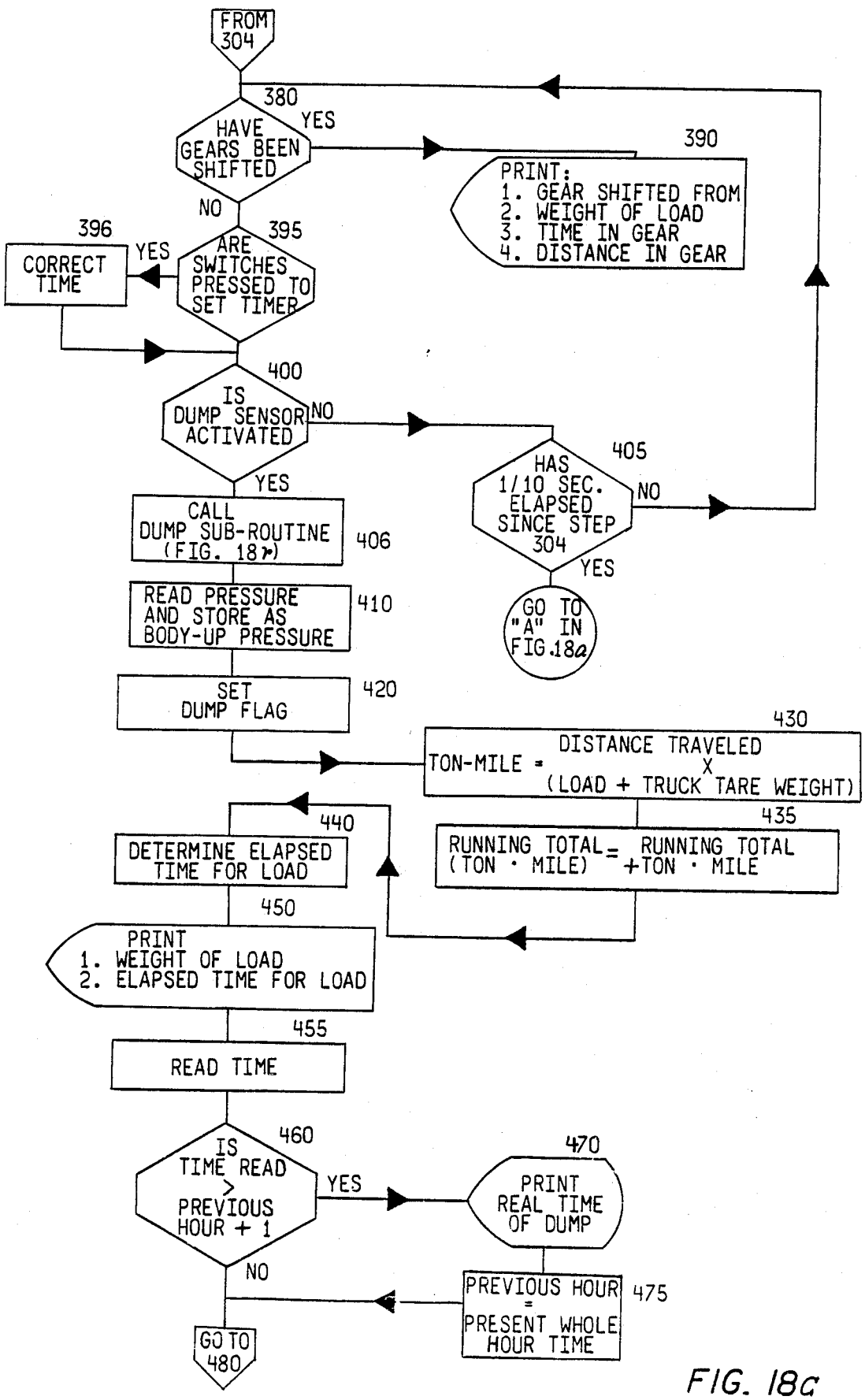
Figure 18D:
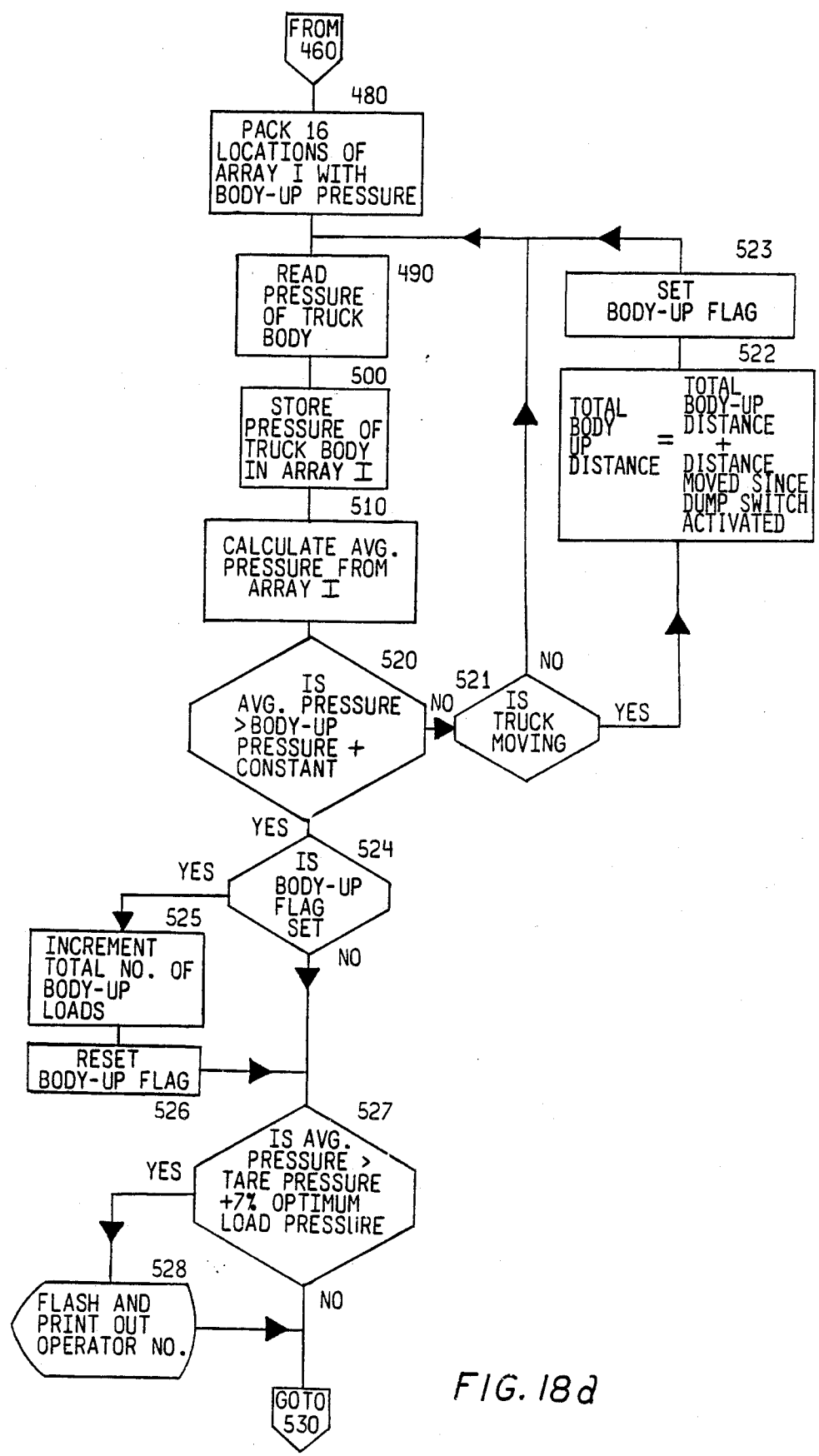
Figure 18E:
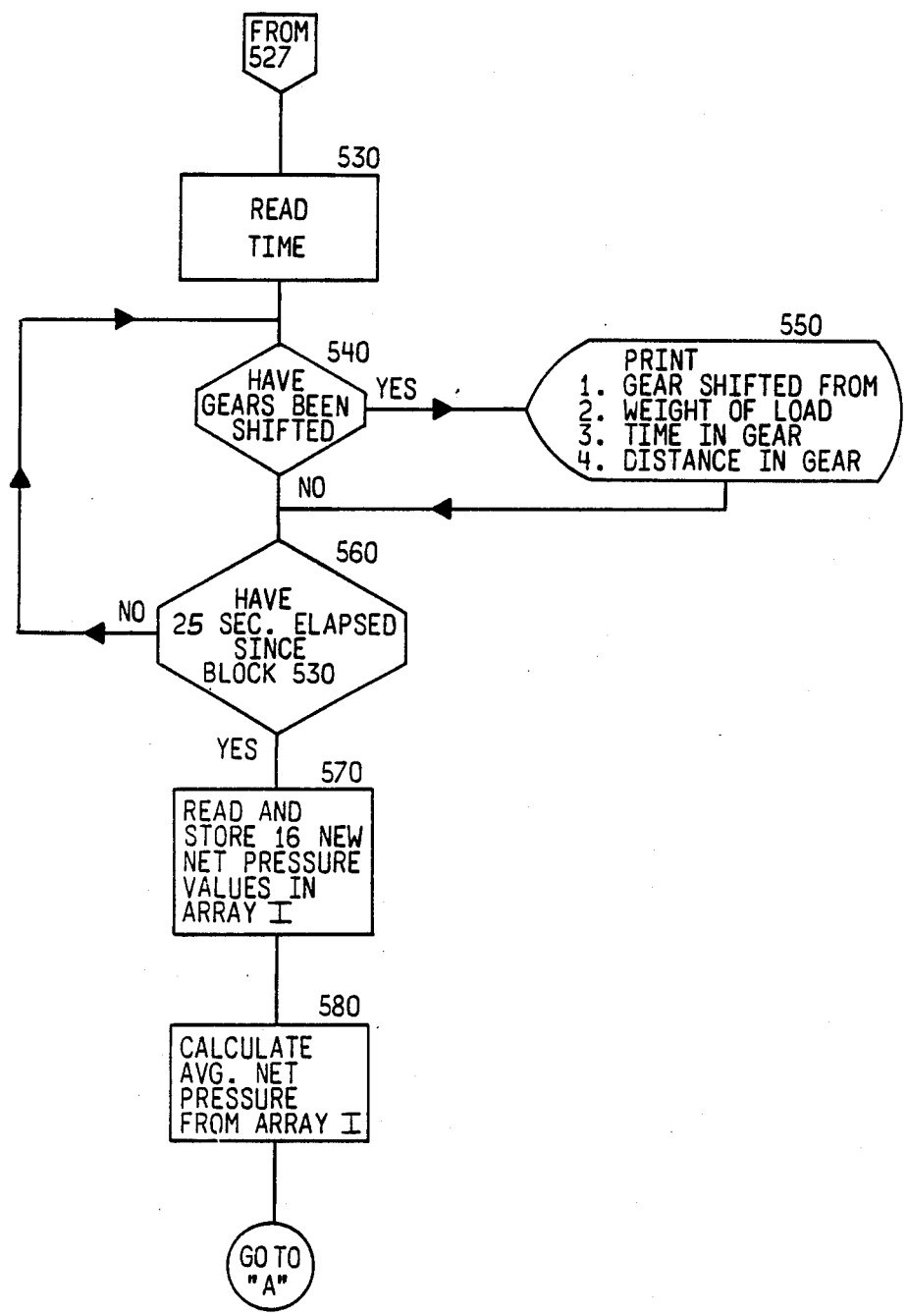
Figure 18F:
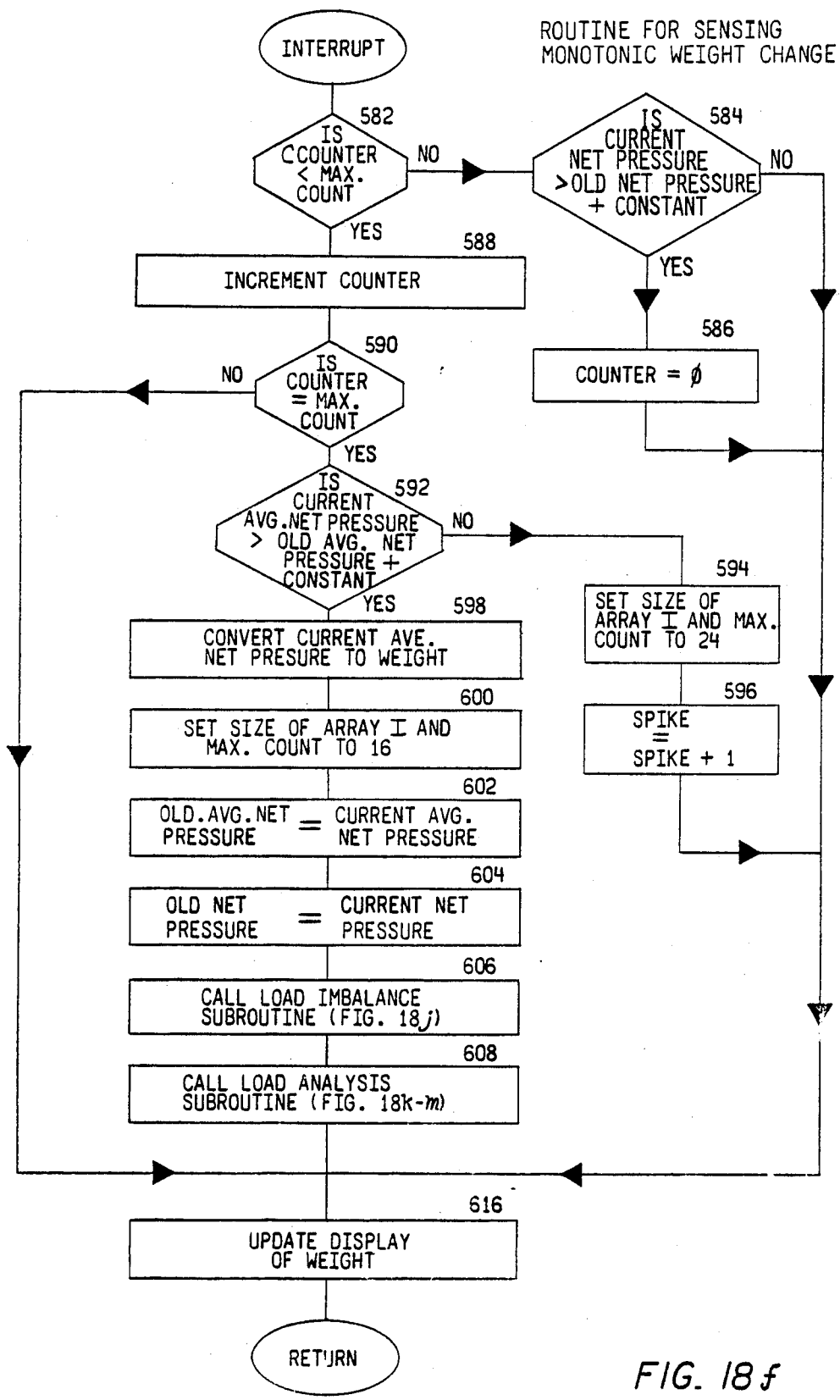
Figure 18H:
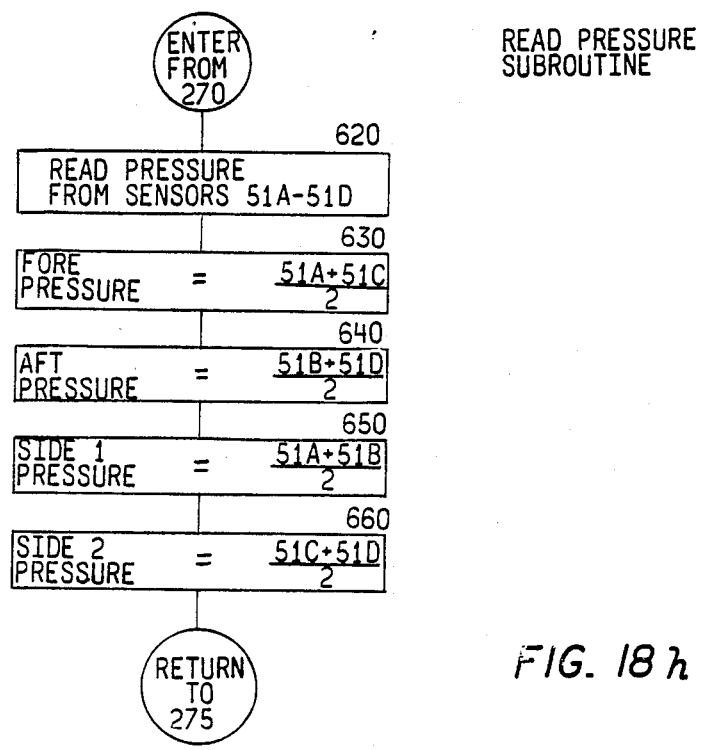
Figure 18:
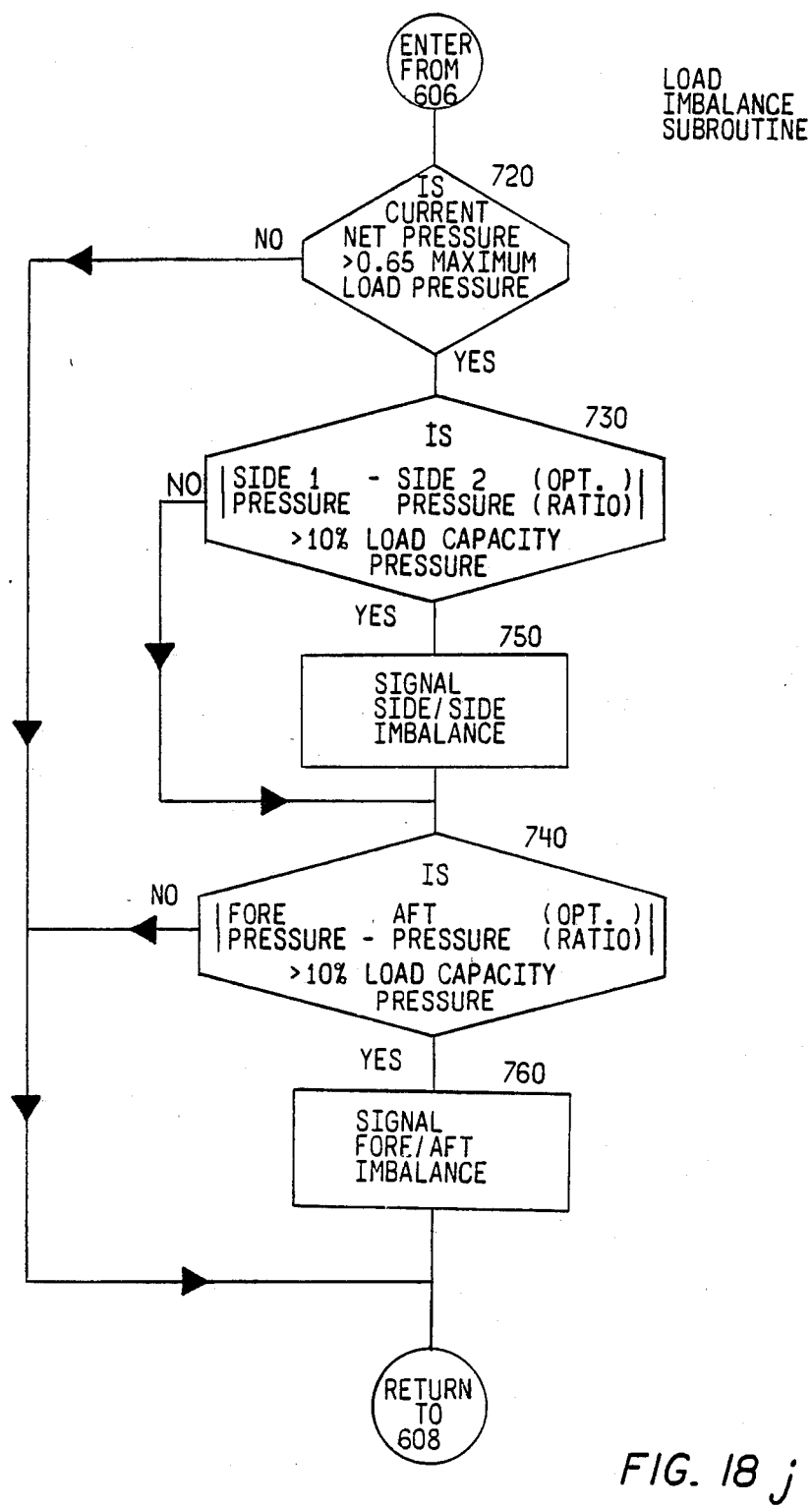
Figure 18K:
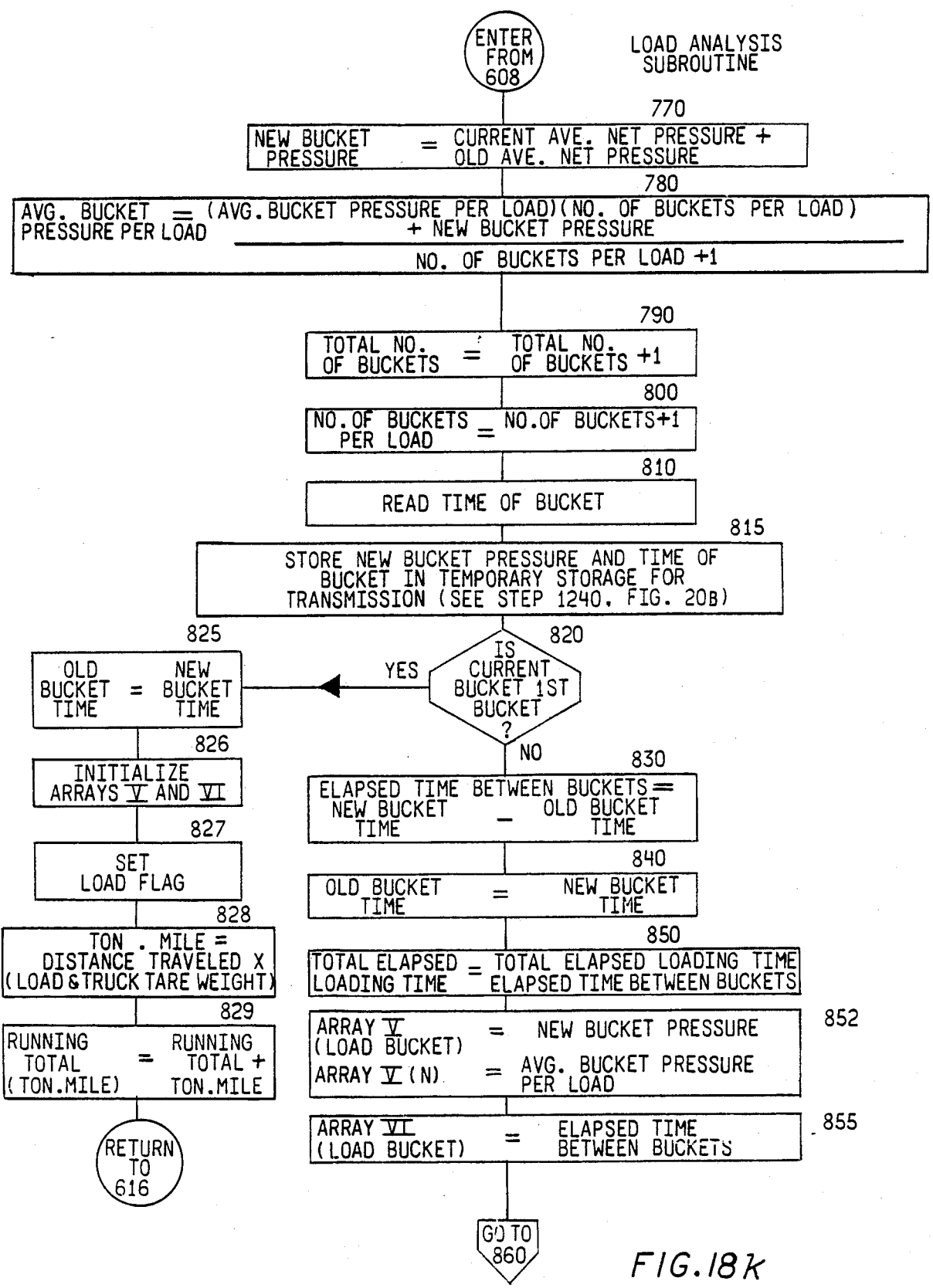
Figure 18M:
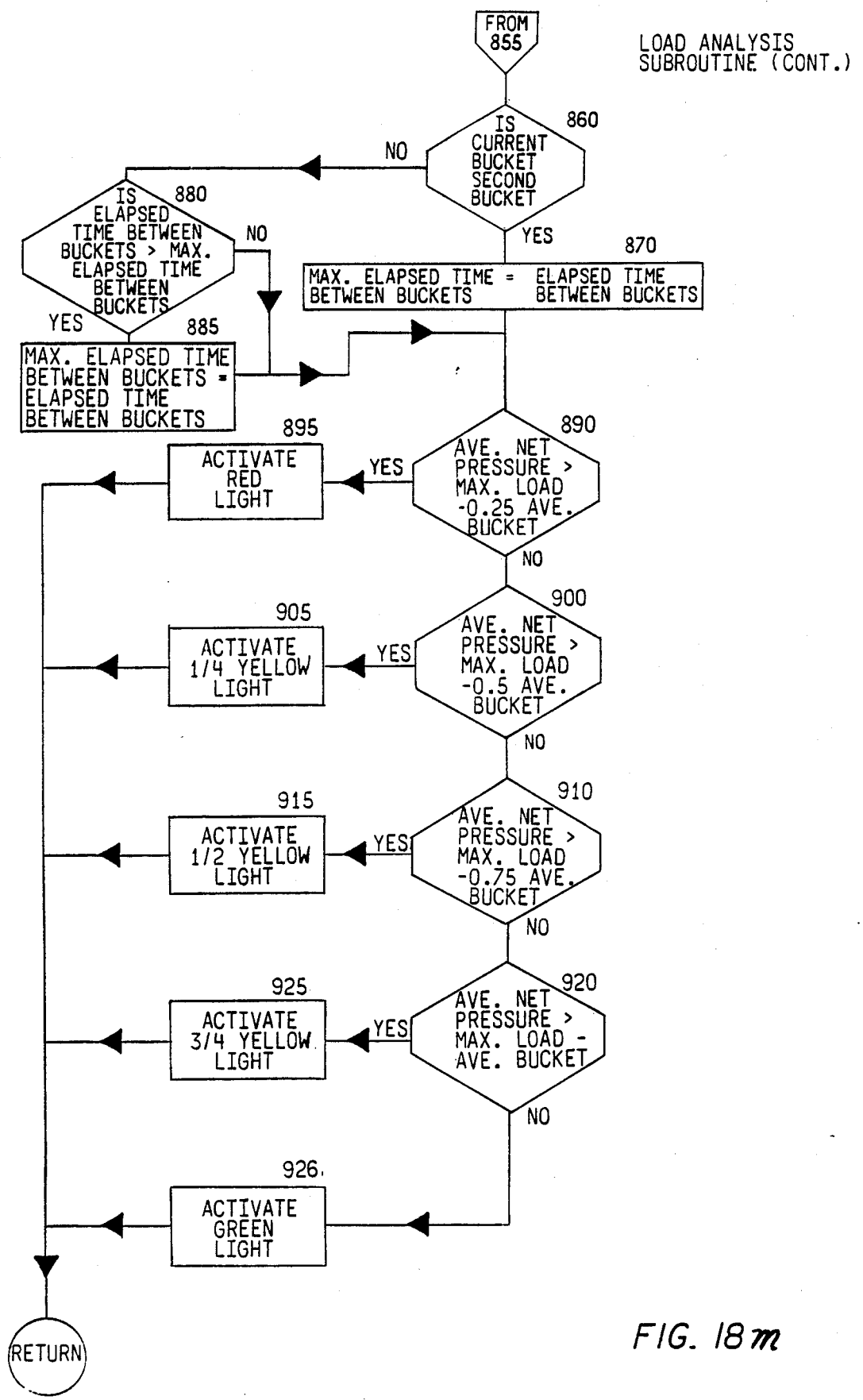
Figure 18:
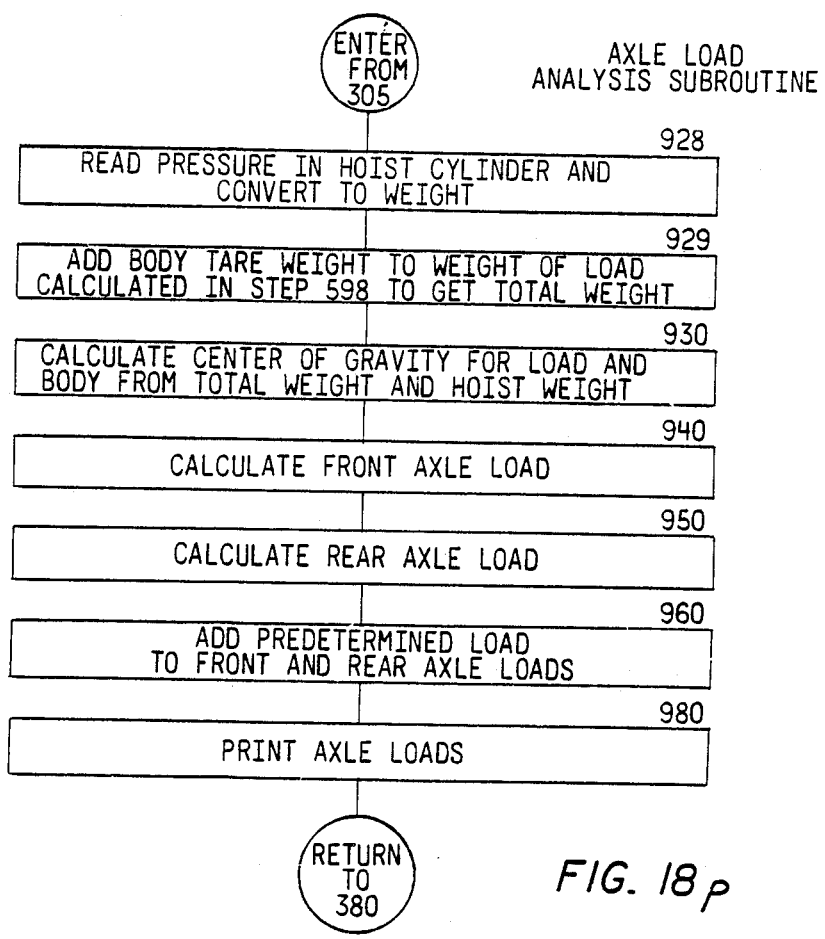
Figure 18R:
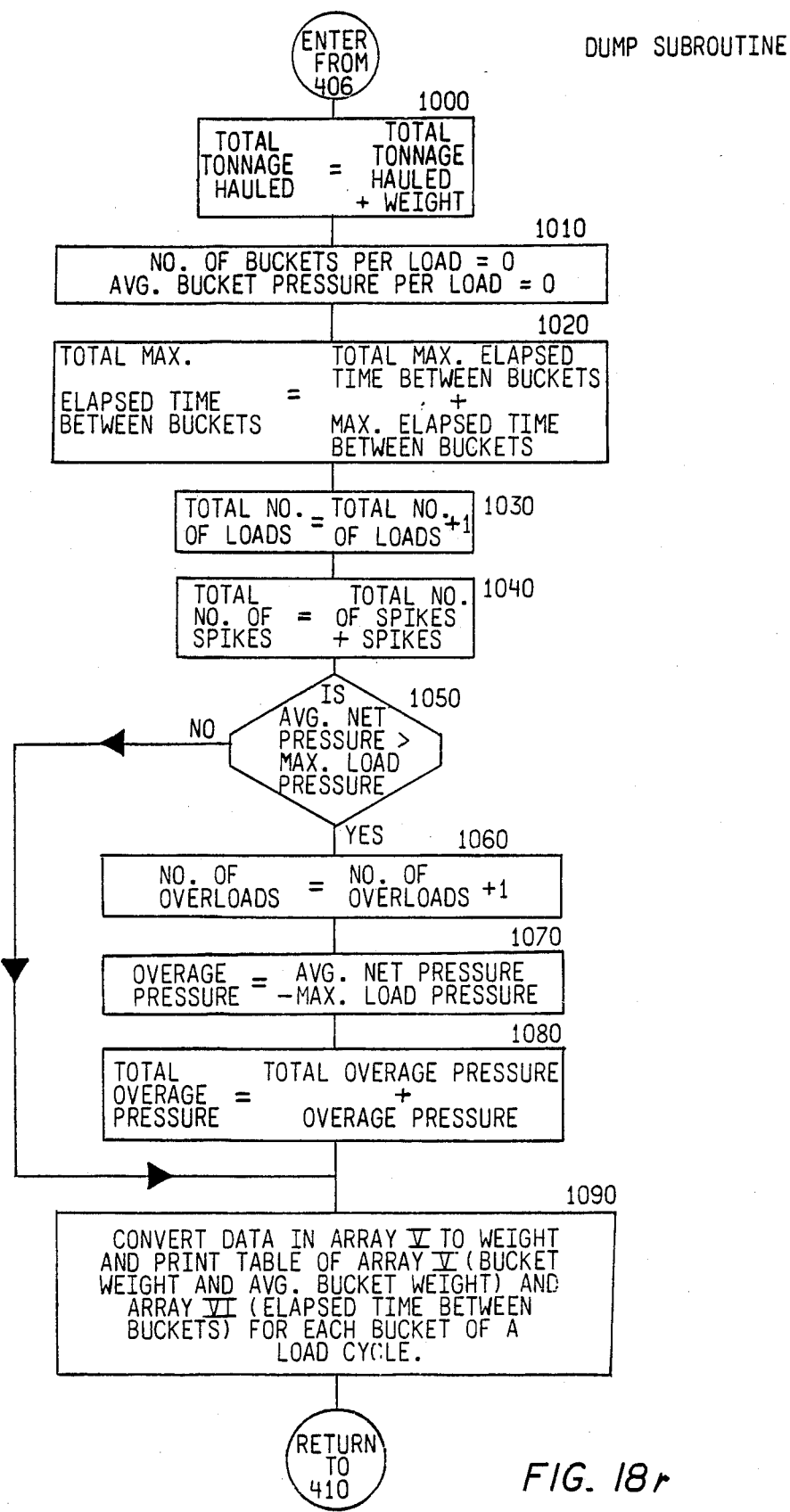

Referring now to the flowchart of FIGS. 18a-18r, the main program of the sensor processing unit 101 for executing all aspects of the invention is illustrated by the flowchart in FIGS. 18a-18e. Various subroutines are called from the main program for executing particular aspects of the invention. These subroutines are illustrated by the flowcharts in FIGS. 18f, h-k, m, p and r. Although these flowcharts are intended to be complete for an operating system, it will be understood that obvious modifications may be made to the program if a user wishes to use less than all aspects of the invention or, in the extreme, simply wishes to transmit pressure data to a remote site as briefly discussed in connection with FIGS. 17a-c.

For the purpose of reducing the complexity of the flowcharts, the multiple steps required to calculate a single pressure value for the pressure sensors 51a-d as described above are treated in the steps of the flowchart as a single step. It will be understood, therefore, that each step requiring the sensor processing unit 101 to read the pressure of the truck body requires the voltage signal from each of the sensors 51a-d to be read in accordance with the following protocol: (1) reading each sensor 16 times in succession, (2) averaging the 16 readings, and (3) averaging the averaged readings from all the sensors in order to obtain a single averaged reading.

Upon starting the truck, the sensor processing unit 101 receives power and starts the processing steps of the flowcharts. It begins by initializing required values at step 210. From step 210, the sensor processing unit 101 moves to step 230 where it reads the time and date from the time clock 126 of the CPU. Next, as indicated by step 240, the date, truck identification number, time and operator identification number are printed by printer 119 or transferred to ARRAY VII for later transmission via transceiver 150. (The truck I.D. number has been previously placed in permanent memory.) As will become more apparent in connection with the remaining explanation of the flowchart steps, virtually all data identified for an output may be transferred to ARRAY VII in order to download the data to a remote location. Radio link downloading will be discussed in greater detail in connection with FIGS. 19a-c and FIGS. 20a-b. The operator identification number is obtained from the keyboard 122 as indicated by step 250. At step 260, a count is preset to a maximum count in order to control later sequencing of the software as explained more fully hereinafter.

After the truck has been turned on and the sensor processing unit 101 initialized in steps 210 through 260, the program moves to the main program loop at step 269 where the distance recorded by the distance sensor 138 is added to a previously calculated total distance in order to update the total distance traveled by the truck. From step 269, the program calls a Read Pressure Subroutine (FIG. 18h) at step 270 wherein the unit reads the pressure from the pressure sensors 51a-d and calculates an average pressure in the manner previously described. In addition, the subroutine also calculates a fore, aft and side-to-side pressure for use in connection with other subroutines as explained hereinafter.

In step 275, the program compares the stored operator number with the current operator number entered into the keyboard 122. If the number is different, the new operator number is stored and the program calls the Operator Summary Subroutine at step 277 for analyzing hauling parameters measured during operation of the truck 11 while under the control of the previous operator. The Operator Summary Subroutine is discussed in greater detail in connection with FIG. 18i. After the Operator Summary Subroutine has been executed or if a change in operator number did not occur in step 275, the program moves to step 280.

In step 280, the predetermined value for the tare pressure is subtracted from the average pressure calculated in step 270 in order to obtain a net pressure value. Since the tare pressure represents the weight of the empty truck body, the net pressure represents the weight of the load carried in the truck body 13. From step 280, the sensor processing unit 101 moves to step 285 (FIG. 18b) where it is determined if the net pressure value is less than zero. If the net pressure is found to be less than zero in step 285, the program branches to step 286. In step 286, the program zeros the net pressure and bucket pressure (bucket pressure will be explained hereinafter in connection with the Load Analysis Subroutine, FIG. 18k). At step 289, the net pressure is stored in the first location of ARRAY I, i.e., ARRAY I(1). The most recent 16 net pressure values are stored in ARRAY I. These 16 values are averaged in step 300 (FIG. 18b) in order to obtain a time averaged net pressure.

In step 304, the program checks to determine if the operator has activated the push button 142 (FIG. 16) to indicate that the axle loads should be calculated. If the push button is pressed, the program branches the main program and executes the Axle Load Analysis Subroutine in step 305. As will be explained in greater detail in connection with FIG. 18p, the Axle Load Analysis Subroutine utilizes the net pressure reading for the truck body and the net pressure from the pressure sensor 139 (FIG. 16) to determine the loads on the front and rear axles.

Referring to FIG. 18c at step 380, the sensor processing unit 101 determines whether a gear shift has been sensed by the gear sensor 135. If it has, the program branches to step 390. In step 390, the sensor processing unit 101 commands the printer 119 to print (or to store in ARRAY VII) (1) the gear from which the truck has shifted, (2) the most recently calculated average net weight, (3) the time spent in the previous gear and (4) the distance traveled in the previous gear (derived from the distance sensor 138 in FIG. 16). Although not shown in FIG. 18c, a flag may be set in step 390 indicating a gear shift for use in connection with downloading data to a central computer discussed in connection with FIGS. 19 and 20. If the truck's gears have not been shifted in step 380 or after completion of the printing function by the printer 119 in step 390, the sensor processing unit 101 determines at step 395 whether the time clock 126 is to be corrected (e.g., change to or from daylight savings time).

If the time is to be corrected, the program branches to step 396 where the time correction is executed. From steps 395 or 396, the program moves to step 400 and determines whether the dump sensor 137 has been activated. If the dump sensor has not been activated at step 400, the program branches to step 405 to decide if 0.1 seconds have elapsed since leaving step 304 and entering step 405. Since step 405 returns the program to step 380 if 0.1 seconds has not elapsed, the delay gives the sensor processing unit 101 an adequate time window for sensing the activation of the dump sensor 137 at step 400 before proceeding further in its program. If 0.1 seconds has elapsed in step 405, the program branches back to step 269 (FIG. 18a).

If the dump sensor 137 is determined to be activated in step 400, the program moves to step 406 wherein a Dump Subroutine is called which summarizes pertinent data of the haul cycle. In addition to identifying, calculating and printing different parameters for a single hauling cycle in the Dump Subroutine, it will be appreciated that the data gathered by the sensor processing unit 101 from the on-board weighing device and the associated sensors may be stored in ARRAY II for a number of hauling cycles in order to provide daily totals or averages of an operator such as, for example, the total tonnage hauled per day, the number of loads hauled per day, the average load hauled on a particular day and the average elapsed time for a haul cycle. The Dump Subroutine is more fully explained in connection with FIG. 18r. From step 406, the program calculates the net pressure in step 410. As indicated in step 410, the resulting single pressure value is stored in the RAM 107 at a location designated for storage of a body-up pressure reading (i.e., a pressure reading corresponding to the truck body raised off the on-board weighing device).

In order to provide an indication for other parts of the program that a dump has occurred, a dump flag is set in step 420. This signal, with a gear change signal and a load signal (discussed in connection with FIGS. 18k and m), provide sufficient information to a central computer for it to control the distribution of trucks 11 to the loader 160 in a manner to minimize load cycle time. This aspect of the invention will be discussed in greater detail in connection with FIGS. 19a–b and FIGS. 20a–b.

In steps 430 and 435, a calculation is performed to update the recorded amount of tire use. In step 430, the distance traveled since the last calculation (the last calculation was taken when the truck began loading as will be explained in connection with the Load Analysis Subroutine of FIGS. 18k and m) is multiplied with the total truck weight, i.e., the measured body weight plus the tare weight of the truck. In step 435, the "ton.mile" data from step 430 is summed with prior "ton.mile" data. The total ton.mile data provides an indication whether the tires of the truck 11 are wearing in accordance with their ton.mile rating. This data can be very important to a mine operator since reliable data regarding tire wear is otherwise unavailable and since replacement of worn tires is expensive. A calculation for ton.-mile is executed by the sensor processing unit every "segment" of a load cycle for which there is a change in body weight; that is, at the end of a haul after the truck has traveled from loader to dump site and at the beginning of a haul after the truck has traveled from the dump site to a loader. The time for the current segment of the load cycle is stored in step 440. The elapsed time indicates how long it took for this load to be delivered to its destination, i.e., from last dump to present dump.

By printing in step 450 (or storing in ARRAY VII for later transmission) the current average net weight (calculated in the subroutine of FIG. 18f) in response to activation of the dump sensor 137, the sensor processing unit 101 provides a hard copy of the truck's load immediately before the load is dumped by the pivoting of the body about hinge assemblies 17. The elapsed time for this load cycle is also printed. The current time is read in step 455. Finally, if it is determined at step 460 that the current time is greater than the last full hour of the time last read in step 460 plus one, the CPU 103 commands the printer 119 to record the time of the dump in step 470. In order to initialize step 460 for its next execution, step 475 sets the present whole hour equal to the previous hour.

Referring to FIG. 18d, in order to re-initialize the sensor processing unit 101 after a load has been dumped, the net pressure array, i.e., ARRAY I, is filled at all of its 16 locations with the body-up pressure calculated during step 410. After this "packing" of ARRAY I in step 480, the sensor processing unit 101 reads the pressure at the pressure sensors 51a–d in step 490 in accordance with the same procedure as previously described. At step 500, that pressure value is stored in one of the storage cells in ARRAY I, thereby replacing one of the body-up pressures "packed" into the array. From the 16 values in ARRAY I, an average pressure is calculated at step 510.

At step 520, the sensor processing unit 101 determines if the average pressure calculated in step 510 is greater than the body-up pressure plus a constant. The constant is added as a buffer in order to ensure the truck body 13 is lowered onto the tubings 47 before the program progresses to the next step. Since initially at step 520 the ARRAY I is packed with the body-up pressure (except for the one reading obtained and stored during steps 490 and 500, respectively), the average pressure calculated from ARRAY I is approximately equal to the body-up pressure. Therefore, if the average pressure is less than the body-up pressure plus a constant in step 520, the sensor processing unit 101 returns to step 490 via step 521 where another pressure reading is made and the resulting pressure is stored into ARRAY I at step 500. With each storage of a new value in ARRAY I, the oldest value is dropped. The average pressure is again calculated at step 510 from the values in ARRAY I and the resulting value is compared to the body-up pressure plus a constant to determine if the truck body has been lowered onto the tubings 47. Steps 490–520 are repeated until the average pressure calculated from ARRAY I reaches a value (because of the lowering of the truck body 13) that is greater than the body-up pressure plus a constant. When this occurs the sensor processing unit 101 will branch from step 520 to step 524 in the flowchart.

Since a negative decision in step 520 indicates the truck body is not fully resting on the on-board weighing device, step 521 checks to determine if the truck is moving before returning the program to step 490. Moving the truck with the body raised may cause serious damage to the hinge assemblies 17 and/or the hydraulic cylinders 19 and 21. If it is determined in step 521 from the distance sensor 138 that the truck is moving, the flowchart branches to steps 522 and 523 wherein the distance traveled is recorded and updated and where a status flag is set for use in connection with step 524.

If the test in step 520 indicates the truck body is completely lowered, the program leaves the loop of steps 490–523 and branches to a test in step 524 in which the status flag of step 523 in investigated. If it has been set, the truck has been moved before the body was fully lowered. Therefore, step 524 branches to step 525 and 526 in response to a set condition of the status flag. In step 525, a running total is kept of the number of dumps for which the truck was moved before the body was fully lowered. Step 526 resets the status flag.

In order to check for a haul-back condition—i.e., not all of the load was dumped—step 527 investigates the pressure from the on-board weighing device to determine if the pressure is greater than tare pressure plus a predetermined margin. In the exemplary embodiment, the margin is seven percent of the optimum load. A determination in step 527 that the average pressure is too great and a haul back condition exists will result in the printing of the operator's number by the printer 119 in step 528 and/or a flashing of the operator's number on display 117 (or storing this data in ARRAY VII for downloading). From steps 527 or 528, the program moves to step 530 in FIG. 18e where the CPU 103 reads the current time for use in connection with a later step.

Referring now to FIG. 18e, at step 540, the gear sensor 135 is again checked to see if a gear shift has occurred. If it has, the program branches to step 550 where the following information is printed by the printer 119 (or transferred to ARRAY VII)—gear shifted from, most recently calculated average net weight, elapsed time in the previous gear and distance traveled in previous gear. As with step 390 in FIG. 18c, the gear change in step 540 may be stored as a status flag in order for it to be included with the downloading of data to a central computer as discussed hereinafter. At step 560 the sensor processing unit 101 determines if 25 seconds have elapsed since the time read in step 530. If it has not, the program returns to step 540 and the unit 101 again checks to see if there has been a shifting of gears. The delay of 25 seconds implemented at step 560 insures that the truck body 13 has sufficient time to fully settle on the truck frame 15 before the sensor processing unit 101 continues through its calculations.

After 25 seconds have elapsed, the sensor processing unit 101 moves forward to step 570 where a new net pressure reading is calculated and loaded into each of the 16 locations of ARRAY I. From the 16 net pressure readings in ARRAY I, a single average net pressure reading is calculated at step 580. From step 580, the sensor processing unit 101 branches back to the beginning of the main loop of the program at step 269, flagged as "A" in the flowchart.

A periodically generated (for example, two seconds) timer interrupt causes the sensor processing unit 101 to execute the steps of the subroutine in FIG. 18f. This subroutine determines whether an increase in current pressure is attributable to a spike (from rough road conditions) or the addition of a bucket. If it is determined the former is the cause of the pressure increase, the subroutine records the increase as a spike in order to monitor road condition; alternatively, if it is determined a bucket has been added, a series of steps are executed to update the load status of the sensor processing unit 101.

Referring to the particular steps in FIG. 18f, an internal counter of CPU 103 is checked in step 582 to determine if the predetermined maximum count set in step 260 of FIG. 18a has been reached. The predetermined maximum count equals the number of cells in ARRAY I in order that successive average pressure values calculated in the subroutine represent completely different sets of pressure data. If the value of the counter exceeds the number of cells in ARRAY I, the program branches from step 582 to step 584 wherein the current net pressure is examined to determine if it is greater than the old net pressure reading plus a constant. The constant is a number which is intended to identify pressure increases from the last average which are great enough to be identified if they later prove to be pressure spikes resulting from rough road conditions. If the current net pressure is greater than the old net pressure plus a constant, the program resets the counter at step 586. Otherwise, the program branches to step 616 whose function will be discussed later. By setting the counter to zero, the next interrupt will result in step 582 branching to 588, instead of step 584 as before.

In step 588, the counter is increment and then examined, in step 590, to determine if the counter has reached the maximum count (equal to the number of array cells in ARRAY I). If the count is less than the maximum count, the readings in ARRAY I are not necessarily all new redings with respect to the last average reading. Therefore, the program bypasses the calculation of a new average net pressure and associated program steps by branching to step 616.

If the current count equals the maximum count, then the program moves to step 592 wherein the current average net pressure from ARRAY I is compared to the old average net pressure plus a constant to account for hardware error from devices such as A/D converter 129 (the old average net pressure is the average net pressure which served as the current net average pressure the last time step 592 was answered yes). If the current net average does not exceed the old net average, then the increase in pressure which caused the counter to reset in steps 584 and 586 must have been a spike and not a sustained increase in weight indicative of an added bucket. Therefore, the program branches to step 594 wherein the size of ARRAY I is increased to 24 and the corresponding maximum count is increased to 24. By increasing the size of ARRAY I, more readings will comprise each average thereby mitigating the effect of pressure spikes. In order to monitor the roughness of the road, the pressure spikes are recorded in step 596. From step 596, the program branches to step 616. In step 616, the weight displayed by the LED display 117 (FIGS. 2b and 16) is refreshed. Alternatively, or in addition to this, new weight data can be transferred to ARRAY VII for downloading to a remote site via a radio link.

If the current average net pressure is greater than the old average net pressure plus an error factor, than a sustained increase in the load is indicated, i.e., a bucket has been added. Therefore, the load is updated in steps 598–608. In step 598, the current average net pressure is converted to weight in preparation for display. Because the truck is being loaded (as indicated by an added bucket), the truck can be assumed not to be moving; therefore, spikes are unlikely to occur. Based on the foregoing assumption the size of ARRAY I is reduced to 16 in step 600 in order to provide more frequent averages (the maximum count is also set at 16). In order to provide an old net average pressure and an old net pressure for the next interrupt in which the count equals the maximum count, the present average net pressure and present instantaneous net pressure are designated old pressures in steps 602 and 604.

Since the truck 11 is in the process of loading, a Load Imbalance Subroutine is called in step 606 and a Load Analysis Subroutine is called in step 608. These subroutines will be discussed in detail in connection with FIG. 18j and FIGS. 18k and m, respectively. From steps 590, 608, 584, 586 or 596, the program updates the average weight shown on the display 117. Of course, if steps 598–608 have been bypassed, the updated average weight is the same as the old average weight. After the routine of FIG. 18f has executed its steps, the sensor processing unit 101 returns to the main program of FIGS. 18a–18e.

Turning to the subroutines illustrated by the flowcharts in FIGS. 18h–k, m, p and r, each subroutine is called from the main program represented by the flowchart in FIGS. 18a–f. For the Read Pressure Subroutine of FIG. 18h, the subroutine is called from step 270 in the main program. In the first step of the subroutine, a single average pressure reading is obtained in step 620 for the on-board weighing device in the manner previously described. From step 620, the subroutine calculates fore and aft pressures in steps 630 and 640, respectively. In order to calculate the aft pressure, the average pressure readings from the rearwardly positioned sensors 51b and 51d are averaged. Correspondingly, in order to provide a forward pressure, the pressure values from the forwardly positioned sensors 51a and 51c are averaged. These fore and aft pressure readings are used in connection with the Imbalance Subroutine called in step 606 and set out in FIG. 18j.

In steps 650 and 660 of the Read Pressure Subroutine, the side-to-side pressure of the truck body on the on-board weighing device is determined. Specifically, in step 650, the averaged pressure readings from sensors 51a and 51b on a first side of the truck 11 are averaged in order to provide a pressure for the first side. Correspondingly, for the opposite side, the averaged pressure readings from sensors 51c and 51d are averaged. As with the fore and aft pressure readings, the side-to-side pressure readings are used in connection with the Imbalance Subroutine of FIG. 18j. After the pressure sensors 51a-d have been read and the appropriate pressure measurements calculated, the subroutine returns to the main program at step 275.

Referring to the Operator Summary Subroutine in FIG. 18i, data indicative of operator performance may be gathered and stored during truck operation under the control of a particular operator number and thereafter summarized and displayed or printed when the operator number is changed. Although the steps of FIG. 18i are described in connection with organizing data in connection with an operator number, it will be appreciated that the number, input via keypad 122, need not only be indicative of an operator change, but it may also be indicative of changes in truck status occurring while under the control of a single operator, e.g., hauling, break time and other identifiable time segments in a daily routine. For example, summaries in accordance with FIG. 18i may be kept for the duration of the control by an operator, but entry of an additional number via keypad 122 may be recognized by the sensor processing unit 101 as identifying a loader for which summaries are also to be kept. When the truck is directed to a different loader, the operator merely enters the new loader number into the sensor processing unit 101 via the keypad 122 and, in response to the number change, the unit outputs the performance summaries while the truck was loading from the previous loader. From the foregoing, other natural extensions of this concept exemplified in FIG. 18i will be obvious to those familiar with mining management.

The flowchart for the Operator Summary Subroutine sets forth exemplary types of data that can be stored and summarized by the on-board weighing device during its normal operation. For example, since the on-board weighing device calculates the total load for each hauling cycle, the load may be stored and accumulated for all the hauling cycles for a particular truck operator number. By accumulating pressure readings from the on-board weighing device which reflect the total tonnage hauled by the operator, useful information indicative of operator performance can be obtained.

In order to mark the end of the time interval for which the truck was under the control of the previous operator number, the present time is read in step 669. In step 670, the current time or real time in step 669 is designated as the "new operator time". To find the elapsed time of control under the previous operator, the old operator time is subtracted from the new operator time in step 671. In order to prepare for the next operator change, step 672 sets the new operator time identified in step 670 equal to the old operator time. In step 673, the total tonnage hauled is divided by the total number of buckets (which is also counted and accumulated) in order to give an indication as to the average weight for each bucket. The weight of the average load is found in step 674 by dividing the total tonnage hauled by the total number of loads. In addition, in step 675, the total number of spikes recorded during the hauling cycles is divided by the total number of loads to provide an average number of spikes for the loads which is indicative of the degree of road roughness. To provide an indication of wire tear, the subroutine calculates a value for tons-miles per hour in step 676 by dividing the total "ton.mile" from step 435 by the total time under operator control. In order to display the average time for a haul cycle, step 677 divides the total time under operator control by the total number of loads by the operator. To find the average distance traveled per load cycle with the body of the truck raised, step 678 divides the total body-up distance (from step 522) by the number of body-up loads (step 525). The foregoing data is stored in ARRAY III of RAM 107.

In step 680, the average number of buckets per load is calculated from information accumulated during the hauling cycle i.e., the total number of buckets from step 790 and the total number of loads hauled by the operator. In step 690, the average time between buckets is calculated. Since the addition of each bucket is sensed by the routine of FIG. 18f, the time between successive buckets is easily determined (in step 850). By summing the times and storing the sum in ARRAY II, the average time between buckets for an operator can be calculated and printed. This average will give an indication of possible problems during the loading cycle. In step 700, the longest time interval between buckets for each hauling cycle (from step 1020) is summed and divided by the total number of hauling cycles to give a value indicative of the averge maximum interval between buckets for the operator. Finally, in step 710 the average values calculated in steps 670-700 are printed by printer 119 in order to give the operator and his employer a hard copy of the foregoing hauling parameters. Of course, as with the previous data outputs, this data may be transferred to ARRAY VII to await downloading to a central computer via a radio link established by the on-board transceiver 150. From step 710, the subroutine returns to the main program at step 280.

Referring now to FIG. 18j, the Imbalance Subroutine called from step 606 in the routine of FIG. 18f tests to determine if the weight distribution of the load carried by the truck body 13 is significantly imbalanced. In step 720, the Imbalance Subroutine checks to determine if the most recent net pressure reading is greater than 65 percent of a predetermined maximum load pressure. If the truck body 13 has not yet been loaded to this percentage of its capacity, then the program will exit the subroutine and return to the main program at step 608 in FIG. 18c. When the truck body has been loaded to a weight which is greater than 65 percent of the maximum load the Imbalance Subroutine will test for side-to-side imbalance and fore-and-aft imbalance in steps 730 and 740, respectively.

In step 730, the side-to-side balance is tested by determining if the optimum balance ratio (i.e., 1.0) multiplied by the pressure of the second side and subtracted from the pressure of the first side has an absolute value greater than, for example, ten percent of the truck's load capacity. If the test in step 730 indicates an imbalance of the load, the subroutine activates the display 117, audio output 196 (FIG. 2b) and/or printer 119 (FIG. 16) at step 750 in order to warn the operator of the truck. This data may also be downloaded via ARRAY VII. From step 750, the program checks for fore-and-aft imbalance at step 740. Alternatively, if a side-to-side imbalance is not indicated by the test in step 730, the subroutine branches directly to step 740 where a algorithm similar to the algorithm in step 730 is utilized to test for a fore-and-aft imbalance. (The optimum ratio for fore-to-aft balance may be, for example, $-3$ to $+3$.) If a fore-and-aft imbalance is indicated in step 740 the program moves to step 760 wherein the display 117 inbalance signal 197 (FIG. 2b) and/or printer 119 (or other indication such as truck mounted light 197 to alert loader operator) is activated to alert the truck operator that the truck body is loaded in an imbalanced condition which may cause damage to the truck (this data may also be downloaded via ARRAY VII). From the Imbalance Subroutine, the program moves to the Load Analysis Subroutine.

Referring now to FIG. 18k, the Load Analysis Subroutine provides data related to the loading of the truck body by a loader using a bucket to load the body. By analyzing and summarizing data related to the buckets which incrementally load the truck body, useful information regarding the efficiency of the hauling cycle can be obtained. The Load Analysis Subroutine is called from the routine of FIG. 18f if it is determined at step 592 that the current average of the net pressure readings in ARRAY I is greater than the old average net pressure plus a predetermined constant. As explained in connection with FIG. 18f, when the current average of the net pressure readings in ARRAY I is greater than the old average of the net pressure plus a constant, it can safely be assumed a bucket has been added to the body of the truck; therefore, the Load Analysis Subroutine will be executed starting at step 770 wherein a new bucket pressure is calculated by subtracting the old average net pressure from the current average net pressure.

In step 780, an average value for the bucket pressure for this load is calculated by multiplying the previous average bucket pressure per load by the number of previous buckets per load and adding the product to the new bucket pressure calculated in step 770. The foregoing sum is then divided by the number of buckets per load which is the number of previous load buckets plus one. In steps 790 and 800, the subroutine updates the number of total buckets and the number of buckets for the current hauling cycle, respectively. In steps 810–815, the time of the bucket is recorded for use in connection with steps in the Load Analysis Subroutine to be discussed hereinafter.

In step 820 of the Load Analysis Subroutine, a test is conducted to determine if the current bucket is the first bucket of a hauling cycle. If the current bucket is the first bucket of a hauling cycle, the program branches to steps 825–829 before returning to the main program loop at step 616 in FIG. 18c. For use in connection with later calculations related to bucket loading time and total buckets, step 825 renames the "new bucket time" as the "old bucket time" and initializes ARRAYS V and VI of RAM 107. For use in connection with communicating with a central computer for controlling the flow of the truck fleet, a load flag is set in step 827. This flag is used in connection with transmitting data from the on-board weighing device to a central computer as will be explained in greater detail in connection with FIGS. 19–20. Finally, in steps 828 and 829, a fresh ton.mile rating is taken which corresponds to the ton.mile rating for the haul segment from the dump site to the load site.

If the current bucket is not the first bucket of a hauling cycle, the program branches from step 820 to steps 830–860. In step 830, a calculation is made of the elapsed time between the addition of the current bucket and the time at which the previous bucket was added at step 830. In step 840, the bucket times are updated in order to prepare the data for the next bucket. In step 850, the elapsed time between the current bucket and the previous bucket is added to a running total of time intervals between buckets to provide a total elapsed loading time. This total elapsed loading time is used in connection with step 690 of the Operator Summary Subroutine in order to provide data indicative of truck and operator performance.

In order to store the net pressure of each bucket, step 852 loads ARRAY V with the pressures for all the buckets of a current load cycle. The last cell, N, in ARRAY V is used as a storage location for the value of the average bucket weight for a load. In connection with the storage of these pressures, step 855 stores the elapsed time between the addition of buckets in a load cycle in ARRAY VI. The data in ARRAYs V and VI may be used in connection with providing a detailed performance report of each load cycle.

In step 860–885, the longest elapsed time between buckets is found. In step 860, the program tests to determine if the current bucket is the second bucket. If the current bucket is the second bucket, then the program automatically designates the current elapsed time between buckets as the maximum elapsed time between the buckets in step 870. Alternatively, if the current bucket is not the first or second bucket as determined in steps 820 and 860, the program will branch to step 880 wherein the current elapsed time between buckets is tested to determine if it is greater than the maximum elapsed time between buckets previously recorded. If the current elapsed time between buckets is not greater than the previously recorded maximum elapsed time between buckets, the program branches to step 890 (FIG. 18m); otherwise, the program designates the elapsed time between buckets as the new maximum elapsed time between buckets at step 885. The maximum elapsed time is used in connection with step 700 of the Operator Summary Subroutine.

Referring now to FIG. 18m, the current average net pressure is tested to indicate whether the load of the truck body is sufficiently close to the maximum load capacity of the truck such that further addition of material by a full bucket would overload the truck body. In order to prevent the truck from being overloaded, steps 890–920 test to determine if the remaining capacity of the truck body 13 is less than the weight of an average bucket for this load as calculated in step 780 of the subroutine.

Specifically, in step 890 the average net pressure is compared with the predetermined maximum of the truck body minus one-quarter of the average bucket. If the average net pressure is greater than the maximum load minus one-quarter of the average bucket, the truck body will be overloaded by the addition of as little material as fills one-quarter of the bucket. Therefore, the subroutine branches to step 895 wherein the red light 140e of the load indicator panel is activated. The red light 140e serves to warn the loader operator that the truck body 13 is loaded to a capacity which any further loading would overload the truck body.

If the average net pressure is not greater than the maximum load minus one-quarter of the value of an average bucket the subroutine moves to step 900 wherein the current average net pressure is compared with the predetermined maximum load minus one-half the value of an average bucket. If it is determined that the current average net pressure is greater than the maximum load minus one-half the average bucket, the subroutine branches to step 905 wherein the one-quarter yellow light 140d of the load indicator 140 in FIG. 16 is activated. For the loader operator, the one-quarter yellow light 140d indicates that the loader may add further material to the truck body 13 but only an amount less than one-quarter of the volumetric capacity of the bucket of the loader.

If the test in 900 determines that the average net pressure is not greater than the maximum load minus one-half the average bucket, then the subroutine tests at step 910 to determine whether the current average net pressure is greater than the maximum load minus three-quarters the value of the average bucket. If a positive determination is made in step 910, the subroutine branches to step 915 wherein the one-half yellow light 140c is activated on the load indicator 140. In a similar manner as the one-quarter yellow light 140d, the one-half yellow light 140c indicates to the operator of the loader that the next bucket of material must fill the bucket no greater than one-half the volume of the bucket in order to avoid overloading the truck 13.

If the test in step 910 is negative, the subroutine tests to determine if the current average net pressure is greater than the predetermined maximum load minus a full average bucket. If the test in step 920 is positive, the subroutine activates the three-quarter yellow light 140b of the load indicator 40 in step 925. If the test step 920 is negative, the green light 140a of the load indicator 140 is activated in order to indicate to the operator of the loader that a full bucket load of material may be added to the truck body 13 without overloading the body. From steps 890-926, one of the lights 140a-e on the load indicator 140 will always be activated during the loading of the truck body 13.

Digressing briefly to FIG. 16, the lights 140a-e of the load indicator 140 are positioned in a stacked arrangement such that there relative positions give an indication of the degree of remaining truck capacity. Specifically, the green light 140a occupies the lowermost position in the stack of lights 140a-e, thereby indicating that the truck body has capacity for a full bucket load. The red light 140e at the top of the stack, indicates the truck body is full and no further bucket loads can safely be added. The three lights 140b-d are positioned intermediate the green and red lights in order to indicate weight capacities intermediate the full bucket capacity symbolized by the green light 140a and no remaining capacity symbolized by the red light 140e.

Referring now to FIG. 18p, the Axle Load Analysis Subroutine is called from the main program at step 305 when a determination is made in step 304 that the operator has called for an analysis of the axle load. As explained in connection with the illustration of FIGS. 13a and 13b, the pressure in the hoist cylinders 19 and 21 is required to calculate the distribution of the load between front and rear axles. Accordingly, in step 928 the pressure from sensor 139 (FIG. 16) is read by the CPU 103 and converted to a weight measurement. In order to get a total body weight, the weight of the load derived from the current average pressure is added to the tare weight of the truck body in step 929. In step 930 the center of gravity for the load is calculated from the total weight and the weight measurement from the sensor 139 in the hoist cylinder system. The particular algorithm used in step 930 in order to calculate the location of the center of gravity for the load is set forth as equation 2 in connection with FIGS. 13a and 13b. With the center of gravity for the load known, the distribution of the load over the front and rear axles is determined in steps 940 and 950, respectively, using equations 4 and 6.

In step 960 the tare weights for the front and rear axle are added to the axle loads for the front and rear axles calculated in steps 940 and 950. Therefore, the adjusted pressure readings for the front and rear axles obtained from step 960 reflect a total weight over the front and rear axles. Finally, in step 980, the subroutine commands the printer 119 to print the weights bearing on the front and rear axles (or store in ARRAY VII).

Turning now to FIG. 18r, the Dump Subroutine is called by step 406 of the main program after the dump sensor has been activated as detected in step 400. The Dump Subroutine summarizes selected parameters at the end of a hauling cycle which is indicated by the activation of the dump sensor 137. In step 1000, the current average net weight is added to the total of previous weights hauled in order to provide the total tonnage hauled by the truck while under control of the operator. The total tonnage hauled is used in connection with the Operator Summary Subroutine. Because the activation of the dump sensor 137 indicates an end to a hauling cycle, the number of buckets per load and the average bucket pressure per load are set equal to zero in step 1010 in order to initialize these values for the next hauling cycle. In step 1020, a total maximum elapse time between buckets is updated by adding the maximum elapsed time between buckets for the last load cycle.

In order to record the number of hauling cycles, step 1030 increments a stored number identified as "total number of loads" which is used in connection with the Operator Summary Subroutine to provide averaged data indicative of operator performance. In order to keep track of road roughness, the total number of spikes recorded during a hauling cycle is accumulated in step 1040 with the number of spikes during previous hauling cycles. The total number of spikes is used in connection with the Operator Summary Subroutine in order to provide an indication of road quality. Following step 1040, spikes are set equal to zero in order to provide a frsh basis for accumulating spikes in the next load cycle.

In step 1050, a test is conducted to determined whether the current average net pressure is greater than a predetermined maximum pressure which corresponds to the maximum weight capacity of the truck. If the test in 1050 is positive, the overloading of the truck is recorded in steps 1060-1080. In step 1060, an overload counter is incremented to indicate that the present hauling cycle was an overload cycle. In step 1070, the amount of overloading or "overage pressure" is calculated by subtracting the average net pressure from the maximum allowable pressure. The average pressure for the present hauling cycle is added to a total overage pressure for all hauling cycles in order to provide a pressure value indicative of the total weight by which the truck has been overloaded. From either step 1080 or from a negative indication in step 1050 the Dump Subroutine moves to step 1090 wherein the printer 119 (FIG. 16) is activated to print the weight of each bucket for the just completed haul cycle (stored in ARRAY V) and the elapsed time between each bucket (stored in ARRAY VI). This data may also be transferred to ARRAY VII for downloading.

As is apparent from the foregoing description, large amounts of data are gathered from the on-board weighing device and related on-board sensors. When a plurality of trucks in a fleet are equipped to collect such data, in order for this data to be of the most benefit to fleet operators, this data needs to be downloaded for long term storage and analyzation in order to create and maintain a historical file of truck fleet activity and performance. Obviously, the printer 119 provides a permanent record. However, for large fleets it is cumbersome, at best, to store this data in this form with an intent of later analyzation and reference. Therefore, to allow the data generated to be more easily manipulated and analyzed, the sensor processing unit 101 may be coupled to a storage memory such as a cassette tape or non-volatile memory pack in order to download the ARRAYS when they reach their capacity. However, downloading in this manner is not on a real time basis and it requires operator or management intervention in order to assure the downloaded data is collected in a timely manner i.e., collection of paper tape.

For the data generated by the sensor processing unit 101 to be of the greatest benefit and value it needs to be gathered and analyzed on a real time basis (as opposed to gathering paper tapes at the end of a work cycle) so that as data is generated by a fleet of trucks it can be immediately gathered to provide a real time analysis of fleet operations. Therefore, preferably, and in accordance with the invention, the accumulating real-time data can be of the most value if it is downloaded by a radio link from the on-board device to a remote fixed location where a historical real-time file can be created and analyzed in order to give management personnel at a remote site a current indication of truck fleet performance. By analyzing the downloaded real-time data on a historical real-time basis, the loaders of the trucks may also be evaluated. As a feature of the real-time data gathering by radio link data downloading, each truck in a fleet is able to communicate with a central computer via radio links with one or more repeater points. As this occurs, these repeater points can in turn communicate back data from the central computer to the individual trucks; Therefore, instructions/directions can be sent selectively to trucks.

Referring to FIG. 19a, in mining operations or similar type hauling, it is not unusual for there to be simultaneously hauling of overburden, coal or the like. Also, in large operations, more than one loader 160 services the truck fleet and there may be more than one dump site. Gathering data generated by the sensor processing unit 101 and controlling traffic flow from the dump sites to the loaders 160 or vis-versa becomes unwielding, and therefore inefficient, when the mining operation is large and many trucks and loads are involved. As a function of its data gathering capabilities, the on-board weighing system described herein allows the electronic system of FIG. 16 to accurately record the elapsed time of a hauling cycle or segments thereof and, since the on-board weighing system provides an indication to the electronic system when a load cycle begins and ends, as a transceiver 150 is mounted to each truck 11 (illustrated in FIG. 19a) for data downloading with a central computer 155. This data when gathered by the central computer 155 and analyzed can be utilized by the central computer to provide instructions and directions for efficient traffic control and remote monitoring of truck performance. Other data, in addition to the above, as outlined in the flowcharts of FIGS. 18a–r is also downloaded to the central computer 155 for storage and analysis from the on-board weighing device. As will be explained in greater detail hereinafter, data downloading communication between the trucks 11 and the central computer 155 is handled by strategically located repeaters 160a and 161 in FIG. 19a.

The central computer 155 receives data from the electronic circuitry on the truck 11 by way of the radio (or hard wire) links 157 (or hard wire links from stationary pick up points such as dump sites). In order to provide a two-way link, the central computer 155 includes a transceiver 155a. Data received from the trucks 11 is processed by the CPU 155b with the aid of PROM 155c and RAM 155d. The CPU 155b communicates to the PROM 155c and RAM 155d along a bus 155e in conventional fashion.

Because the on-board weighing device and its associated circuitry determines when a load cycle starts (the first bucket is sensed) and ends (first gear shift after first bucket) and when a dump begins (as well as other operating data), the central computer 155 is able to use this data to provide efficient instructions and directions for controlling movement of the trucks without depending on any human cooperation, e.g., no one need remember to manually hit a load or dump switch to signal the central computer. Because the system is fully automated, it is highly reliable. In addition, the data gathered by real-time radio data downloading from the on-board weighing device, when stored and analyzed by the central computer, allows precise control of the routing of the trucks for top efficiency.

Referring to FIG. 19b, by way of transceiver 150 the trucks 11 download a data frame comprising a synchronization word followed by the truck number and data representative of a truck condition, e.g., a load or dump condition. In response to this received data from the trucks 11, the central computer stores and analyzes this data. After the central computer properly analyzes this data it may, depending on truck status, send a data frame comprising a synchronization word followed by the particular truck and loader numbers. In order to prevent simultaneous or overlapping transmissions from the trucks 11, the trucks 11 transmit in response to an inquiry signal from the central computer 155. The central computer 155 polls the trucks 11 to determine if any truck is ready to send data. In response to a polling, the trucks 11 response by transmitting the required data (dump, load or other data) in the format shown in FIG. 19b.

Keying the transceiver 150 for transmission of the data frame occurs in response to the sensing of data generation such as a dump condition (activation of the dump switch 137) a load condition (sensing of a first bucket) and the like. Obviously, whether the data frame includes load or dump data indications depends on whether the dump switch 137 has been activated or whether a first bucket has been added. As will be explained in greater detail in connection with FIGS. 20a-b, the central computer 155 receives the data in the data frame from the trucks 11 and concludes from the data which loader 160 can provide the quickest load cycle time for a truck now dumping and therefore ending its previous load cycle or which dump site is the proper one for a truck now loading and therefore ready for instructions and/or directions to a dump site. Once the central computer 155 has determined which loader will minimize the time of a load cycle or which dump site is the proper one, the computer transmits by way of transceiver 155a the data frame containing a particular truck number the computer wishes to address and a particular loader or dump site number which the computer wishes to direct the truck. Each truck receives the data frame from the central computer 155, but only the truck having the same number as the number transmitted with respond to the data containing the loader number. When the truck number and the truck number data correspond, the loader dump site or other site designation number transmitted with the truck number is either displayed on the LED display 117 of the designated truck or printed as hard copy on the truck's printer 119. From the loader number, the truck operator knows which loader to go to for his next load. By analogy, the central computer 155 may also deliver destination data when multiple dump sites are used or a rest stop designation if the operator is scheduled for a break. Many other useful destinations will be appreciated by those familiar with mining operations.

Referring briefly to FIG. 19c, an opening 1300 may be provided in the floor of the body 13 for allowing a switch assembly to sense the presence of a load and thereby indicate to the sensor processing unit 101 when loading begins. Such a device could combine with the sensor processing unit 101 to give a simplified truck dispatch system according to FIG. 19a. With the addition of the switch assembly of FIG. 19c, the on-board weighing device and its complementary load sensors (except the dump sensor) are not required for simply dispatching trucks in response to load and dump signals only.

The opening 1300 in the floor of the truck body 13 is covered by a flexible, but rugged material 1301 such as a thick rubber mat which is secured to the bed of the truck body along its perimeter. A hinged flap 1302 is biased upwardly by a spring and shaft assembly 1303. In response to the introduction of material into the truck body 13, the flap 1302 closes over the opening 1300 and pushes down the plunger of a switch 1304. Of course, the switch closure generates a signal indicative to the sensor processing unit 101 of the starting of loading.

Figure 20A:
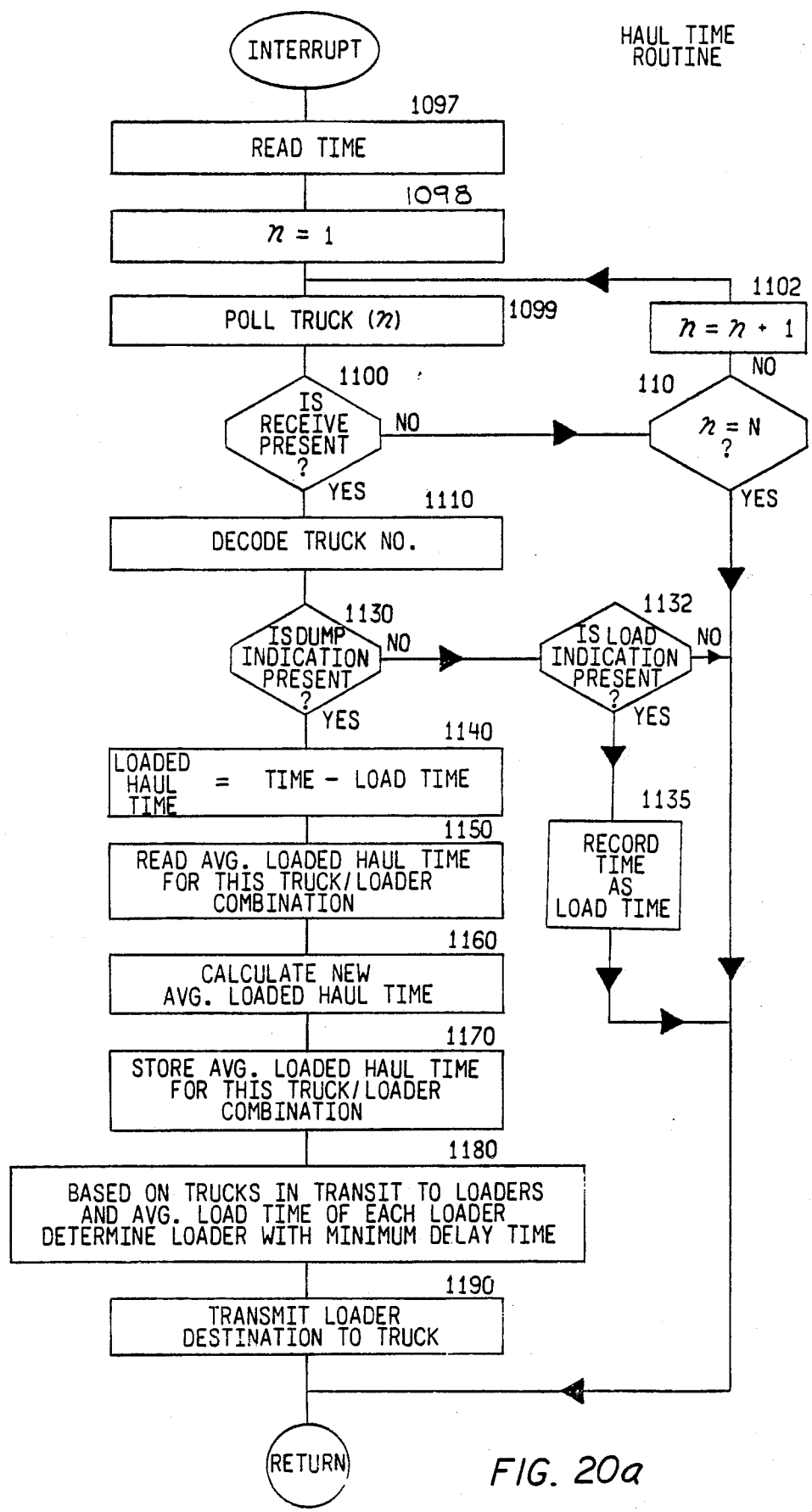
FIGS. 20a and 20b are flowchart diagrams for the software of the central computer and truck, respectively, utilized in connection with the truck distribution system of FIGS. 19a and 19b.

In the flowchart of FIG. 20a, the data received from the trucks 11, is manipulated and stored in order to accurately determine the correct loader to route a truck when it completes a haul cycle. A periodic interrupt causes the central computer to execute the steps of FIG. 20a. At each interrupt, the central computer 155 polls all the trucks 11 for data. In step 1097, the present time is read and temporarily stored. In step 1098, the truck number is initialized to a starting value. The transceiver 155a is keyed in step 1099 and a formated inquiry signal is sent to the designated truck. If data is detected in step 1100, the computer reads the data and manipulates it in accordance with steps 1110–1190; otherwise, the truck number is incremented in step 1102, and a new truck is polled for data in step 1099. If all the trucks have been pooled for this interrupt, step 1104 returns the central computer 155 to the main program. When a valid transmission is detected, the flowchart moves to step 1110 where the truck number is decoded. If the received data frame includes a dump indication, the most recent load time for this particular truck is subtracted from the current time to provide a loaded haul time in step 1140. If a dump indication is not present, the program branches to step 1132 where the data frame is checked for a load indication. If the data frame includes a load indication, the program branches from step 1132 to step 1135 wherein the real time is stored as the "load time". If a load indication is not present, step 1132 returns the central computer 155 to the main program. By analogy, other downloaded data (gearshift, operator number change, etc.), may be identified by the central computer 155 and routed to appropriate storage locations at the central computer. Of course, data of different types (e.g., elapsed times, weights of buckets, etc.) must be encoded in a conventional manner by the sensor processing unit 101 in order that the central computer 155 can identify the data for categorization.

At the central computer 155, a data base (not shown) is maintained for each truck as well as for each model of truck. For example, in a fleet of 20 trucks, trucks one through 10 may be a first type of truck with a particular capacity, while trucks 11–20 may be a second type of truck with a different capacity. From the makeup of the truck fleet, a data base is organized to best provide useful information. For the above-mentioned fleet of 20, the data base is divided into two main sections, one for each type of truck, and each section has ten cells, one for each truck. By organizing the data base in the foregoing manner, data for each truck can be collected and manipulated and, also, data for each type of truck can be obtained. In addition, since each haul cycle for a truck is identifiable with a particular loader, a data base is also set up for each truck/dump site/loader combination.

In the data base at the central computer 155, the cell for each truck includes data identifying the last loader to which the truck was directed and the time it was directed. Therefore, an average loaded haul time for a particular truck hauling from a particular loader to a particular dump site can be determined. In step 1150, an average haul time for each of the trucks from each of the loaders to each dump site, stored in an array in RAM 155d, is accessed. The most recent haul time for a particular loaded truck, a particular loader and a particular dump site is added to the average in order to update it in step 1160. The updated average loaded haul time is returned to the storage array in step 1170.

Because the central computer 155 is in communication with each of the trucks 11, it knows the number of trucks 11 that have been sent to a particular loader; it also knows how many of those trucks sent to a particular loader 160 have indicated loading has begun. From the foregoing information, as the trucks 11 become available from a dump site or other areas, the central computer 155 executes an algorithm in step 1180 to determine which loader can most quickly load the current truck and return it to the dump site. The central computer 155 calculates a "delay" time for each loader and identifies the loader with the minimum delay as the truck's destination. For each loader 160 the delay may be determined as follows:

DELAY(n) = NO. OF TRUCKS IN TRANSFER OR

AT LOADER(n) × AVE. LOAD TIME FOR

-continued

LOADER(n) = DIFFERENCE BEWTEEN ELAPSED
TIME SINCE LAST LOAD TRANSMIT
AND AVE. LOAD TIME

From the foregoing algorithm, the central computer 155 calculates in a conventional manner from available data the number of trucks in transit to or at the loader (n). A calculation of the number of trucks at the loader site or in transit thereto is easily derived from available data since the central computer 155 identifies which trucks have been directed to a given loader 160 and have not yet transmitted a load start signal. The load time of each loader is calculated from data made available by the truck's sensor processing unit 101. The beginning of the load is marked by the central computer 155 when it receives a load signal from the sensor processing unit 101. The end of the loading is marked by the central computer 155 when it receives the first gear shift signal sensed by the sensor processing unit 101 from the gear sensor 135 after transmission of the load start signal to the central computer 155. Obviously, for the central computer 155 to calculate a load time and an average load time for each loader, the on-board weighing device must transmit both the load start signal and a signal indicative of the first gear change. The latter signal is not set forth in the flowchart diagrams, but it will be appreciated by a programmer that the data may be transmitted in response to a polling request from the central computer 155.

Because the loading is sequential (i.e., each truck 11 is fully loaded in its turn), only the latest load transmission signal can be from a truck still being loaded. Therefore, more than one load transmission signal indicates some trucks are in transit back to the dump site. Obviously, these trucks need not be considered in calculating a time delay for loading. In order to accurately account for the time delay caused by the truck currently being loaded, the time difference between the last load signal and the average load time should be subtracted from the product of the number of trucks at or in transit to the loader and the average load time. To this difference is added the travel time for the truck being directed from that truck's present location (normally a dump area) to the particular loader 160. For example, two loaders may have load delays of five minutes and ten minutes, respectively, before considering truck travel time. However, if the travel time to the first loader 160 is 12 minutes while the second loader has a five minute travel time, this travel time is subtracted from the time delay to arrive at a total delay time which is −7 minutes for the first loader and +5 minutes for the second loader; thus, the central computer 155 designates the first loader as the truck's destination since the minus delay time indicates the time the loader will be waiting for a truck. After the delay of each loader 160 is calculated, the central computer 155 transmits a signal at step 1190 having data identifying the particular truck for which the transmission is intended and also having data indicating the particular loader number with the current minimum delay time.

Figure 20B:
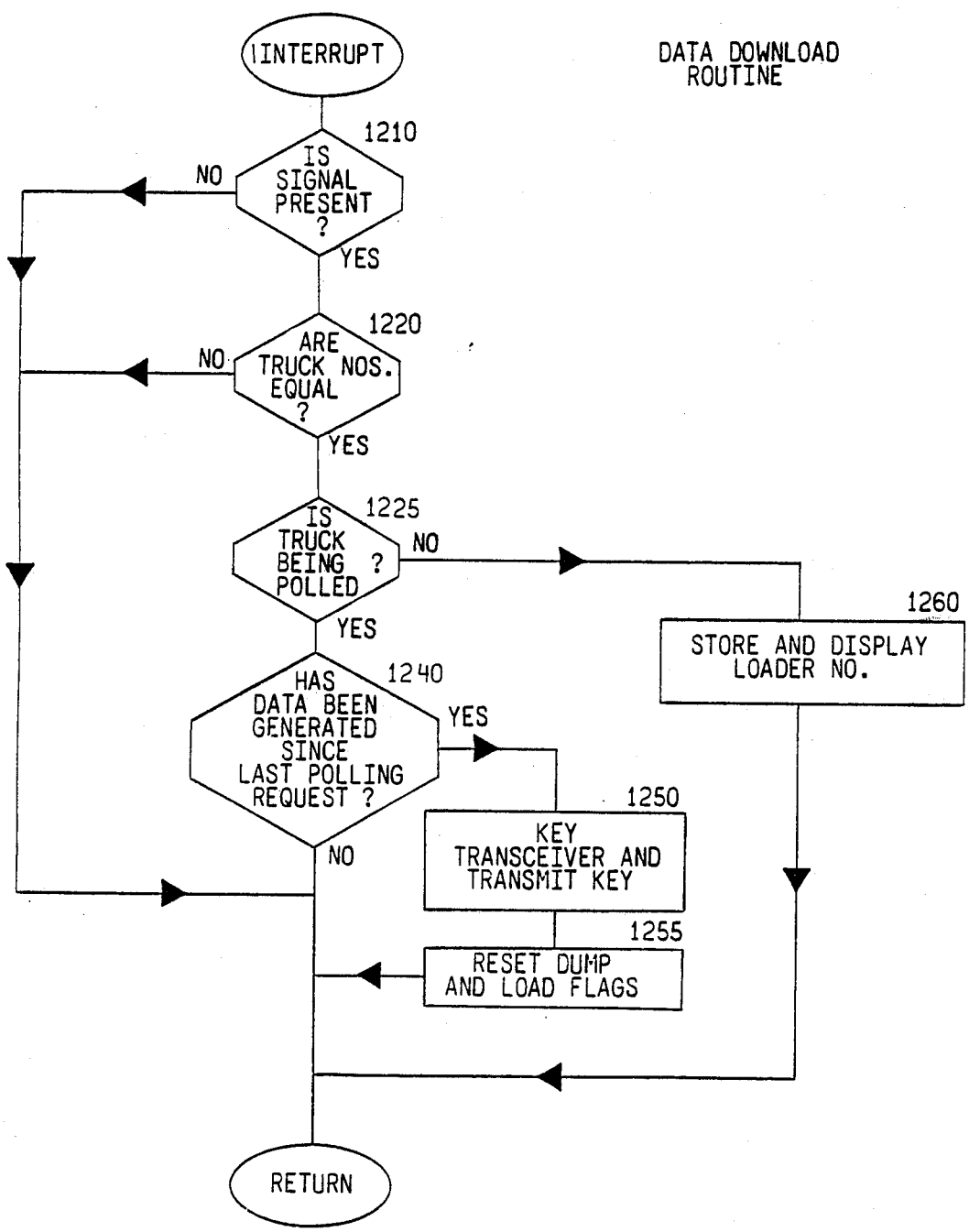

In response to the transmissio from the central computer 155, the transceivers 150 of all the trucks 11 lock onto the signal during the sync portion of the transmission and compare the transmitted truck number to their own numbers. FIG. 20b illustrates the flowchart to execute the comparison of a transmitted truck number and the stored truck number. In a simple scheme, the steps of FIG. 20b are executed periodically by a timer interrupt. At each interrupt, the CPU 103 of FIG. 16 checks to see if the transceiver 150 is receiving a transmission. If no signal is present in step 1210, the program returns the CPU 103 to the main program. If a signal is present, the transmitted truck number is captured and compared to the truck's own number at step 1220. If they are not identical, the data identifying a particular loader number, dump site or designated site, which follows the transmitted truck number, is ignored. When a match occurs between truck numbers, the central computer 155 is contacting a particular truck 11 either to poll it or to instruct it which loader 160, dump site 161 or designated site to go to. In order for the sensor processing unit 101 to know which instruction is currently being received, step 1225 determines if the data following the truck number is a polling request. If it is a polling request, the program determines at step 1240 if ARRAY VII contains data for downloading; if it does, the transceiver 150 is keyed and the appropriate data (e.g., dump, load gearshift, operator number change, etc.) is transmitted to the central computer 155 in step 1250. Alternatively, if the received data is not a polling inquiry, it must be instructions for a loader, dump site or other destination. Therefore, the loader number, dump site or other designation is stored and displayed to the truck operator at step 1260.

In a haul cycle there are two important travel segments—the loader to dump site segment and the dump site to loader segment. These two segments are the main components of a full cycle. Because the on-board weighing device detects when loading begins and when dumping occurs, important data can be transferred at those times from the truck 11 to the central computer 155 for processing when the truck is polled. For example, the ton.mile calculation by the sensor processing unit 101 is important for each haul segment since it indicates a degree of tire use for the haul segment. This data may be transmitted to the central processor 155 for processing in response to polling of the trucks. Management personnel can monitor (the central computer 155 may, alternatively, include a software routine to monitor this or other data) the updated or averaged ton.mile data from each haul segment at the site of the central computer 155 in order to dispatch trucks in a manner to ensure even fleet accumulation of ton.mile and/or ensure tires are not being used above their rated ton.mile per hour rating. Of course, other data available from the on-board weighing device can be downloaded to the central computer 155 in the same manner as the foregoing data. Finally, a portion of the data downloaded to the central computer 155 may, in addition, be downloaded to a processor (not shown) on-board the loader 160 loading the truck in order to give the operator of the loader an indication of the truck's load condition. Such a communication link would be similar to the link set forth above in connection with the central computer 155. The specific type of radio link could be any type of commercially available data link suitable for transfer of the type of data here involved such as REPCO, Inc., RF modem, RDS-1200, 944–960 MHz, full duplex. It will be appreciated from the foregoing that data such as the operator summaries of ARRAY II will be downloaded from the memory of the sensor processing unit 101 to the central computer 155 for storage and analysis.

In order to reduce the expense of providing high-power transceivers on each truck 11, for data downloading stationary repeaters 160a and 161 (in FIG. 19a) are provided at scattered locations in the working site. By providing these repeaters 160a and 161, each transceiver 150 need be only a low power device. In addition, by methods well known in the field of communications, the central computer 155 may identify which repeater 160a and 161 is retransmitting the downloading of truck data. By knowing the particular repeater 160a and 161 in which a truck 11 is in range, the central computer 155 may track movement of the trucks. Moreover, during data download polling of the trucks 11 by the central computer 155, data may be transmitted indicating an "out-of-service" condition or an "in-transit" condition for the truck. By providing data such as the foregoing, the central computer 155 may keep track of which trucks are currently loading, dumping, in transit or out of service. As trucks 11 are directed to various loaders 160, dump sites, etc., the central computer 155 notes a projected time of arrival for the truck based on its historical data base. If a truck 11 fails to arrive at its designated location within this time period plus a predetermined percentage of the period, then the central computer 155 will provide a sensory alert ot management personnel so that the status of the truck can be checked. For thos trucks 11 which go out of service, the central computer 155 can update the load delay for the particular loader 160 for which the out-of-service truck was destined.

As an extension of the foregoing data downloading and controlling of truck movement, the interaction of the sensor processing units 101 of the trucks 11 and the central computer 155 also provides the ability for data file management at a remote location. Specifically, information from each of the sensor units 101 is downloaded to a master data file associated with the central computer 155 where the data may be manipulated in order to provide useful real time information to management personnel. For example, from real time data the central computer 155 may analyze the average number of loads or tons loaded per hour by a particular loader 160 and/or average number of loads or tons hauled by a particular truck. From the foregoing analysis, accurate projections for the best utilization of the trucks and loaders can be developed.

In addition to receiving the downloaded data and dispatching trucks 11 to proper loaders 160, dump sites or designated sites, the central computer 155 maintains data on tonnage loaded by particular loaders, tonnage hauled by particular trucks and total tonnage hauled to each dumping area. The central computer 155 records the out-of-service times for all truck 11 and loaders 160 and identifies the trucks and loaders which are out of service for the longest times in a predetermined time period.

Mine management with this system can see what has been done in terms of mine production and can make extremely accurate projections, 1 month, 6 months, possibly even 12 months down the road. With these projections as to what total mine production can be, e.g., anticipated tons of various material to be moved, the mine operating personnel can make equipment assignments and changes to those equipment assignments so that mine production does, in fact, meet mine production projections.

For example, the central computer 155 cumulatively records ton-mile per hour data over a given time frame so that as a truck accumulates ton-mile per hour figures the cumulative figures for all trucks are compared and the trucks with excessive ton-mile per hour numbers can be dispatched to locations from which less ton-mile per hour figures occur.

Additionally, the central computer 155 as well as the sensor processing units 101 may analyze vehicle component strain, such as engine operating temperature, hydraulic oil temperature, heat buildup in the tires, etc. As a particular component on a vehicle approaches a preset limit, the vehicle may on future haul dispatches be dispatched to a haul that might be less trying on the vehicle, i.e., for a mine with a multi-bench operation vehicles may be rotated so that no one vehicle is continually hauling off of the lowest bench. This analyzation of vehicle component strain obviously turns on the need to add additional vehicle monitors to the vehicle and provide radio downloading transmission capabilities from these monitors to the central computer 155.

Conceptually, the master data file (not shown) of the central computer 155 contains four primary files from downloading data:

(1) Loading time for each truck with each piece of loading equipment;

(2) Loaded haul time for each loader to each dump area for each truck;

(3) Empty return time from each dump area to each loader for each truck; and (4) Total haul cycle time for each truck from each loader to each dump area. This master data file may be either separate from or incorporated with the data base for each type of truck (having subfiles for each truck) and for each loader/dump site combination.

Each of the four primary files of the master data file is separated by loading equipment type, truck type and dump site, e.g., make, model, size, type of body or type of material to be hauled, whether it is ore, overburden, dual purpose, etc. For example, data for 170 ton trucks are filed separate from data for 120 ton trucks. Each class of truck, loader and dump site combination has a separate historical subfile to be used to determine how long it should take a truck of that class to get from a dump to loading site or vis versa. With respect fo the loaders 160, a similar subfile system exists for each class. In addition, loader 160 has a subfile for each type of truck it loads. These subfiles store historical data on how long it takes the loaders 160 to load any particular type of truck 11.

As a particular example of the data base and master data file, if a mine had 10-170 ton Wabco trucks and 10-120 ton Euclid trucks, then the central computer 155 would have a data base comprising a historical subfile for each truck, loader/dump site combination, i.e, 20 truck subfiles. Data from the 10 Wabco subfiles is averaged together to comprise a master Wabco data file; likewise, a master Euclid data file is created for the Euclid trucks. Then, as each respective truck generates data, its corresponding historical subfile is updated and averaged according to that data. In response to downloading data for updating of these historical subfiles for each truck, the four primary files of the master data file for the truck class (e.g., Euclid or Wabco) are also updated.

As evidenced by the degree and variety of data available from the on-board weighing devices, the downloading communications link between trucks 11 and the central computer 155 is potentially much more than a RF data downloading link, it is also the means for a traffic controller. Downloading of all or selected portions of data generated by the sensor processing unit 101, allows the central computer 155 to function as a mine management system. The following description of the functioning of such a system is intended as an outline of the programming steps made possible by the organization of memory in the central computer 155 into a data base with subfiles for each truck/loader combination and primary files for each class of truck as described herein and the downloading of data in addition to load and dump data as previously discussed in connection with FIGS. 19a–b and 20a–b.

In order for polling by the central computer to occur sufficiently often so that the downloading of data may approach a real time data read out, repeaters 161 should be of sufficient number in strategic positions. In addition, by identifying their location in the repeated signal, the repeaters 160a and 161, identify truck locations, i.e. the data signal from the trucks 11 when received by the repeater is supplemented with data identifying the repeater. As data accumulates in each of the sensor processing units 101 of the trucks 11, it is stored in memory until the truck is within range of a repeater 160a or 161, whereupon the data is downloaded to that repeater and sent on to the central computer 155. With strategically placed repeaters 161, not only is the data downloaded at close to a real time basis, but the repeaters keep an accurate track of truck location.

For example, as a truck 11 leaves the dump area 1, it is notified by the central computer 155 via the repeater 161 at dump area 1 which loader 160 had the minimum delay. The truck 11 is then on its way to that particular loader location. The truck 11 possibly accumulates some data in route to that particular loader 160a. As it comes within range of the particular loader 160a, data accumulated enroute from dump area 1, if not previously transmitted, is transmitted to the repeater 160a on the loader and resent to the central computer 155, thus identifying the truck's current vicinity.

As soon as the central computer 155 detects data downloading from the truck through the repeater 160a at the loader location to which the truck was dispatched, it knows that the truck has arrived in the vicinity of the particular loader. If in route to the designated loader, the truck 11 passes another loader 160 or comes within the range of another strategically placed repeater 161 (possibly dump area 2 in FIG. 19a), any data accumulated is downloaded via that repeater 161 to the central computer 155, thereby again identifying truck location.

Once the truck 11 gets to its designated loader 160 or loading area, the gearshift is placed in neutral or reverse by the driver. This change in gear is detected by the gear sensor 135 of the on-board weighing device and the data is downloaded via the repeater 160a to the central computer 155, and the central computer thereby has further confirmation that the truck 11 has arrived at the designated loader. It should be noted, however, that if there are two or more loders in the same immediate vicinity or within the transmit range of the radio signal of the truck, these loaders should be classed as one loading area or one piece of loading equipment for purposes of data handling by the central computer 155.

With the truck 11 in the general area of the designated loader 160, as the truck positions itself for loading (i.e., shifts foward, reverse, etc.), data is generated that is downloaded via the repeater 160a to the central computer 155 and, with the first bucket pass into the truck, additional data is generated that is downloaded to the central computer 155. With the first bucket pass, the central computer 155 looks at one of the primary files in the master data file for the average loading time of this particular loader 160 for loading this particular type of truck 11. Based on this primary file, the central computer 155 determines when this truck 11 will be fully loaded and when the next truck is needed at this particular loader 160 for continuous truck loading to occur.

With the last bucket pass into the truck 11, (sensed by a gear shift forward leaving the loading area) this data is downloaded to the central computer 155 which accesses another primary data file from the master data file; this file contains the average travel or haul time of this particular type of truck from this loading location to various dump areas that this truck can be directed to. The central computer 155 then analyzes the projected truck arrival time at each of these areas based on its record of trucks already enroute to the dump areas and determines which dump area will have the least congestion. The central computer 155 then analyzes trucks enroute and their projected arrival times to direct the truck just loaded to a particular dump area as designated by the central computer as well as determining what the elapsed time should approximate from this final bucket pass (i.e., gear shift forward) until the truck arrives at the designated dumping area. As the truck 11 leaves the area of the loader 160 for the dump area, data (such as gear shifting, distance traveled, etc.) accumulates and is transmitted from the truck via the repeater 160a on the loader to the central computer 155, and the central computer 155 estimates when this truck will arrive at its designated dump area.

Upon coming within range of the designated dump area, the repeater 161 receives any data accumulated by the truck 11 and downloads it to the central computer 155. With the travel time of the truck 11 from the loading area to the dump area noted by the central computer 155, the appropriate primary file of the master data file is updated. (Loaded travel time is the time from the first forward gear shift after loading commences until the dump switch is activated.) As the truck dumps, the dump switch is activated and data indicative of this is generated by the sensor processing unit 101. This data is downloaded to the central computer 155 and, at this point, the truck 11 is then available for another load. Therefore, the central computer 155 searches to determine with what loaders 160 this particular type of truck is being used. (The central computer 155 differentiates between trucks of different load types-different body styles; for example, trucks hauling coal or overburden in a mining operation.) The central computer 155 reviews the loading/haulage status of each loader 160 and, it analyzes when each loader will need another truck to load based on (1) the historical loading data files, (2) what trucks 11 have already been dispatched to each of the loaders 160 and (3) the historical empty travel time from the particular location of the truck 11. The central computer 155 then reviews the primary travel time file from the dump area (the truck's particular location) to each particular loading area. From the travel time data, the central computer 155 looks at the historical empty return truck time and determines which loader will need a truck the soonest and, in response to this determination, transmits directions and instructions to the truck dispatching it to the particular loader.

At the same time that loader destination information is transmitted to a truck 11, the central computer 155 reviews a historical data file of total haul cycle time for that truck from the loader to which the truck has been dispatched and identifies a median haul cycle time to all possible truck dump locations. A percentage of the median time is added to the median in order to provide a time period within which the truck should be expected to complete a haul cycle i.e., dumping another load. For example, if the median haul cycle were 12 minutes and the central computer 155 is programmed to add 20% to this time, if dump data were not registered as being downloaded from this truck within this 12 minutes+20%, the central computer then would flash to its operator that the truck in question is late in completing its haul cycle to a dump area; whereupon, the operator of the central computer 155 may via conventional two-way radio the truck's driver to see if there is a problem with the truck.

If a truck driver parks the truck for a break or a rest stop, the driver alerts the operator of the central computer 155 to that fact via conventional two-way radio. In response to this received data, the operator of the central computer 155 punches up that truck number and indicates that truck's location and that no loads will be hauled for a predetermined time period and that possibly no data transmissions will be occuring over this same time period. (Trucks should only be parked within range of repeater 160a or 161). In some cases it is possible to communicate the same information via data downloaded through an interrupt instituted by the operator's selection of an appropriate key of the keyboard 122.

When a truck goes out of service because of a breakdown, operator rest or the like, the central computer 155 dispatches new available trucks to the loading area previously transmitted to the parked (on break) truck and then transmits to the parked truck a new updated loading location. This procedure is repeated until the parked (on break) truck is indicated as being back in service by data indicating such things as the shifting of gears. If the truck was loaded when parked, no dispatching may occur since the central computer 155 recognizes the truck is loaded and must be first dumped before it can be dispatched.

If no data has been received, at the end of the time period selected by the truck operator as his break time or down time, the central computer 155 will flash the truck number to the operator of the central computer. The central computer operator may radio, via conventional two-way radio, the truck to check on the truck's status. If the central operator finds the truck is still down for whatever reason, he may punch up the truck number and indicate how many more minutes the truck will be down. This process continues to be repeated by the central computer 155 until the truck is back in service or temporarily taken out of service.

With respect to truck travel from the dump area to a loader, the central computer 155 records the time of truck dispatch and looks for that truck to arrive at the designated loading area within a predetermined time based on historical truck return time in a primary data file. If the truck is late in arriving at its designated loading area, i.e., no data downloading to indicate arrival, the truck number is flashed to the operator of the central computer whereupon he may radio, via conventional two-way radio, the truck driver to check on that truck's status.

The central computer 155 also follows the foregoing steps when it detects a truck leaving a loading area headed for a designated dump area. The central computer 155 identifies in its data file the average haul travel time it takes a like truck to get to the designated dumping area. If further data is not detected by the central computer 155 within this average time, then that truck number is flashed to the operator of the central computer whereupon he may check on that truck's status.

In addition to receiving downloaded data, monitoring and dispatching trucks 11 in the foregoing manner, the central computer 155 also identifies and monitors the various loaders 160 by identifying the repeater 160a through which truck data is coming to the central computer. Accordingly, the central computer 155, as data is downloaded to it, analyzes the average number of loads and/or tons loaded per hour by a particular loader 160 and how many minutes occur between each load. As the central computer 155 monitors each loader 160 through data downloading, if it detects a lack of load information coming from a particular repeater source, it flashes to the operator of the central computer the number of that repeater source (or loader). The operator of the central computer 155 may radio, via conventional two-way radio to the loader operator and identify whether there is a problem with the loader. If that particular loader 160 is down, the loader operator may respond to the operator of the central computer 155 with an estimate of how long he will be down. The operator of the central control computer 155 then enters into the central computer that this loader will be down for a particular time period.

The central computer 155 adds a percentage of this particular time period to the estimated time period in order to provide a buffer range. At the end of this increased time period, the central computer 155 checks the downloaded status of loader 160 and determines whether loading data is present. If no loading data is present from this loader, the loader number is again flashed to the operator of the central control computer 155 whereupon he may again check with the operator of that loader to see how much longer it will be down. This additional time is entered into the central computer 155 and the steps are repeated.

As soon as data is entered by the operator of the central computer 155 indicating that a particular loader 160 is down, the central computer redispatches trucks 11 away from this loader with any trucks in the immediate vicinity of that loader getting their signal through the repeater 160a on this loader while trucks in route may possibly have to arrive in the vicinity of the loader before picking up a redispatch number. For redispatching, the central computer 155 does not consider specific travel times; rather, by way of simplification, it sets all travel times equal for the loading locations to which the trucks are redispatched. This eliminates any data errors redispatching might otherwise cause.

As a piece of loading equipment is down the time when that piece of loading equipment is supposed to be back up is automatically registered in the central computer 155 and the central computer, depending on programming, can automatically dispatch one and only one vehicle, or if so programmed 2 or more trucks, to that piece of loading equipment. Or, if so programmed, the central computer 155 can flash the respective number of the piece of loading equipment to the central computer operator, whereupon he asks, via conventional two-way radio, the loading equipment operator whether that piece of loading equipment is again up and ready to run so that trucks can be dispatched to it. If the answer is yes, trucks can be dispatched to that piece of loading equipment, the operator of the central computer 155 enters in on his keyboard that, that particular piece of loading equipment is again up and running. The central computer 155 then immediately takes over automatic dispatching and dispatches the first available truck to that piece of loading equipment.

If the central computer 155, through data being downloaded to it, determines there is either excess haulage capacity or loading capacity, it signals the computer operator. If excess haulage capacity is indicated, the computer 155 indicates which truck 11 is closest to a required preventive maintenance period. A similar determination is made for the loaders 160 when excess loading capacity is indicated. As soon as the excess truck 11 or loader 160 is identified and maintenance personnel are available, the central computer 155 dispatches the identified truck or loader to the maintenance shop for preventive maintenance work and/or notifies maintenance personnel to work on the loader 160.

With reference to equipment maintenance, if so desired by mine management, equipment maintenance can be incorporated with the sensor processing unit 101 and the central computer 155 data downloaded so that as equipment maintenance occurs, equipment maintenance costs can be accurately tracked, since the sensor processing unit 101 and the central computer 155, via data downloading, will be tracking amount of equipment operating time, it will conversely be tracking equipment down time. As down time occurs, through the proper use of the operator number function of the sensor processing unit 101 and data downloading from this unit to a central computer 155 with the operator number function, it is possible to identify why a piece of equipment is down and through the proper use of operator number codes as well as when a piece of equipment goes back into service, and as this data is generated for downloading to the central computer 155 via the operator number code on keypad 122, the cost of all parts and supplies used during the time that the truck is out of service can be entered directly into the central computer 155 via the operator of the central computer, i.e., a truck is down for transmission repair. The code for transmission repair is entered, via the operator number code on keypad 122 into the sensor processing unit 101 for data downloading, when the truck goes back into service, the cost of parts and supplies to repair the transmission is entered into the central computer via the operator of the computer. If, however, the actual cost of the transmission repairs is not immediately known as a truck goes back into service, when they do become known, the operator of the central computer 155 can still enter the cost of parts and supplies, what they were for, and during what time period they were incurred so that the central computer can go back and allocate for each period of equipment down time as identified from data downloaded from sensor processing unit 101, the cost of repair parts and supplies associated with that segment of equipment down time.

From the foregoing it will be appreciated that the on-board weighing device provides the sensor processing unit 101 with raw data that can be downloaded to a central computer for storage and analysis and then be refined to provide indications of truck and operator efficiency. By analyzing various mining parameters based on this downloaded raw data, the truck performance can be improved, thereby reducing the substantial cost of operating off-road, heavy duty trucks.

I claim:

1. In a system of a plurality of vehicles, an apparatus on-board each of said vehicles for acquisitioning data indicative of vehicle operation and for relaying said data to a remote control center where the data is processed to create control signals that are delivered back to said apparatus for instructing a vehicle operator regarding vehicle movement, said apparatus comprising:
   (1) means mounted to said vehicle for indicating a loading of material into a dump body of said vehicle by a loader;
   (2) means mounted to said vehicle for indicating a dumping of a load carried by said body;
   (3) means mounted to said vehicle for indicating a direction of movement by said vehicle;
   a first processor means on-board said vehicle for acquiring data generated from means (1), (2) and (3) and processing said data for downloading to a remote control center; and
   (4) means for sending said processed data to said remote control center and for receiving control signals therefrom.

2. An apparatus as set forth in claim 1 wherein said first processor means includes (1) memory means for storing data indicative of a predetermined maximum weight capacity for said dump body, (2) detection means responsive to incremental increases in a total weight of said dump body for determining an approximate weight of material added by a bucket of a loader, (3) comparison means responsive to said memory, first processor and detection means for determining if said total weight minus said predetermined maximum weight for said dump body is a fraction of said approximate weight of material in said bucket, and (4) display means responsive to said comparison means for indicating a remaining weight capacity of said truck body.

3. An apparatus as set forth in claim 2 wherein said detection means includes:
   means for detecting a monotonic increase in the total weight of said dump body; and
   means for storing said increase.

4. An apparatus as set forth in claim 2 wherein said display means includes a display of said remaining weight capacity of said dump body as a fraction of said approximate weight of material in said bucket.

5. An apparatus as set forth in claim 4 wherein said display means comprises a series of light indicators representative of an approximate capacity of said bucket, said series of light indicators being relatively positioned such that each light indicator visually represents a fractional portion of said approximate weight of material in said bucket.

6. An apparatus as set forth in claim 1 wherein said means (1) comprises a pressure sensor assembly mounted to a frame of said vehicle for transferring from said dump body to said frame at least a predetermined portion of a total weight of said dump body in a substantially uniform manner along an interface between said frame and said dump body and said assembly is responsive to said predetermined portion of said total weight to provide pressure data representative of said total weight of said dump body.

7. An apparatus as set forth in claim 6 wherein said first processor means includes means for isolating pressure data representing pressure spikes and means for recording the occurrence of a pressure spike, and means responsive to said recording means for delivering data to said display means indicative of a condition of a road over which said vehicle travels.

8. An apparatus as set forth in claim 6 wherein said pressure sensor assembly includes a cushioning interface between said dump body and said frame.

9. An apparatus as set forth in claim 6 wherein said dump body is pivotally mounted to said frame by way of a hinge assembly such that said pressure sensor assembly supports said total weight of said dump body in a lowered position on said frame along an interface between said frame and dump body with none of said total weight of said dump body transferred to said frame via said hinge assembly.

10. An apparatus as set forth in claim 9 wherein said hinge assembly has body and frame portions and also has means for decoupling said body and frame portions when said dump body is moved to said lowered position such that said total weight of said dump body is communicated to said frame through said pressure sensor assembly.

11. An apparatus as set forth in claim 6 wherein said pressure sensor assembly comprises at least one length of resilient tubing positioned on a beam of said frame wherein said resilient tubing provides an interface between said dump body and said frame for communicating said at least predetermined portion of said total weight of said dump body to said frame.

12. An apparatus as set forth in claim 6 including:
first transceiver means mounted to said vehicle;
said first processor means operatively coupled to said first transceiver means and said pressure sensor assembly for receiving said data from said pressure sensor assembly, processing said data and transmitting said processed data by way of said first transceiver where said processed data includes an indication of a hauling status for said vehicle; and
said remote control center including a second processor means having a second transceiver means for communicating with said first transceiver means, said second processor means receiving said processed data from said first processor means, said processed data identifying said vehicle and said hauling status of said vehicle derived from data from means (1), (2) and (3).

13. An apparatus as set forth in claim 12 wherein said vehicle may be loaded by any one of a plurality of loaders;
said second processor means includes (1) first means for calculating in response to said processed data an average load time for each of said plurality of loaders, (2) second means responsive to said processed data and said first means for calculating a current load delay time for each of said plurality of said loaders, (3) third means responsive to said second means for identifying a one of said plurality of said loaders having a minimum load delay (4), fourth means responsive to said third means for forming data for transmission by said second transceiver means, said data for transmission identifying a particular one of said plurality of vehicles and said one of said plurality of loaders with said minimum load delay; and
said first processor means including fifth means responsive to said data received from said fourth means via said first transceiver for displaying to said vehicle operator of said particular one of said plurality of vehicles an identifier of said one of loaders.

14. An apparatus as set forth in claim 12 wherein said pressure sensor assembly includes tubings which forms said interface between each of said body and frame of said vehicle.

15. An apparatus as set forth in claim 12 wherein said second processor means includes memory means for archiving said processed data from said vehicle.

16. An apparatus as set forth in claim 12 wherein said first processor means generates said processed data for transmission in response to said pressure data from said pressure sensor assembly and data generated by means (2) and (3) which are indicative of whether said vehicle is dumping its load, beginning loading of a new load or in transit between load and dump sites.

17. An apparatus as set forth in claim 16 wherein said means (2) is a dump sensor and means (3) is a gear sensor and said first processor means generates said processed data for transmission in response to data from a plurality of sensors on-board said vehicle including said gear and dump sensors.

18. An apparatus as set forth in claim 12 wherein said second processor means includes memory means for archiving said processed data in response to vehicle identification and vehicle type data included in said processed data, thereby forming a data base.

19. An apparatus as set forth in claim 18 wherein said data base formed by said processed data archived in said memory means is used by said second processor means to generate said control data for controlling the movement of said vehicle.

20. An apparatus according to claim 12 including:
said second processor means including memory means for storing a predetermined maximum load capacity for said dump body; and
said first processor means including means for determining a weight of said dump body from said pressure data of said pressure sensor assembly and incorporating said weight as part of said processed data;
said second processor means responsive to said processed data for (1) comparing said weight with said predetermined maximum load capacity, and (2) generating an output signal identifying said vehicle if said weight is greater than said predetermined maximum load capacity.

21. An apparatus as set forth in claim 20 including means responsive to said first processor means for displaying said weight of said dump body in response to said first processor means.

22. An apparatus as set forth in claim 20 including means in said second processor means for accumulating a total number of times said output signal indicating an overload of the vehicle is generated.

23. An apparatus as set forth in claim 6 wherein said first processor means includes:
means for storing said pressure data acquired from said pressure sensor assembly;
means for comparing selected pressure data in said storing means with other pressure data in said storing means to determine if said selected pressure data are pressure spike;
means responsive to said comparing means for counting the pressure spikes; and means responsive to said counting means for providing an indication of the condition of a road over which said vehicle travels.

24. An apparatus as set forth in claim 6 including:
said first processor means providing an indication of a load or dump condition of said vehicle in response to said pressure data from said pressure sensor assembly;
distance means for measuring the distance traveled by said vehicle and providing said distance to said first processor means so as to be incorporated into said processed data;
storage means responsive to said processed data for storing a distance traveled by said vehicle between said indications of load and dump conditions and for storing a total weight of a load hauled by said vehicle between said indications; and
means responsive to said storage means for multiplying said distance traveled by said total weight hauled in order to provide a tons-miles record as part of said storage means.

25. An apparatus as set forth in claim 24 including means for dividing said tons-miles record by a time interval between successive indications of said load and dump conditions, thereby providing an indication of wear experienced by said vehicle.

26. An apparatus according to claim 6 including:
memory means operatively coupled to said first processor means;
means coupled to said first processor means for entering an identifier of said vehicle operator and for associating a portion of said memory means with said identifier;
said first processor means responsive to said pressure data for (1) providing said processed data which is indicative of vehicle performance and (2) routing said processed data indicative of vehicle performance to locations within said portion of said memory means associated with said identifier;
detecting means responsive to said entering means for detecting changes in said identifier; and
display means responsive to said detecting means for displaying said processed data indicative of vehicle performance in said portion of memory means when a change of said identifier has occurred.

27. An apparatus as set forth in claim 6 where said vehicle includes front and back axles and said apparatus includes means for measuring loads carried by said front and rear axles of said vehicle wherein said dump body is pivotally mounted to said frame so as to pivot between raised and lowered positions, said means comprising:
(5) means for measuring a force of said dump body on said frame and providing data indicative of said force;
said first processor means responsive to said data from said means (5) and said pressure sensor assembly for determining a distribution of said weight of said dump body over said front and rear axles of said vehicle; and
display means responsive to said first processor means for displaying portions of said weight of said dump body carried by said front and rear axles.

28. An apparatus as set forth in claim 27 wherein hydraulic cylinders connected between said frame and dump body move said dump body between said raised and lowered positions, said means (5) sensing pressures of hydraulic fluids in said hydraulic cylinders.

29. An apparatus as set forth in claim 27 wherein said first processor means includes means for locating a center of gravity of said dump body.

30. An apparatus as set forth in claim 27 wherein said first processor means includes memory means storing predetermined tare weights for said front and rear axles and said first processor means including summing means for adding said portion of said weight on each of said front and rear axles to the tare weight of each of said front and rear axles in order to find a gross weight for each of said front and rear axles.

31. An apparatus as set forth in claim 6, including means for pivoting said dump body between raised and lowered positions on said dump body,
said pressure sensor assembly including a plurality of sensor elements and providing an interface between said frame and dump body when said dump body is in a lowered position,
said plurality of sensor elements provides an indication of the total weight of said dump body and an indication of fore-and-aft weight distribution as well as side-to-side weight distribution of the load carried by the dump body; and
said first processor means having means responsive to said plurality of sensor elements of said pressure sensor assembly for detecting an imbalance of said weight carried by said dump body and signaling said vehicle operator in response thereto.

32. An apparatus as set forth in claim 6 wherein said body is pivotally mounted to said frame for movement between lowered and raised positions and said apparatus includes a distance sensor for providing data to said first processor means indicative of truck movement, said first processor means including means responsive to said distance sensor and to said pressure sensor assembly for providing an output signal when said vehicle moves without said dump body in said lowered position.

33. An apparatus as set forth in claim 6 wherein said dump body is pivotable between raised and lowered positions and wherein said first processor means includes (1) memory means for storing a tare weight of said dump body, (2) means responsive to the lowering of said dump body onto said pressure sensor assembly for comparing said total weight of said dump body with said tare weight in said memory means, and (3) means for indicating said dump body is not fully empty when said total weight of said dump body is greater than said tare weight of said dump body plus a predetermined constant.

34. An apparatus as set forth in claim 1 wherein said means (1) comprises a bi-state switch positioned in a recess of a bed of said dump body so as to detect a presence of material carried in said dump body.

35. An apparatus for processing data derived from a weight of a load carried by a body of a truck, said apparatus comprising:
a truck frame including a hinge assembly for pivotally supporting said truck body between raised and lowered positions;
a pressure sensor assembly mounted to said frame for supporting an entire weight of said body in its lowered position and providing pressure data representative of said entire weight of said truck body;
a processor means for receiving said pressure data and detecting a change in said entire weight of said truck body and formulating data indicative of truck condition in response to said pressure data and its change;

a distance sensor for providing distance data to said processor means indicative of truck movement; and said processor means including first means responsive to said pressure data for detecting said truck body raised off said pressure sensor assembly and second means responsive to said first means and said distance data for providing an output signal when said truck moves with said body raised off said pressure sensor assembly.

36. An apparatus for processing data derived from a weight of a load carried by a body of a truck, said apparatus comprising:

a truck frame including a hinge assembly for pivotally supporting said truck body between raised and lowered positions;

a pressure sensor assembly mounted to said frame for supporting a weight of said body in its lowered position and providing pressure data representative of said weight of said truck body;

a processor means for receiving said pressure data and detecting a change in said weight of said truck body and formulating data indicative of such condition in response to said pressure data and its change; and said processor means including (1) memory means for storing a predetermined tare weight of said truck body, (2) means responsive to a lowering of said truck body onto said pressure sensor assembly after a load carried by said body has been dumped for comparing said weight of said truck body with said tare weight in said memory, and (3) means for indicating said body is not fully empty when said weight of said body is greater than said tare weight of said body plus a predetermined constant.

37. An apparatus for determining a remaining weight of capacity of a body carried on a truck frame which is loaded with a material by a bucket of a loader and for indicating when a weight of said material in a full average bucket is more than said remaining weight capacity of said body, said apparatus comprising in combination:

a truck frame including a hinge assembly;

a truck body pivotally mounted to said truck frame at said hinge assembly, said truck body being pivotally movable on said frame between lowered and raised positions;

a pressure sensor assembly mounted to said frame for supporting a weight of said body in its lowered position and providing pressure data representative of a weight of said truck body;

a processor means for receiving said pressure data and determining said weight of said truck body, said processor means including;

(1) memory means for storing data indicative of a predetermined maximum weight capacity for said truck body, (2) detection means responsive to incremental increases in said weight of said truck body for approximating a weight of said material added by said bucket, (3) comparison means responsive to said weight, said predetermined maximum weight capacity and said weight of said material added by said bucket for determining said remaining weight capacity of said truck body, and (4) display means responsive to said comparison means for indicating said remaining weight capacity of said truck body.

38. An apparatus as set forth in claim 37 wherein said detection means includes;

first means for detecting an increase in said weight of said truck body; and second means for storing said increase.

39. An apparatus as set forth in claim 37 wherein said processor means includes means for isolating pressure data representing pressure spikes and means for recording an occurrence of a pressure spike, and means responsive to said recording means for delivering data to said display means indicative of a road condition.

40. An apparatus as set forth in claim 37 wherein said display means includes a display of a remaining weight capacity of said truck body as a percentage of said weight of said material carried by said bucket.

41. An apparatus as set forth in claim 40 wherein said display means comprises a series of light indicators representative of a volume capacity of said bucket, said light indicators being relatively positioned such that each light represents a fractional portion of said volume capacity of said bucket.

42. An apparatus as set forth in claim 37 wherein said pressure sensor assembly is also a cushioning interface between said truck body and said truck frame.

43. An apparatus as set forth in claim 37 wherein said pressure sensor assembly includes a support means mounted on said truck frame, said support means directly supporting said truck body on said truck frame when said truck body is in a lowered position, said support means supporting said truck body in its lowered position in such a manner as to support an entire amount of said weight of said body along an interface between said truck frame and body with none of said weight of said body transferred to said truck frame via said hinge assembly.

44. An apparatus as set forth in claim 37 wherein said hinge assembly has body and frame portions and also has means for decoupling said body and frame portions when said truck body is moved to said lowered position such that an entire amount of said weight of said truck body is communicated to said truck frame through said pressure sensor assembly.

45. An apparatus as set forth in claim 37 wherein said pressure sensor assembly comprises at least one length of resilient tubing positioned on a beam of said truck frame wherein said resilient tubing provides an interface between said truck body and said truck frame for communicating an entire amount of said weight of said body to said frame when said body is in said lowered position.

46. A system for minimizing a hauling time for each of a plurality of trucks between load and dump sites, said system comprising:

a plurality of on-board weighing devices each mounted on one of said plurality of trucks for providing signals indicative of a truck's operation;

a plurality of processor means each mounted to one of said plurality of trucks and each processor means responsive to a one of said plurality of on-board weighing devices for receiving said signals from said one of said plurality of on-board weighing devices and processing said signals to provide data indicative of a hauling status;

a plurality of first transceiver means each mounted to one of said plurality of trucks for receiving said data indicative of a hauling status from said one of said plurality of processor means and transmitting said hauling status data in association with additional data that identifies said one of said plurality of trucks; and a remote processing center including second transceiver means for receiving said hauling status and truck identifying data from said one of said plurality of first transceiver means, said remote processing center generating a historical data base, containing said data indicative of a hauling status and indexed by said identifying data.

47. A system as set forth in claim 46 wherein said on-board weighing device includes a pressure sensor assembly mounted on the frame of the truck and supporting the body of the truck uniformly along an interface between the truck body and frame.

48. A system as set forth in claim 46 wherein a plurality of loaders are provided at said load sites for loading said plurality of trucks; and said remote processing center includes (1) first means for calculating in response to at least said data base an average load time for each of said plurality of loaders, (2) second means responsive to at least said data base and said first means for calculating a current load delay time for each of said plurality of loaders, (3) third means responsive to said second means for identifying one of said plurality of loaders with a minimum load delay time, (4) fourth means responsive to said third means for forming control data for transmission by said second transceiver means, said control data identifying a particular one of said plurality of trucks and a particular one of said plurality of loaders with said minimum load delay time; and each of said plurality of processor means mounted to said plurality of trucks includes fifth means responsive to said control data received by said first transceiver for displaying for said particular one of said plurality of loaders identified by said control data.

49. A system as set forth in claim 46 wherein said pressure sensor assembly includes tubings which forms the interface between each of said body and frame of said trucks.

50. A system as set forth in claim 46 wherein said data base comprises a memory means responsive to said remote processing center for archiving said hauling status and identifying data transmitted from said plurality of trucks.

51. A system as set forth in claim 46 wherein said processor means generates hauling status data for transmission in response to said signals from said pressure sensor assembly which are indicative of whether a particular one of said plurality of trucks in dumping its load, beginning a loading or in transit between load and dump sites.

52. A system as set forth in claim 46 wherein said remote processing center includes memory means for archiving said hauling status and identifying data from each of said plurality of processors in groups such that said data base is firstly identifiable with individual ones of said plurality of trucks and secondly identifiable with types of trucks comprising said plurality of trucks.

53. A system as set forth in claim 52 wherein said remote processing center is responsive to the said data base formed by said hauling status and identifying data archieved in said memory means to generate control data for controlling the movement of said plurality of trucks by causing said second transceiver to transmit said control data to said plurality of first transceivers.

54. A method for detecting and recording a degree of road roughness for a truck having a body supported on a frame, said method comprising the steps of:
periodically calculating a value of a force derived from a weight of said truck body on said truck frame;
storing said value so as to accumulate a plurality of stored values;
periodically comparing a selected one of said plurality of stored values with other of said plurality of stored values to determine if said one of said plurality of stored values is a spike wherein said spike is a stored value that is greater than said other of said plurality of stored values by a predetermined amount;
accumulating said spikes and providing a total count of said spikes; and
deriving from said total count of said spikes an indication of the degree of road roughness and displaying said indication.

55. A method as set forth in claim 54 wherein said force derived from said weight of said truck body on said truck frame is calculated with said truck body fully lowered onto said truck frame.

56. A method as set forth in claim 54 wherein said force derived from said weight of said truck body on said truck frame is provided by a pressure sensor interfaced between the truck body and frane to communicate a predetermined portion of said weight of said truck body to said truck frame.

57. A system for measuring a degree of tire use by a vehicle which hauls material in a dump body pivotally mounted to a frame of said vehicle, said apparatus comprising;
distance means for measuring a distance traveled by said vehicle and providing distance data;
an on-board weighing device responsible to a weight of a load of said material hauled by said vehicle for providing (1) weight data and (2) data indicative of a beginning and an ending of a haul cycle;
storage means responsive to said distance means and said on-board weighing device for accumulating said distance and weight data; and
processor means responsive to said weight and distance data for (1) time marking at least a portion of said distance and weight data so as to identify an elapsed time of said haul cycle, (2) determining a total distance and a weight of said material for said haul cycle, (3) multiplying said total distance and said weight of said material for said haul cycle to provide a sum, (4) dividing said sum by said elapsed time, and (5) displaying a value resulting from said multiplying means.

58. An apparatus as set forth in claim 57 wherein said on-board weighing device includes a pressure sensor assembly mounted on said frame of said vehicle which fully supports said weight of said load when said body is pivoted into a lowered position.

59. An apparatus as set forth in claim 58 wherein said body is pivotally mounted to said frame by way of a hinge assembly such that said body is fully supported by said pressure sensor assembly when said truck body is in said lowered position.

60. An apparatus for use in connection with an off-road, heavy-duty truck wherein said apparatus records vital statistics of said truck in connection with an identifier entered into said apparatus by a truck operator, said apparatus comprising:

a processor means including memory means;

means coupled to said processor means for entering said identifier and associating a first portion of said memory means with said identifier;

measuring means for providing signals indicative of a hauling status of said truck to said processor means;

said processor means responsive to said measuring means and said entering and associating means for (1) receiving said signals, (2) providing data indicative of truck performance in response to said signals and (3) routing said data to locations within said first portion of said memory means;

detecting means responsive to a change of said identifier to cause said entering and associating means to associate a second portion of said memory means with a new identifier resulting from said change of said identifier; and said processor means responding to said associating of said second portion of said memory means with said new identifier by routing said data to locations within said second portion of said memory means.

61. An apparatus as set forth in claim 60 wherein said truck has a body pivotably mounted on a truck frame, said measuring means including:

a pressure sensor assembly supporting an entire weight of said body on said truck frame when said body is in a fully lowered position and said pressure sensor assembly providing pressure data representative of said weight of said truck body; and said memory means including data indicative of a predetermined maximum weight for said truck body.

62. A system for identifying an overload condition in an off-road, heavy-duty truck having a body mounted to a truck frame by a hinge assembly for movement between lowered and raised positions, said apparatus comprising, in combination:

a sensor assembly mounted on said truck frame and supporting a predetermined portion of a weight of said truck body on said truck frame when said truck body is in said lowered position, said sensor assembly responding to said weight of said body to provide a signal indicative of said weight of said body;

a means for transferring said signal to a remote, off-board processor means;

said remote off-board processor means responsive to said signal and including memory means for storing a predetermined maximum weight capacity for said truck body; and said remote off-board processor means responsive to said signal from said sensor assembly indicative of said weight for comparing said weight with said predetermined maximum weight capacity, and for generating an output signal if said weight indicated by said signal is greater than said predetermined maximum weight capacity.

63. A system as set forth in claim 62 including means for displaying said weight of said truck body.

64. A system as set forth in claim 62 including means in said remote off-board processor means for accumulating a total number of times said output signal is generated.

65. An apparatus for measuring and manipulating various hauling and loading parameters for an off-road, heavy duty truck having a body, a frame and front and rear axles, said apparatus comprising:

a first weighing device on said truck for measuring a first force of said truck body on said truck frame and providing data representative of said first force;

a second weighing device on said truck for measuring a second force of said truck body on said truck frame and providing data indicative of said second force;

a processor means responsive to said first and second weighing devices for determining a fraction of a total weight of said truck body over said front axle and a fraction of said total weight of said truck body over said rear axle of said truck; and display means responsive to said processor means for displaying said fractions of said total weight supported by said front and rear axles.

66. An apparatus as set forth in claim 65 wherein said truck frame includes a hinge assembly and said truck body is pivotally mounted to said truck frame at said hinge assembly such that said truck body is pivotable between raised and lowered positions, said first weighing device supporting the entire weight of said truck body when said truck body is in its lowered position.

67. An apparatus as set forth in claim 66 wherein hydraulic cylinders connected between said truck frame and body move said truck body between said raised and lowered positions, said second weighing device sensing a pressure of hydraulic fluid filling said hydraulic cylinder.

68. An apparatus for measuring and manipulating various hauling and loading parameters for an off-road, heavy duty truck having a body, a frame and front and rear axles, said apparatus comprising in combination:

hinge assemblies pivotally joining said truck frame and body;

a sensor assembly mounted on said truck frame and including a plurality of sensor elements, said sensor assembly supporting a predetermined portion of a weight of said truck body when said truck body is in a lowered position on said truck frame;

said sensor assembly providing an interface between said truck frame and body when said body is in said lowered position such that said plurality of sensor elements provides an indication of said weight of said truck body and an indication of fore-and-aft and side-to-side distribution of said weight of said truck body; and processor means responsive to said sensor assembly for detecting an imbalance of said weight carried by said truck body and signalling a truck operator in response thereto.

69. A stationary platform scale for placement on an approximately level ground surface, said scale comprising, in combination:

a first planar plate;

a plurality of flexible tubing laid on said first planar plate with each tubing having first and second ends;

a second planar plate positioned to rest atop said plurality of flexible tubing, said second planar plate extending to fully cover said plurality of flexible tubing;

a plurality of pressure sensors each secured to one of said first or second ends of each of said plurality of flexible tubing for providing pressure data indicative of a weight present on said second planar plate;

said second planar plate having a lower surface for direct contact with each of said plurality of flexible tubing wherein said lower surface includes a calibration plate to ensure a known surface area of contact between said plurality of flexible tubing and said second planar plate; and means for gathering all the data from said plurality of pressure sensors and determining a weight present on said second planar plate.

70. A stationary platform scale as set forth in claim 69 including stablization means coupling said first and second planar plates to retard movement parallel to the planes of said plates while simultaneously allowing the plates to move relative to one another in a direction normal to the planes of said plates.

71. In a system for controlling a routing of a fleet of vehicles composed of distinct groups to a plurality of possible locations, a method for monitoring and commanding vehicle movement comprising the steps of:

sensing a weight and a change in said weight of a load carried by each vehicle and formulating data representative of said weight and said change in weight;

transferring said data to a central location;

cataloging at said central location said data from each vehicle;

selecting one of said distinct groups of vehicles;

combining said data from said one of said distinct groups of vehicles to provide collective data indicative of group performance; and analyzing said cataloged and collective data to provide commands for transfer to selected vehicles in said fleet of vehicles.

72. In a system for controlling a routing of a fleet of load-carrying vehicles composed of distinct groups to a plurality of possible locations, an apparatus for monitoring and commanding vehicle movement comprising, in combination:

first means on-board each of said vehicles in said fleet of vehicles for sensing a change in a load carried by said vehicle and forming data representative of said change;

second means on-board each of said vehicles for transmitting said data;

a central computer for receiving said data from each of said vehicles in said fleet of vehicles and (1) cataloging said data to provide averages for each of said vehicles, (2) analyzing said averages from each of said vehicles and (3) forming control data in response to said analysis that includes identification data identifying at least one vehicle in said fleet of vehicles; and transmitting means coupled to said central computer for transmitting said control data to a vehicle identified by said identification data.

73. In a system as set forth in claim 72 including repeater transmitters strategically located along routes of said fleet of vehicles and each of said repeater transmitters receiving said data from vehicles in its vicinity and retransmitting said data to said central computer such that said retransmitted data identifies said each repeater transmitter, thereby providing an approximate location of each vehicle in said fleet of vehicles.

74. In a system as set forth in claim 72 wherein said control data includes data designating sites for loading and dumping loads carried by said fleet of load-carrying vehicles and each vehicle in said fleet includes a display means responsive to said control data for displaying said designated sites to a vehicle operator.

75. In a system as set forth in claim 72 wherein each vehicle in said fleet of vehicles is loaded with material by a loader and said data from said first on-board means provides an indication of the operation of said loader;

said central computer including means responsive to said data for providing a quantitative indication of an efficiency of said loader.

76. In a system as set forth in claim 72 wherein each vehicle in said fleet of vehicles includes a pivotal body mounted on a frame for movement between raised and lowered positions and said first on-board means includes a pressure sensor assembly mounted to said frame for supporting a weight of said body in said lowered position.

77. In a system as set forth in claim 76 wherein an interface is formed where said pivotal body meets said frame, said pressure sensor assembly is mounted on said frame such that said pressure sensor assembly extends continuously along said interface when said body is moved to said lowered position.

78. In a system as set forth in claim 72 wherein said first on-board means includes means for detecting an increase in said load carried by said vehicle.

79. In a system for controlling a routing of a fleet of trucks composed of distinct groups to a plurality of possible locations and including a central computer for receiving data from said trucks and issuing commands to said trucks, said trucks having a dump body pivotally mounted to a frame, an apparatus on-board each of said trucks comprising, in combination:

a pressure sensor assembly mounted to each truck in said fleet of trucks for providing pressure data indicative of a weight of said dump body;

a processor means on-board each of said trucks for receiving said pressure data and detecting a change in a weight of said body, and providing output data indicative of a truck operating condition; and transmitter means on-board each of said trucks for receiving said output data from said processor means and transmitting said output data to said central computer for further processing.

80. In the system set forth in claim 79, said central computer including means for receiving said output data and formulating a data base for each truck and each group of trucks, said central computer also including means responsive to said data base for providing control data to a second transmitter means operatively coupled to said central computer.

81. In the system set forth in claim 80 a receiver means on-board each of said trucks for receiving said control data and delivering it to said processor means.

82. In the system set forth in claim 81, said processor means including means responsive to said control data to provide display data to an on-board display means for use by a truck operator.

83. An apparatus for measuring a weight of a load carried by a body of a truck, said apparatus comprising, in combination:

a truck body and a truck frame;

means for coupling said body to said frame to inhibit side-to-side or fore-to-aft movement of said body with respect to said frame but allowing limited non-rotating vertical movement; and a pressure sensor assembly supporting a predetermined portion of a weight of said body along an interface between said body and frame such that a weight of said body is transferred to said frame uniformly along said interface.

84. An apparatus as set forth in claim 83 wherein said pressure sensor assembly includes a signal output indicative of pressure and said apparatus includes a processor means for receiving said signal output.

85. An apparatus as set forth in claim 84 wherein said processor means includes means for detecting a change in said weight of said truck body and formulating data indicative of said truck condition in response to said pressure data.

86. A system for automatically measuring a weight of a vehicle body and automatically transferring a measurement of said weight to a remote stationary site, said system comprising, in combination:
a vehicle frame for supporting said body;
a pressure sensor assembly mounted on said vehicle frame and positioned along an interface between said vehicle body and frame for supporting a predetermined portion of said weight of said vehicle body such that said assembly distributes said predetermined portion of said weight of said vehicle body in a substantially uniform manner along said interface, said assembly providing at least one output signal indicative of a pressure at said interface between said body and frame;
means remote from said vehicle for receiving said at least one output signal and formulating an indication of said weight of said body; and
coupling means joining said pressure sensor assembly and said remote means for automatically transferring said at least one output signal from said assembly to said remote site.

87. A system according to claim 86 wherein said at least one output signal from said pressure sensor assembly is fluid under pressure and said remote means is a pressure responsive device for providing a visual indication indicative of said weight of said body and said coupling means is a conduit for communicating said fluid under pressure from said assembly to said pressure responsive device remote from said vehicle.

88. A system according to claim 86 wherein said at least one output signal from said pressure sensor assembly is an electrical signal and said remote means is a circuit responsive to said electrical signal when received via said coupling means.

89. A system according to claim 88 wherein said pressure sensor assembly comprises liquid-filled tubing.

90. In a system utilizing pressurized tubing, an apparatus for terminating an end of said tubing and for insuring the termination is leak-proof under high pressures, said apparatus comprising, in combination:
an end clamp located at said end of said tubing and comprising first, second and third portions;
said third portion of said end clamp located inside said tubing while said first and second portions fit over an outside surface of said tubing and opose one another so as to sandwich said tubing and third portion between said first and second portions;
means for joining said first, second and third portions of said clamp with said tubing so as to totally seal the end of said tubing; and
a collar surrounding said tubing at an area proximate said end of said tubing but rearward of said end clamp, said collar having a central bore for receiving said tubing and restraining said tubing from changing its cross-sectional shape in an area of said tubing under and adjacent to said collar.

91. In a system for monitoring hauling parameters of a vehicle with a dump body that pivots between raised and lowered pivotal positions, an on-board apparatus comprising, in combination:
a sensor mounted on said body and responsive to the pivoting of said body for providing an output signal indicative of said raised or lowered positions of said body, said sensor being totally encapsulated in a housing in order to prevent ambient conditions from reducing the responsiveness of said sensor;
a processor for receiving said output signal from said sensor and responding to said output signals in a predetermined manner; and
means communicating said output signal from said sensor to said processor wherein said means includes an output port in said housing which maintains said sensor in isolation from an ambient environment.

92. The on-board apparatus as set forth in claim 91 wherein said sensor is a mercury switch.

93. In a system for controlling a routing of each vehicle in a fleet of material-hauling vehicles to one of a plurality of possible load or dump locations, an apparatus for monitoring and commanding vehicle movement comprising, in combination:
means on-board each of said vehicles for providing an indication of a beginning of a loading of material into said vehicle and a dumping of said material from said vehicle and, in response to said indication, forming data indicative of said loading or dumping;
first transceiver means on-board each of said vehicles for transmitting said data;
a central computer having a second transceiver means for receiving said data from each of said vehicles and having a processor and a memory for formulating from said data a data base from which control data is derived, said central computer including means for transmitting said control data to said vehicles, said control data including data identifying a particular vehicle and a particular one of said plurality of possible load or dump locations; and
said first transceiver means receiving said control data and said on-board sensing means responding to said control data to visually indicate said particular one of said plurality of possible load or dump destinations on an on-board display means.

94. An apparatus on-board a vehicle, being one of a plurality of similar vehicles, for acquisitioning data indicative of vehicle operation and for accumulating said data, said apparatus comprising:
first means mounted to said vehicle for providing data indicative of a loading of material into a dump body of said vehicle and a dumping of said material by said dump body;
second means mounted to said vehicle for providing data indicative of a movement of said vehicle;
a first processor means on-board said vehicle for acquiring said data from said first and second means and organizing said data to provide information regarding performance of said vehicle; and
a storage means for receiving said data from said first processor means and storing said data as organized by said first processor means.

* * * * *

REEXAMINATION CERTIFICATE (2203rd)
United States Patent [19]
Hagenbuch

[11] B1 4,839,835
[45] Certificate Issued  Jan. 25, 1994

[54] APPARATUS AND METHOD RESPONSIVE TO THE ON-BOARD MEASURING OF THE LOAD CARRIED BY A TRUCK BODY

[76] Inventor: LeRoy G. Hagenbuch, 4602 N. Rosemead, Peoria, Ill. 61604

Reexamination Request:
No. 90/002,704, Apr. 27, 1992

Reexamination Certificate for:
Patent No.: 4,839,835
Issued: Jun. 13, 1989
Appl. No.: 717,042
Filed: Apr. 1, 1985

Related U.S. Application Data

[63] Continuation-in-part of Ser. No. 604,739, Apr. 27, 1984, Pat. No. 4,630,227.

[51] Int. Cl.$^5$ ............... G01G 19/08; G06F 15/20
[52] U.S. Cl. ............... 364/567; 364/424.01; 364/424.03; 364/424.07; 177/136; 177/141
[58] Field of Search ............... 364/424.04, 436, 567, 364/424.01, 424.03, 424.07; 340/992, 993; 177/136, 141

[56] References Cited

U.S. PATENT DOCUMENTS

| | | | |
|---|---|---|---|
| 1,113,609 | 10/1914 | Gamble | 177/4 |
| 1,261,508 | 4/1918 | Gamble | 346/7 |
| 2,586,137 | 2/1952 | Yoder et al. | 177/141 |
| 3,559,820 | 2/1971 | Munson | 340/686 |

(List continued on next page.)

FOREIGN PATENT DOCUMENTS 2043921 10/1980 United Kingdom.

OTHER PUBLICATIONS

"Hardware, Software, and System Considerations in Computer-Based Open Pit Mine Truck Dispatching"; ISA Transaction, vol. 22, Nov. 4, presented at the ISA Conference May 5-7, 1982, Baker et al.

(List continued on next page.)

*Primary Examiner*—Thomas G. Black

[57] ABSTRACT

The invention relates to an apparatus for accurately measuring the weight of a load carried by a truck body which is mounted on a truck frame. The apparatus is located along an interface between the truck frame with the load carried by the truck body and uniformly distributes the weight of the body onto the frame along the interface. In order to measure the weight of the load, the apparatus includes pressure sensors which communicate the entire weight of the load to the truck frame. The pressure sensors provide an electrical signal proportional to the pressure exerted by the load on the apparatus. This electrical signal is processed to calculate the weight of the load carried in the truck body. By providing a pressure sensing apparatus at an interface between the load and the truck frame, the weight on the load carried by the truck body can be continually monitored without interrupting the loading, hauling and dumping routine. A sensor processing unit responds to the continually monitored weight data and the like to provide hauling parameters to track the performance of the truck and to provide a data base to a central computer from which data can be gathered for efficiently controlling the movement of a plurality of trucks.

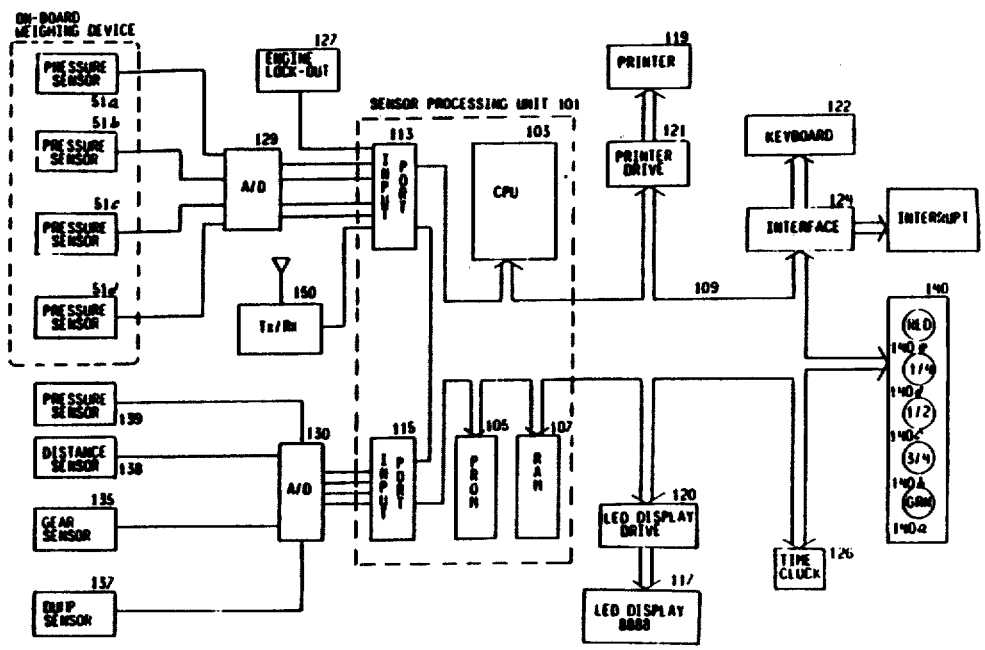

U.S. PATENT DOCUMENTS

OTHER PUBLICATIONS

Promotional brochure entitled "Dispatch At Work!" distributed at the October 1982 American Mining Congress Quadrennial held in Las Vegas.

Promotional brochure entitled "Dispatch" distributed at the October 1986 American Mining Congress Quadrennial held in Las Vegas.

"Computer Methods for the 80s In The Mineral Industry", edited by Alfred Weiss, Society of Mining Engineers/A.I.M.E. 1979, pages 735–742.

Brochure entitled "Quintette Coal Limited's Experience to Date within Its Computerized Truck Dispatch System", distributed at the April 1985 87th Annual General Meeting of CIM, held April 21–25, 1985

Brochure entitled "Pactronics Load Analyzer", distributed by Pactronics Corporation of Cucamonga, California, bearing a copyright notice of 1978.

Brochure entitled "On-Board Truck Weighing System—Gateway To Production", distributed by Philippi-Hagenbuch, Inc., bearing a copyright notice of 1984.

Brochure entitled "Hardware, Software, and System Considerations N Computer-Based Open Pit Mine Truck Dispatching", ISA Transactions, Volume 22, No. 24, pages 11–20, 1983.

Weed, Jr., "Motorola System Combines Truck Dispatch With Remote Data Acquisition and Control At Reserve Mining Company", distributed at the Arizona Conference A.I.M.E. Annual Meeting held on December 5, 1983.

Beaudoin, "Automatic Truck Dispatching—Mount Wright Operations", Open Pit Operations Conference, Canadian Institute of Mining and Metallurgy, Paper No. 2, 1977.

Mackie, "Communications + Computers = Innovative Mine Management", Society of Mining Engineers of A.I.M.E., No. 85-55, presented February 1985.

White et al., "Computer Based Dispatching In Open Pit Mines", presented at the 12th Annual ISA Mining and Metallurgy Industries International Process Control Symposium, Vancouver, B.C., Canada, May 1984.

Gould, Inc. brochure, "Automatic Truck Dispatching and Identification System", dated September 19, 1979.

Sassos, "Reserve's Mine Management System", *Engineering and Mining Journal*, September 1984, pages 42–49.

Motorola brochure, "Data Ranger/Mining Communications System", distributed by Motorola, Inc. at the 1982 American Mining Congress Quadrennial held in Las Vegas, Nevada.

Chironis, "Computer Monitors and Controls All Truck-Shovel Operation", Coal Age, March, 1985, pages 50–55.

Arnold et al., "Computer-Based Truck Dispatching", Special Report: Surface Haulage Economics, April, 1983.

White, J.W. and J.P. Olson, "Computer Based Dispatching In Mines With Concurrent Operating Objectives", Society of Mining Engineers, 83–413, November 1986

White, J.W., M.J. Arnold and J.G. Clevenger, "Automated Open-Pit Truck Dispatching At Tyrone", Engineering and Mining Journal, June 1982.

White, J.W., and L.T. Zoschke, "The Development Of A Computerized Truck Dispatching System", Mining Magazine, December 1987.

Barnum, B.A., "Computerized Truck Dispatching At The Chino Mine—Installation And Operation Considerations", Society of Mining Engineers, Inc., Reprint Number 87-76, February 1987.

Chironis, N.P., "Computer Monitors And Controls All Truck-Shovel Operations", Coal Age, March 1985.

Arnold, M.J., and White, J.W., "Advance In Computer Dispatching", American Mining Congress, April 1988.

Arnold, M.J., and White, J.W., "Computer-Based Truck Dispatching", Special Report: Surface Haulage Economics, Mining Engineering, September 1983.

Clevenger, J.G., "DISPATCH Reduces Mining Equipment Requirements", Mining Engineering, September 1983.

White, J.W., "Automated Haulage Control In North America", International Mining, April 1988.

White, J.W., and Olson, J.P., "Recent Developments In Computer Based Dispatching", Society of Mining Engineers of A.I.M.E., October 1983.

White, J.W., Arnold, M.J., and Clevenger, J.G., "Automated Open-Pit Truck Dispatching At Tyrone", Engineering And Mining Journal, June 1982.

White, J.W., and Olson, J.P., "Off-Highway Haulage In Surface Mines", A.A. Balkema/Rotterdam/Brookfield, 1989.

Lill, J.W., Gliddon, J.P., and Wade, G.C., "Palabora—Changing To Meet The Challenge Of The 80's", Mining Engineering, August 1988.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 35–45, 54–56, 60, 61, 69, 70, 90–92 are confirmed.

Claims 53, 83–85, 88 are cancelled.

Claims 1-3, 7, 12, 13, 15-19, 20, 23, 24, 26, 27, 31-33, 46, 48-52, 57, 62, 65, 68, 71-73, 75, 79, 86, 89, 87, 93, 94 are determined to be patentable as amended.

Claims 4–6, 8–11, 14, 21, 22, 25, 28–30, 34, 47, 58, 59, 63, 64, 66, 67, 74, 76–78, 80–82 dependent on an amended claim, are determined to be patentable.

New claims 95–103 are added and determined to be patentable.

1. In a system of a plurality of vehicles, an apparatus on-board each of said vehicles for acquisitioning data indicative of vehicle operation and for relaying said data to a remote control center where the data is processed to create control signals that are delivered back to said apparatus for instructing a vehicle operator regarding vehicle movement, said apparatus comprising:
   (1) means mounted to said vehicle *and operatively coupled to a dump body of said vehicle* for [indicating] *sensing* a loading of material into [a] *the* dump body of said vehicle by a loader *and providing data whose value is indicative thereof;*
   (2) means mounted to said vehicle *and operatively coupled to the dump body of said vehicle* for [indicating] *sensing* a dumping of a load carried by said body *and providing data whose value is indicative thereofep ;*
   (3) means mounted to said vehicle for [indicating] *continuously monitoring* a direction of movement by said vehicle, *sensing changes in the direction of movement and providing data whose value is indicative thereof;*
   a first processor means on-board said vehicle for acquiring *the* data generated from means (1), (2) and (3) *as input data* and, *the first processor means including means for* processing said data for [downloading] *generating output data to be downloaded* to a remote control center, *the output data including data derived from changes in the values of the input data correlated to a haulage condition of the vehicle*; [and]
   *a storage medium responsive to the first processor means for storing the output data; and*
   (4) means for sending said processed data to said remote control center and for receiving control signals therefrom.

2. An apparatus as set forth in claim 1 wherein *the haulage condition is a weight of a bucket of material added to the dump body by a loader* said first processor means includes (1) memory means for storing data indicative of a predetermined maximum weight capacity for said dump body, (2) detection means responsive to incremental increases in a total weight of said dump body for determining an approximate weight of *the* material added by [a] *the* bucket of [a] *the* loader, (3) comparison means responsive to said memory, first processor and detection means for determining if said total weight minus said predetermined maximum weight for said dump body is a fraction of said approximate weight of material in said bucket, and (4) display means responsive to said comparison means for indicating a remaining weight capacity of said truck body.

3. An apparatus as set forth in claim 2 wherein said detection means includes:
   means for detecting a monotonic increase in the total weight of said dump body[; and
   means for storing said increase].

7. An apparatus as set forth in claim 6 wherein said [first processor means] *output data* includes [means for] isolating pressure data representing pressure spikes [and means for recording the occurrence of a pressure spike, and means responsive to said recording means for delivering data to said display means] *where an accumulation of the pressure spike data is* indicative of [a] *the haulage* condition of a road *condition* over which said vehicle travels.

12. An apparatus as set forth in claim 6 [including: first] *wherein the means (4) is a* transceiver [means] mounted to said vehicle;
   said first processor means operatively coupled to said first transceiver [means and said pressure sensor assembly for receiving said data from said pressure sensor assembly, processing said data and] *for* transmitting said [processed] *output* data by way of said first transceiver [where said processed data includes an indication of a hauling status for said vehicle]; and
   said remote control center including a second processor means having a second transceiver [means] for communicating with said first transceiver [means], said second processor means receiving said [processed] *output* data from said first processor means, said [processed data] *second processor means* identifying said vehicle and [said] *deriving the* hauling [status] *condition* of said vehicle [derived] from *the output* data [from means (1), (2) and (3)].

13. An apparatus as set forth in claim 12 wherein said vehicle may be loaded by any one of a plurality of loaders;
   said second processor means includes (1) first means for calculating in response to said [processed] *output* data *the haulage condition of* an average load time for each of said plurality of loaders, (2) second means responsive to said [processed] *output* data and said first means for calculating *the haulage condition of* a current load delay time for each of said plurality of said loaders, (3) third means responsive to said second means for identifying a one of said plurality of said loaders having a minimum load delay (4), fourth means responsive to said third means for forming data for transmission by said second transceiver means, said data for transmission identifying a particular one of said plurality of vehicles and said one of said plurality of loaders with said minimum load delay; and said first processor means including fifth means responsive to said data received from said fourth means via said first transceiver for displaying to said vehicle operator of said particular one of said plurality of vehicles an identifier of said one of the loaders.

14. An apparatus as set forth in claim 12 wherein said pressure sensor assembly includes tubings which forms said interface between each of said body and frame of said vehicle.

15. An apparatus as set forth in claim 12 wherein said second processor means includes memory means for archiving said [processed] output data from said vehicle.

16. An apparatus as set forth in claim 12 wherein [said first processor means generates said processed data for transmission in response to said pressure data from said pressure sensor assembly and] the data generated by means (1), (2) and (3) [which] are indicative of a status of the haulage condition as to whether said vehicle is dumping its load, beginning loading of a new load or in transit between load and dump sites.

17. An apparatus as set forth in claim 16 wherein said means (1) is a weight sensor, means (2) is a dump sensor and means (3) is a gear sensor and said first processor means generates said [processed] output data for transmission in response to data from a plurality of sensors on-board said vehicle including said weight, gear and dump sensors.

18. An apparatus as set forth in claim 12 wherein said second processor means includes memory means for archiving said [processed] output data in response to vehicle identification and vehicle type data included in said [processed] output data, thereby [forming] providing a data base.

19. An apparatus as set forth in claim 18 wherein said data base formed by said [processed] output data archived in said memory means is used by said second processor means to generate said control [data] signals for controlling the movement of said vehicle.

20. An apparatus according to claim 12 including:
said second processor means including memory means for storing a predetermined maximum load capacity for said dump body; and
said first processor means including means for determining a weight of said dump body from said [pressure] data of said [pressure sensor assembly] means (1) and incorporating said weight as part of said [processed] output data;
said second processor means responsive to said [processed] output data for (1) comparing said weight with said predetermined maximum load capacity, and (2) generating an output signal identifying said vehicle if said weight is greater than said predetermined maximum load capacity.

23. An apparatus as set forth in claim 6 wherein said first processor means includes:
means for storing said pressure data acquired from said pressure sensor assembly;
means for comparing selected pressure data in said storing means with other pressure data in said storing means to determine if said selected pressure data are pressure [spike] spikes;
means responsive to said comparing means for counting the pressure spikes; and means responsive to said counting means for providing the haulage condition as an indication of the condition of a road over which said vehicle travels.

24. An apparatus as set forth in claim 6 including:
said [first processor means] output data providing an indication of a load or dump haulage condition of said vehicle in response to changes in the values of said [pressure] data from said [pressure sensor assembly] means (1) and (2);
distance means for measuring the distance traveled by said vehicle and providing said distance to said first processor means so as to be incorporated into the processing of said data for generating said [processed] output data;
said storage [means] medium responsive to said [processed] output data for storing the haulage condition of a distance traveled by said vehicle between said indications of the load [and] or dump haulage [conditions] condition and for storing the haulage condition of a total weight of a load hauled by said vehicle between said indications; and
means responsive to said storage [means] medium for multiplying said distance traveled by said total weight hauled in order to provide the haulage condition of a tons-miles record as part of said storage [means] medium.

26. An apparatus according to claim 6 including:
[memory means operatively coupled to said first processor means;]
means coupled to said first processor means for entering an identifier of said vehicle operator and for associating a portion of said [memory means] storage medium with said identifier;
said first processor means responsive to said [pressure] data from means (1), (2) and (3) for [(1) providing said processed data which is indicative of vehicle performance and (2)] routing said [processed] output data [indicative of vehicle performance] to locations within said portion of said [memory means] storage medium associated with said identifier;
detecting means responsive to said entering means for detecting changes in said identifier; and
display means responsive to said detecting means for displaying said [processed] output data [indicative of vehicle performance in said portion of memory means], including a visual indication of the haulage condition when a change of said identifier has occurred.

27. An apparatus as set forth in claim 6 where said vehicle includes front and back axles and said apparatus includes means for measuring loads carried by said front and rear axles of said vehicle wherein said dump body is pivotally mounted to said frame so as to pivot between raised and lowered positions, said means comprising:
(5) means for measuring force of said dump body on said frame and providing data indicative of said force;
said first processor means responsive to said data from said means (5) and said pressure sensor assembly for determining a distribution of said weight of said dump body over said front and rear axles of said vehicle and providing data in the output data indicative thereof; and
display means responsive to the output data from said first processor means for displaying portions of said weight of said dump body carried by said front and rear axles.

31. An apparatus as set forth in claim 6 including means for pivoting said dump body between raised and lowered positions on [said dump body] *a frame,*
   said pressure sensor assembly including a plurality of sensor elements and providing an interface between said frame and dump body when said dump body is in a lowered position, said plurality of sensor elements provides an indication of the total weight of said dump body and an indication of fore-and-aft weight distribution as well as side-to-side weight distribution of the load carried by the dump body; and
   said first processor means having means responsive to said plurality of sensor elements of said pressure sensor assembly for detecting an imbalance of said weight carried by said dump body, *providing data in the output data indicative of the imbalance* and signaling said vehicle operator [in response thereto] *to alert the operator of the imbalance as being an improper haulage condition.*

32. An apparatus as set forth in claim 6 wherein said body is pivotally mounted to said frame for movement between lowered and raised positions and [said apparatus includes a distance sensor for providing data to said first processor means indicative of truck movement,] said first processor means [including] *includes* means responsive to said [distance sensor] *means (3)* and to said pressure sensor assembly for providing an output signal when said vehicle moves without said dump body in said lowered position.

33. An apparatus as set forth in claim 6 wherein said dump body is pivotable between raised and lowered positions and wherein said first processor means includes (1) memory means for storing a tare weight of said dump body, (2) means responsive to the lowering of said dump body onto said pressure sensor assembly for comparing [said] *a* total weight of said dump body *determined by means (1)* with said tare weight *stored* in said memory means, and (3) means [for indicating] *responsive to the comparison for including in the output data an indication that* said dump body is not fully empty when said total weight of said dump body is greater than said tare weight of said dump body plus a predetermined constant.

46. A system for minimizing a [hauling] *haul cycle* time for each of a plurality of trucks between load and dump sites, said system comprising:
   a plurality of on-board weighing devices each mounted on one of said plurality of trucks for providing signals indicative of a truck's operation, *including a first hauling status of each of the trucks;*
   *a plurality of sensors each mounted on one of said plurality of trucks for providing signals indicative of a truck's operation, including a second hauling status of each of the trucks;*
   a plurality of processor means each mounted to one of said plurality of trucks and each processor means responsive to a one of said plurality of on-board weighing devices *and one of said plurality of sensors* for receiving said signals from said one of said plurality of on-board weighing devices *and said one of said plurality of sensors* and processing said signals to provide data indicative of [a] *changes in the* hauling status *of the truck;*
   a plurality of first transceiver means each mounted to one of said plurality of trucks for receiving said data indicative of [a] *changes in the* hauling status *of the truck* from said one of said plurality of processor means and transmitting said [hauling status] data in association with additional data that identifies said one of said plurality of trucks; [and]
   a remote processing center including second transceiver means for receiving said hauling status and truck identifying data from said one of said plurality of first transceiver means, said remote processing center generating a historical data base, containing said data indicative of [a] *the change in the* hauling status and indexed by said identifying data*; and*
   *said remote processing center including means responsive to the historical data base for generating control commands for routing the plurality of trucks for transmission to the trucks via the first and second transceiver means so as to minimize the haul cycle times.*

48. A system as set forth in claim 46 wherein a plurality of loaders are provided at said load sites for loading said plurality of trucks; and
   said *means of the* remote processing center includes (1) first means for calculating in response to at least [said] *the historical* data base an average load time for each of said plurality of loaders, (2) second means responsive to at least [said] *the historical* data base and said first means for calculating a current load delay time for each of said plurality of loaders, (3) third means responsive to said second means for identifying one of said plurality of loaders with a minimum load delay time, (4) fourth means responsive to said third means for forming *the* control data for transmission by said second transceiver means, said control data identifying a particular one of said plurality of trucks and a particular one of said plurality of loaders with said minimum load delay time; and
   each of said plurality of processor means mounted to said plurality of trucks includes fifth means responsive to said control data received by said first transceiver for displaying [for said] *the* particular one of said plurality of loaders identified by said control data.

49. A system as set forth in claim [46] *47* wherein said pressure sensor assembly includes tubings which forms the interface between each of said body and frame of said trucks.

50. A system as set forth in claim 46 wherein said data base comprises a memory means responsive to said remote processing center for archiving *the changes in* said hauling status and identifying data transmitted from said plurality of trucks.

51. A system as set forth in claim 46 wherein [said processor means generates hauling status data for transmission in response to said signals from said pressure sensor assembly which] *the data indicative of changes in the hauling status of one of the trucks* are indicative of whether [a particular one of said plurality of trucks in] *the truck is* dumping its load, beginning a loading or in transit between load and dump sites.

52. A system as set forth in claim 46 wherein said remote processing center includes memory means for archiving said *changes in* hauling status and identifying data from each of said plurality of processors in groups such that said data base is firstly identifiable with individual ones of said plurality of trucks and secondly identifiable with types of trucks comprising said plurality of trucks.

57. A system for measuring a degree of tire use by a vehicle which hauls material in a dump body pivotally mounted to a frame of said vehicle, said apparatus comprising:
   distance means for measuring a distance traveled by said vehicle and providing distance data;
   an on-board weighing device responsible to a weight of a load of said material hauled by said vehicle for providing (1) weight data and (2) data indicative of a beginning and an ending of a haul cycle;
   storage means responsive to said distance means and said on-board weighing device for accumulating said distance [and], weight *and haul cycle* data; and
   processor means *on-board the vehicle* responsive to said *accumulated* weight [and], distance *and haul cycle* data for (1) time marking at least a portion of said distance [and], weight *and haul cycle* data so as to identifying an elapsed time of said haul cycle, (2) determining a total distance and a weight of said material for said haul cycle, (3) multiplying said total distance and said weight of said material for said haul cycle to provide a sum, (4) dividing said sum by said elapsed time, and (5) displaying a value resulting from said multiplying means, *which provides an indication of the efficiency of the vehicle expressed as work per unit time.*

62. A system for identifying an overload condition in an off-road, heavy-duty truck having a body mounted to a truck frame by a hinge assembly for movement between lowered and raised positions, said apparatus comprising, in combination:
   a sensor assembly mounted on said truck frame and supporting a predetermined portion of a weight of said truck body on said truck frame when said truck body is in said lowered position, said sensor assembly responding to said weight of said body to provide a signal indicative of said weight of said body;
   *a processor on-board the truck for detecting a change in the signal and in response to the change providing output data indicative of the weight of the body;*
   a means for transferring said [signal] *output data* to a remote, off-board processor means;
   said remote off-board processor means responsive to said [signal] *output data* and including memory means for storing a predetermined maximum weight capacity for said truck body; and
   said remote off-board processor means responsive to said [signal] *output data* from said [sensor assembly indicative of said weight] *processor* for comparing said weight with said predetermined maximum weight capacity, and for generating an output signal if said weight indicated by said [signal] *output data* is greater than said predetermined maximum weight capacity.

65. An apparatus for measuring and manipulating various hauling and loading parameters for an off-road, heavy duty truck having a *dump* body, a frame and front and rear axles, said apparatus comprising:
   a first weighing device [on] *interfaced between the frame and body of* said truck for measuring a [first force of] *weight of a load carried by* said truck body on said truck frame and providing data representative of said [first force] *weight when the dump body is fully lowered onto the frame;*
   a second weighing device on said truck for measuring a second force of said truck body on said truck frame, *which locates the center of gravity of the load* and providing data indicative of said second force;
   a processor means responsive to *the data of the* said first and second weighing devices for determining a fraction of a total weight of said truck body over said front axle and a fraction of said total weight of said truck body over said rear axle of said truck; and
   display means responsive to said processor means for displaying said fractions of said total weight supported by said front and rear axles.

68. An apparatus for measuring and manipulating various hauling and loading parameters for an off-road, heavy duty truck having a body, a frame and front and rear axles, said apparatus comprising in combination:
   hinge assemblies pivotally joining said truck frame and body;
   a sensor assembly mounted on said truck frame and including a plurality of *pressure* sensor elements, said sensor assembly supporting a predetermined portion of a weight of said truck body when said truck body is in a lowered position on said truck frame;
   said sensor assembly providing an interface between said truck frame and body when said body is in said lowered position such that said plurality of *pressure* sensor elements provides an indication of said weight of said truck body and an indication of fore-and-aft and side-to-side distribution of said weight of said truck body; [and]
   processor means responsive to said sensor assembly for detecting an imbalance of said weight carried by said truck body and signalling a truck operator in response thereto; and
   *said processor including means for determining side-to-side and fore-and-aft imbalances according to the following relationships:*

$$\left| \text{side 1 pressure} - \text{side 2 pressure} \left( \begin{array}{c} \text{OPT.} \\ \text{RATIO} \\ \#1 \end{array} \right) \right| < \begin{array}{c} \text{predetermined} \\ \text{percentage of} \\ \text{a maximum} \\ \text{capacity} \\ \text{pressure} \end{array}$$

and $$\left| \text{fore pressure} - \text{aft pressure} \left( \begin{array}{c} \text{OPT.} \\ \text{RATIO} \\ \#2 \end{array} \right) \right| < \begin{array}{c} \text{predetermined} \\ \text{percentage of} \\ \text{a maximum} \\ \text{capacity} \\ \text{pressure} \end{array}$$

*where side 1 side 2, fore and aft pressures are each a pressure from one or more but less than all of the pressure sensor elements in the assembly, OPT. RATIO #1 is an optimum value of the pressure ratio of the side 1 pressure over the side 2 pressure, and OPT. RATIO #2 is an optimum value of the pressure ratio of the fore pressure over the aft pressure.*

71. In a system for controlling a routing of a fleet of vehicles composed of distinct groups to a plurality of possible locations, a method for monitoring and commanding vehicle movement comprising the steps of:
   sensing a weight and a change in said weight of a load carried by each vehicle and formulating data representative of said weight and said change in weight;
   *sensing a value of a haulage parameter of the vehicle and formulating data representative of a change of the value;*

*combining on-board each vehicle the data representative of the weight, change in weight and the change in the value of the haulage parameter and correlating the combined data to a status of a haulage condition;*
transferring said *correlated* data to a central location;
cataloging at said central location said *correlated* data from each vehicle;
selecting one of said distinct groups of vehicles;
combining said data from said one of said distinct groups of vehicles to provide collective data indicative of group performance; and
analyzing said cataloged and collective data to provide commands for transfer to selected vehicles in said fleet of vehicles.

72. In a system for controlling a routing of a fleet of load-carrying vehicles composed of distinct groups to a plurality of possible locations, an apparatus for monitoring and commanding vehicle movement comprising, in combination:
   first means on-board each of said vehicles in said fleet of vehicles and responsive to a load carried by the vehicle for sensing [a] the change in a load carried by said vehicle and forming data representative of said change;
   *second means on-board each of said vehicles for sensing an operating parameter of the vehicle and providing data whose value is indicative thereof, where the data complements the data representing changes in a load in that the data from the first and second means collectively provides an indication of a hauling condition of the vehicle;*
   *third means for correlating the data from the first and second means with the haulage condition of the vehicle;*
   [second] *fourth* on-board each of said vehicles for transmitting said *correlated* data;
   a central computer for receiving said *correlated* data from each of said vehicles in said fleet of vehicles and (1) cataloging said *correlated* data to provide averages for each of said vehicles, (2) analyzing said averages from each of said vehicles and (3) forming control data in response to said analysis that includes identification data identifying at least one vehicle in said fleet of vehicles; and
   transmitting means coupled to said central computer for transmitting said control data to a vehicle identified by said identification data.

73. In a system as set forth in claim 72 including repeater transmitters strategically located along routes of said fleet of vehicles and each of said repeater transmitters receiving said *correlated* data from vehicles in its vicinity and retransmitting said data to said central computer such that said retransmitted data identifies said each repeater transmitter, thereby providing an approximate location of each vehicle in said fleet of vehicles.

75. In a system as set forth in claim 72 wherein each vehicle in said fleet of vehicles is loaded with material by a loader and said data from said first on-board means provides an indication of [the operation of said loader;] *a quantity and loading rate of material being added into one of the vehicles;*
   said central computer including means responsive to said data for providing a quantitative indication of an efficiency of said loader.

79. In a system for controlling a routing of a fleet of trucks composed of distinct groups to a plurality of possible locations and including a central computer for receiving data from said trucks and issuing commands to said trucks, said trucks having a dump body pivotally mounted to a frame, an apparatus on-board each of said trucks comprising, in combination:
   a pressure sensor assembly mounted to each truck in said fleet of trucks for providing pressure data indicative of a weight of said dump body;
   *means on-board each of the vehicles for sensing an operating parameter of the vehicle and providing data whose value is indicative thereof, where the data complements the pressure data in that the data from the pressure sensor assembly and the sensing means collectively provides an indication of a haulage condition of the vehicle;*
   a processor means on-board each of said trucks for receiving *as input data* said pressure *and operating parameter* data [and], detecting a change in a weight of said body *from a change in the input data, correlating the change with a haulage condition of the truck* and providing output data indicative of [a truck operating condition] *a value of the change and the correlation of the change with the haulage condition;* and
   transmitter means on-board each of said trucks for receiving said output data from said processor means and transmitting said output data to said central computer for further processing.

86. A system for automatically measuring a weight of a vehicle body and automatically transferring a measurement of said weight to a remote stationary site, said system comprising, in combination:
   a vehicle frame for supporting said body;
   a pressure sensor assembly mounted on said vehicle frame and positioned along an interface between said vehicle body and frame for supporting a predetermined portion of said weight of said vehicle body in a substantially uniform manner along said interface, said assembly providing at least one output signal, *which is an electrical signal* indicative of a pressure at said interface between said body and frame;
   [means] *a circuit* remote from said vehicle for receiving said at least one output signal and formulating an indication of said weight of said body; and
   coupling means joining said pressure sensor assembly and said remote [means] *circuit* for automatically transferring said at least one output signal from said assembly to said remote site.

87. A system according to claim 86 wherein said at least one output signal from said pressure sensor assembly is fluid under pressure and said remote [means] *circuit* is a pressure device for providing a visual indication indicative of said weight of said body and said coupling means is a conduit for communicating said fluid under pressure from said assembly to said pressure responsive device remote from said vehicle.

89. A system according to claim [88] *86* wherein said pressure sensor assembly comprises liquid-filled tubing.

93. In a system for controlling a routing of each vehicle in a fleet of material-hauling vehicles to one of a plurality of possible load or dump locations, an apparatus for monitoring and commanding vehicle movement comprising, in combination:
   *first* means on-board each of said vehicles *responsive to a status of a load carried by the vehicle* for [providing an indication of] *sensing* a beginning of a loading of material into said vehicle and a dumping of said material from said vehicle and, in response to said indication, forming data *whose value is* indicative of said loading or dumping;

*second means on-board each of the vehicles for sensing an operating parameter of the vehicle and providing data whose value is indictive thereof where the data complements the loading and dumping data in that the data collectively provides an indication of a haulage condition of the vehicle;*

*a processor on-board each of the vehicles for receiving the data from the first and second means as input data, detecting a change in the values of the input data and providing output data indicative of a value of the change correlated with the haulage condition;* first transceiver means on-board each of said vehicles for transmitting said *output* data;

a central computer having a second transceiver means for receiving said *output* data from each of said vehicles and having a processor and a memory for formulating from said *output* data a data base from which control data is derived, said central computer including means for transmitting said control data to said vehicles, said control data including data identifying a particular vehicle and a particular one of said plurality of possible load or dump locations; and said first transceiver means receiving said control data and said on-board [sensing means] *processor* responding to said control data to visually indicate said particular one of said plurality of possible load or dump destinations on an on-board display means.

94. An apparatus on-board a vehicle, being one of a plurality of similar vehicles, for acquisitioning data indicative of *a status of one or more* vehicle [operation] *haulage conditions* and for accumulating said data, said apparatus comprising:

first means mounted to said vehicle for [providing data indicative of] *sensing a* loading of material into [a] *the* dump body of said vehicle and a dumping of said material by said dump body *and providing data whose value is indicative thereof;* second means mounted to said vehicle for [providing data indicative of] *sensing* a movement of said vehicle *and providing data whose value is indicative thereof;* a [first] processor means on-board said vehicle for [acquiring] *receiving* said data from said first and second means [and organizing said data to provide information regarding performance] *as input data, detecting a change in the input data and providing output data including a value of the change correlated with one or more of the vehicle haulage conditions so as to indicate the status of one or more of the haulage conditions of said vehicle;* and a storage means *on-board the vehicle* for receiving said *output* data from said [first] processor means and [storing] *accumulating* said *output* data [as organized by said first processor means] *to create a historical data base of changes in the status of one or more of the haulage conditions.*

95. *An apparatus on-board a vehicle, being one of a plurality of similar vehicles, for acquisitioning data indicative of a vehicle operation and for accumulating said data, said apparatus comprising:*

*first means mounted to said vehicle for sensing a loading of material into a dump body of said vehicle and a dumping of said material by said dump body and providing data whose value is indicative thereof;*

*second means mounted to said vehicle for sensing a movement of said vehicle and providing data whose value is indicative thereof;*

*a processor means on-board said vehicle for acquiring said data from said first and second means, processing the data to provide output data in response to changes in the values of the data and organizing said output data to provide information regarding performance of said vehicle; and*

*a storage means for receiving said output data from said processor means and storing said data as organized by the processor means.*

96. *The apparatus of claim 1 wherein the haulage condition is an average net weight of the load carried by the body.*

97. *The apparatus of claim 1 wherein the means (3) senses whether the vehicle is moving or stationary.*

98. *The apparatus of claim 97 wherein the haulage condition is the time spent by the vehicle either moving or in a stationary position.*

99. *The apparatus of claim 1 wherein the means (3) senses whether the vehicle is moving forward, moving in reverse or stationary.*

100. *The apparatus of claim 99 wherein the haulage condition is the time spent by the vehicle moving forward or backward or in a stationary position.*

101. *An apparatus as set forth in either claim 94 or 95 wherein the output data provides an indication of the beginning of the loading of material into the dump body.*

102. *An apparatus as set forth in either claim 94 or 95 wherein the output data provides an indication of the dumping of a load carried by the dump body.*

103. *An apparatus as set forth in either claim 94 or 95 wherein the output data provides an indication of the elapsed time of a haul cycle, which is the time between consecutive detections by the first processor of either the beginning of the loading of material into the dump body or the dumping of the material from the dump body.*

* * * * *